United States Patent
Hayashida

(10) Patent No.: US 10,788,887 B2
(45) Date of Patent: Sep. 29, 2020

(54) IMAGE GENERATION PROGRAM, IMAGE GENERATION DEVICE, AND IMAGE GENERATION METHOD

(71) Applicant: FUJITSU LIMITED, Kawasaki-shi, Kanagawa (JP)

(72) Inventor: Naoko Hayashida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/200,800

(22) Filed: Nov. 27, 2018

(65) Prior Publication Data

US 2019/0171281 A1    Jun. 6, 2019

(30) Foreign Application Priority Data

Dec. 5, 2017    (JP) .................................. 2017-233534

(51) Int. Cl.

| G06F 3/01 | (2006.01) |
| G06T 13/40 | (2011.01) |
| H04L 29/06 | (2006.01) |
| A63F 13/00 | (2014.01) |
| G06Q 50/00 | (2012.01) |

(52) U.S. Cl.
CPC .............. *G06F 3/011* (2013.01); *A63F 13/00* (2013.01); *G06F 3/017* (2013.01); *G06Q 50/01* (2013.01); *G06T 13/40* (2013.01); *H04L 67/38* (2013.01)

(58) Field of Classification Search
CPC ......... A63F 13/00; G06F 3/011; G06Q 50/01; G06T 13/40; H04L 67/38
See application file for complete search history.

(56) References Cited

U.S. PATENT DOCUMENTS

| 10,642,346 B2 * | 5/2020 | Hayashida .............. G06F 3/011 |
| 2009/0079816 A1 | 3/2009 | Qvarfordt et al. |
| 2010/0088084 A1 * | 4/2010 | Johnson .................. G06N 3/006 704/2 |
| 2011/0047486 A1 * | 2/2011 | Jones ..................... A63F 13/87 715/757 |
| 2016/0093108 A1 * | 3/2016 | Mao ........................ A63F 13/42 345/633 |
| 2017/0131781 A1 * | 5/2017 | Buban ................ G06K 9/00335 |

FOREIGN PATENT DOCUMENTS

| JP | 2006-262010 | 9/2006 |
| JP | 2009-077380 | 4/2009 |

* cited by examiner

*Primary Examiner* — Afroza Chowdhury
(74) *Attorney, Agent, or Firm* — Fujitsu Patent Center

(57) ABSTRACT

An image generation method, for displaying avatars. The method includes identifying a tendency in a predetermined temporal interval of a social behavior performed by a second user to a first user if the first user performs the social behavior to the second user, of the users performing communications by way of avatars. The method may also include controlling the social behavior selected based on the identified tendency such that the social behavior is presented to the first user by way of the avatar of the second user, if the first user performs the social behavior to the second user.

16 Claims, 63 Drawing Sheets

FIG. 9A

MUSCLE POTENTIAL DATA TABLE — 900

| DB RECORDING TIME | SENSOR RECORDING TIME | USER ID | INFORMATION COLLECTOR ID | MUSCLE POTENTIAL ACTIVITY VALUE (EMG($\mu$V)) |
|---|---|---|---|---|
| . . | . . | . . | . . | . . |
| JULY 27, 2015 11:00:01.035 | JULY 27, 2015 11:00:01.000 | userA | TcA_c3_zygomaticus(cheek) | 33.9 |
| JULY 27, 2015 11:00:01.040 | JULY 27, 2015 11:00:01.010 | userA | TcA_c3_orbicularis(under eye) | 52.0 |
| JULY 27, 2015 11:01:05.069 | JULY 27, 2015 11:00:04.000 | userA | TcA_c3_corrugator(brow) | 20.2 |
| . . | . . | . . | . . | . . |

FIG. 9B

HEAD POSTURE DATA TABLE 910

| DB RECORDING TIME | SENSOR RECORDING TIME | USER ID | INFORMATION COLLECTOR ID | HEAD POSTURE DATA (POSITION, ANGLE) |
|---|---|---|---|---|
| ... | ... | ... | ... | ... |
| JULY 27, 2015 11:00:01.030 | JULY 27, 2015 11:00:00.000 | userA | TcA_c1 | (0,18,−10),(0,0,0) |
| JULY 27, 2015 11:00:03.025 | JULY 27, 2015 11:00:02.000 | userA | TcA_c1 | (0,18,−10),(0,0,1) |
| JULY 27, 2015 11:01:05.069 | JULY 27, 2015 11:00:04.000 | userA | TcA_c1 | (0,18,−10),(0,0,2.5) |
| ... | ... | ... | ... | ... |

FIG. 9C

DEPTH DATA FILE TABLE ~920

| DB RECORDING TIME | SENSOR RECORDING START TIME | SENSOR RECORDING END TIME | USER ID | INFORMATION COLLECTOR ID | DEPTH SENSOR DATA RECORDING FILE URI |
|---|---|---|---|---|---|
| . . | . . | . . | . . | . . | . . |
| JULY 27, 2015 11:00:01.030 | JULY 27, 2015 11:00:00.000 | JULY 27, 2015 11:00:01.000 | userA | TcA_c2 | 20150712_0011100_00.exf |
| JULY 27, 2015 11:00:03.025 | JULY 27, 2015 11:00:02.000 | JULY 27, 2015 11:00:03.000 | userA | TcA_c2 | 20150712_0011102_00.exf |
| JULY 27, 2015 11:01:05.069 | JULY 27, 2015 11:00:04.000 | JULY 27, 2015 11:01:05.000 | userA | TcA_c2 | 20150712_0011104_00.exf |
| . . | . . | . . | . . | . . | . . |

FIG. 10

LOG TABLE RELATING TO AVATAR DISPLAY INFORMATION ~1000

| DB RECORDING TIME | USER CURRENT TIME | USER ID | INFORMATION PROCESSOR ID | LOG TYPE LABEL | LOG DATA OF AVATAR DISPLAY INFORMATION |
|---|---|---|---|---|---|
| .. | .. | .. | .. | .. | .. |
| JULY 27, 2015 11:00:00.020 | JULY 27, 2015 11:00:00.000 | userA | TcA | bone | \<Human\>\<Head\>\<Bone\>((0, 18, −10), (0, 1, 0))\</Bone\> \<RightEye\>... \</Head\> \<Neck\>\<Bone\>... \<RightShoulder\>... \</Neck\> \<Spine\>...\</Spine\> \<Chest\>...\</Chest\> \<Hip\>\<RightUppLeg\>..\</RightUppLeg\> \<LeftUppLeg\>..\</LeftUppLeg\> ... \</Hip\>\</Human\> |
| JULY 27, 2015 11:00:00.020 | JULY 27, 2015 11:00:00.000 | userA | TcA | mesh | \<Human\>\<Head\>\<Mesh \> HeaDMeshesMatrix[]\</Mesh\> \<RightEye\>... \<Mouse\>... \</Head\> \<Neck\>\<Bone\>... \<RightShoulder\>... \</Neck\> \<Spine\>...\</Spine\> \<Chest\>...\</Chest\> \<Hip\>\<RightUppLeg\>..\</RightUppLeg\> \<LeftUppLeg\>..\</LeftUppLeg\> ... \</Hip\>\</Human\> |

FIG. 11

MONITORING TARGET DATA LOG DEFINITION DATA TABLE ~1100

| BEHAVIOR LOG TYPE LABEL | UPDATE THRESHOLD | UPDATE MONITORING TARGET | SENSOR INPUT INFORMATION | INFORMATION COLLECTOR ID |
|---|---|---|---|---|
| : | : | : | : | : |
| Distance_Bodyparts | ((<)\|1\|, >\|1\|, >\|1\|), (*, *, *)) | (Bone_Head) OR (Bone_Righthand) OR (Bone_Lefthand) | DEPTH SENSOR DATA RECORD | TcA_c2 |
| Orientation_Upperbody | ((*, *, *), (*, >\|5\|, *)) | Bone_Chest | DEPTH SENSOR DATA RECORD | TcA_c2 |
| Orientation_Face | ((*, *, *), (*, >\|5\|, *)) | Bone_Head | HEAD POSTURE DATA RECORD | TcA_c1 |
| Lean_Upperbody | ((*, *, *), (>\|2\|, *, *)) | Bone_Spine | DEPTH SENSOR DATA RECORD | TcA_c2 |
| Gesture_Smile | IsSmile (>0.1) | Shape_Mouse | MUSCLE POTENTIAL SENSOR DATA RECORD | TcA_c3_corrugator (brow) |
| : | : | : | : | : |
| Gesture_NegativemeaningGesuture1 | ((*, *, *), (>\|1\|, >\|1\|, >\|1\|)) | (Bone_Rightarm AND Bone_Rightforearm) OR (Bone_Leftarm AND Bone_Leftforearm) | DEPTH SENSOR DATA RECORD | TcA_c2 |
| Gesture_NegativemeaningGesuture1 | ((*, *, *), (*, *, *)) | Bone_Righthand OR Bone_Lefthand | DEPTH SENSOR DATA RECORD | TcA_c2 |
| : | : | : | : | : |

FIG. 12

| SOCIAL BEHAVIOR JUDGMENT API DEFINITION DATA TABLE ~1200 | | |
|---|---|---|
| SOCIAL BEHAVIOR TYPE LABEL | SOCIAL BEHAVIOR JUDGMENT API | BEHAVIOR LOG TYPE LABEL |
| Distance_Upperbody_Closeto | MOVEMENT CHECK API | Distance_Upperbody |
| Distance_Upperbody_Farfrom | MOVEMENT CHECK API | Distance_Upperbody |
| Distance_Face_Closeto | MOVEMENT CHECK API | Distance_Face |
| Distance_Face_Farfrom | MOVEMENT CHECK API | Distance_Face |
| Distance_Bodyparts_Closeto | MOVEMENT CHECK API | Distance_Bodyparts |
| Distance_Bodyparts_Farfrom | MOVEMENT CHECK API | Distance_Bodyparts |
| Attention_Mutual | ATTENTION CHECK API | Attention |
| Attention_Avarted | ATTENTION CHECK API | Attention |
| Attention_Joint | ATTENTION CHECK API | Attention |
| Attention_Following | ATTENTION CHECK API | Attention |
| Orientation_Face_Directto | DIRECTION CHECK API | Orientation_Face |
| Orientation_Face_Indirectto | DIRECTION CHECK API | Orientation_Face |
| Orientation_Upperbody_Directto | DIRECTION CHECK API | Orientation_Upperbody |
| Orientation_Upperbody_Indirectto | DIRECTION CHECK API | Orientation_Upperbody |
| Lean_Upperbody_Forward | FORWARD-BACKWARD BEND CHECK API | Lean_Upperbody |
| Lean_Upperbody_Backward | FORWARD-BACKWARD BEND CHECK API | Lean_Upperbody |
| Gesture_Smileto | EXPRESSION CHECK API | Gesture_Smile |
| Gesture_Positivemeaninggestureto | GESTURE CHECK API | Gesture_PositivemeaningGesture1 |
| Gesture_Negativemeaninggestureto | GESTURE CHECK API | Gesture_NegativemeaningGesuture1 |
| : | : | : |

FIG. 13

| SOCIAL BEHAVIOR APPROACH AND AVOIDANCE TENDENCY DEFINITION DATA TABLE ~1300 ||
|---|---|
| SOCIAL BEHAVIOR LOG TYPE LABEL | APPROACH AND AVOIDANCE TENDENCY |
| Distance_Upperbody_Closeto | APPROACH TENDENCY |
| Distance_Upperbody_Farfrom | AVOIDANCE TENDENCY |
| Distance_Face_Closeto | APPROACH TENDENCY |
| Distance_Face_Farfrom | AVOIDANCE TENDENCY |
| Distance_Bodyparts_Closeto | APPROACH TENDENCY |
| Distance_Bodyparts_Farfrom | AVOIDANCE TENDENCY |
| Attention_Mutual | APPROACH TENDENCY |
| Attention_Avarted | AVOIDANCE TENDENCY |
| Attention_Joint | APPROACH TENDENCY |
| Attention_Following | APPROACH TENDENCY |
| Orientation_Face_Directto | APPROACH TENDENCY |
| Orientation_Face_Indirectto | AVOIDANCE TENDENCY |
| Orientation_Upperbody_Directto | APPROACH TENDENCY |
| Orientation_Upperbody_Indirectto | AVOIDANCE TENDENCY |
| Lean_Upperbody_Forward | APPROACH TENDENCY |
| Lean_Upperbody_Backward | AVOIDANCE TENDENCY |
| Gesture_Smileto | APPROACH TENDENCY |
| Gesture_Positivemeaninggestureto | APPROACH TENDENCY |
| Gesture_Negativemeaninggestureto | AVOIDANCE TENDENCY |
| : | : |

FIG. 14

| | | ~1400 |
|---|---|---|
| CONTROL DEFINITION DATA TABLE ON WHETHER REACTIVE SOCIAL BEHAVIOR FOR DIALOGUE STRATEGY IS PERMITTED | | |
| PERMISSION CONTROL CONDITION ID | PERMISSION CONTROL CONDITION | IMPLEMENTATION FLAG |
| 1 | Deny ALL; Allow ANY (shortly_*); | TRUE |
| 2 | Allow ALL; Deny ANY (Enforcing_Totally_*); | FALSE |

FIG. 16A

BEHAVIOR LOG UPDATE RECORDING TABLE ~1600

| DB RECORDING TIME | RECORDING START TIME | RECORDING UPDATE TIME | BEHAVING AVATAR ID | BEHAVIOR LOG TYPE LABEL | UPDATE MONITORING TARGET | UPDATE STATUS | DATA AT RECORDING START | DATA AT RECORDING UPDATE | SOCIAL BEHAVIOR LOG RECORDING ID REFERENCE VALUE |
|---|---|---|---|---|---|---|---|---|---|
| .. | .. | .. | .. | .. | .. | .. | .. | .. | .. |
| FEBRUARY 21, 2017 12:00:01.010 | FEBRUARY 21, 2017 12:00:00.000 | FEBRUARY 21, 2017 12:00:02.010 | AV1 | Orientation_Face | Bone_Head | NO CHANGE RECORD | null | null | |
| FEBRUARY 21, 2017 12:00:02.010 | FEBRUARY 21, 2017 12:00:00.000 | FEBRUARY 21, 2017 12:00:02.010 | AV1 | Orientation_Upperbody | Bone_Chest | CHANGE BEING RECORDED | ((2.24, 1.17, 1.68), (-2.40, 3.61, 2.74)) | ((2.24, 1.17, 1.68), (-2.40, 2.0, 2.74)) | 100 |
| FEBRUARY 21, 2017 12:00:02.020 | FEBRUARY 21, 2017 12:00:00.000 | FEBRUARY 21, 2017 12:00:02.020 | AV1 | Lean_Upperbody | Bone_Spine | CHANGE BEING RECORDED | ((-1.07, 0.87, 1.99), (22.35, -4.21, -7.15)) | ((-1.07, 0.87, 1.99), (25, -4.21, -7.15)) | 101 |
| FEBRUARY 21, 2017 12:00:03.010 | | | AV1 | Orientation_Upperbody | Bone_Chest | NO CHANGE RECORD | null | null | |
| FEBRUARY 21, 2017 12:00:03.020 | FEBRUARY 21, 2017 12:00:02.000 | FEBRUARY 21, 2017 12:00:03.000 | AV1 | Lean_Upperbody | Bone_Spine | CHANGE BEING RECORDED | ((-1.07, 0.87, 1.99), (25, -4.21, -7.15)) | ((-1.07, 0.87, 1.99), (30, -4.21, -7.15)) | 101 |
| FEBRUARY 21, 2017 12:00:04.010 | FEBRUARY 21, 2017 12:00:03.000 | FEBRUARY 21, 2017 12:00:04.000 | AV1 | Lean_Upperbody | Bone_Spine | CHANGE BEING RECORDED | ((-1.07, 0.87, 1.99), (30, -4.21, -7.15)) | ((-1.07, 0.87, 1.99), (35, -4.21, -7.15)) | 101 |
| .. | .. | .. | .. | .. | .. | .. | .. | .. | .. |

FIG. 16B

BEHAVIOR LOG UPDATE RECORDING TABLE ~1600

| DB RECORDING TIME | RECORDING START TIME | RECORDING UPDATE TIME | BEHAVING AVATAR ID | BEHAVIOR LOG TYPE LABEL | UPDATE MONITORING TARGET | UPDATE STATUS | DATA AT RECORDING START | DATA AT RECORDING UPDATE | SOCIAL BEHAVIOR LOG RECORDING ID REFERENCE VALUE |
|---|---|---|---|---|---|---|---|---|---|
| FEBRUARY 21, 2017 12:00:16.010 | FEBRUARY 21, 2017 12:00:16.000 | FEBRUARY 21, 2017 12:00:17.000 | AV1 | Gesture_NegativemeaningGesuture1 | Bone_Rightarm | CHANGE BEING RECORDED | ((-0.05, 1.47, -0.14), (0.37, 100.83, -41.40)) | ((-0.05, 1.47, -0.14), (5, 100.83, -41.40)) | 200 |
| FEBRUARY 21, 2017 12:00:16.012 | FEBRUARY 21, 2017 12:00:16.000 | FEBRUARY 21, 2017 12:00:17.000 | AV1 | Gesture_NegativemeaningGesuture1 | Bone_Rightforearm | CHANGE BEING RECORDED | ((-5.96, 2.23, -2.17), (44.38, 5.63, 9.83)) | ((-5.96, 2.23, -2.17), (90, 3, -50)) | 200 |
| FEBRUARY 21, 2017 12:00:16.014 | FEBRUARY 21, 2017 12:00:16.000 | FEBRUARY 21, 2017 12:00:17.000 | AV1 | Gesture_NegativemeaningGesuture1 | Bone_Righthand | CHANGE BEING RECORDED | ((3.98, 2.52, 7.15), (-2.39, 101.67, 3.14)) | ((3.98, 2.52, 7.15), (-2.39, 150, 3.14)) | 200 |
| FEBRUARY 21, 2017 12:00:16.016 | FEBRUARY 21, 2017 12:00:16.000 | FEBRUARY 21, 2017 12:00:17.000 | AV1 | Gesture_NegativemeaningGesuture1 | Bone_Leftarm | CHANGE BEING RECORDED | ((0.09, 1.53, -0.13), (3.30, -95.72, 40.74)) | ((0.09, 1.53, -0.13), (30, -50, 70)) | 200 |
| FEBRUARY 21, 2017 12:00:16.017 | FEBRUARY 21, 2017 12:00:16.000 | FEBRUARY 21, 2017 12:00:17.000 | AV1 | Gesture_NegativemeaningGesuture1 | Bone_Leftforearm | CHANGE BEING RECORDED | ((1.18, 2.25, -2.98), (39.83, -3.56, -5.81)) | ((0, 2.25, -2.98), (80, 80, 150)) | 200 |
| FEBRUARY 21, 2017 12:00:16.017 | FEBRUARY 21, 2017 12:00:16.000 | FEBRUARY 21, 2017 12:00:17.000 | AV1 | Gesture_NegativemeaningGesuture1 | Bone_Lefthand | CHANGE BEING RECORDED | ((0, 2.45, -3.58), (-30, -120, -9.55)) | ((0, 2.45, -3.58), (-30, -120, -9.55)) | .. |
| .. | .. | .. | .. | .. | .. | .. | .. | .. | .. |

FIG. 16C

BEHAVIOR LOG UPDATE RECORDING TABLE ~1600

| DB RECORDING TIME | RECORDING START TIME | RECORDING UPDATE TIME | BEHAVING AVATAR ID | BEHAVIOR LOG TYPE LABEL | UPDATE MONITORING TARGET | UPDATE STATUS | DATA AT RECORDING START | DATA AT RECORDING UPDATE | SOCIAL BEHAVIOR LOG RECORDING ID REFERENCE VALUE |
|---|---|---|---|---|---|---|---|---|---|
| FEBRUARY 21, 2017 12:00:19.010 | FEBRUARY 21, 2017 12:00:18.000 | FEBRUARY 21, 2017 12:00:19.000 | AV1 | Gesture_Negativemeaning Gesuture1 | Bone_Rightarm | NO CHANGE RECORD | null | null | 200 |
| FEBRUARY 21, 2017 12:00:19.012 | FEBRUARY 21, 2017 12:00:18.000 | FEBRUARY 21, 2017 12:00:19.000 | AV1 | Gesture_Negativemeaning Gesuture1 | Bone_Rightforearm | NO CHANGE RECORD | null | null | 200 |
| FEBRUARY 21, 2017 12:00:19.014 | FEBRUARY 21, 2017 12:00:18.000 | FEBRUARY 21, 2017 12:00:19.000 | AV1 | Gesture_Negativemeaning Gesuture1 | Bone_Righthand | NO CHANGE RECORD | null | null | 200 |
| FEBRUARY 21, 2017 12:00:19.016 | FEBRUARY 21, 2017 12:00:18.000 | FEBRUARY 21, 2017 12:00:19.000 | AV1 | Gesture_Negativemeaning Gesuture1 | Bone_Leftarm | NO CHANGE RECORD | null | null | 200 |
| FEBRUARY 21, 2017 12:00:19.017 | FEBRUARY 21, 2017 12:00:18.000 | FEBRUARY 21, 2017 12:00:19.000 | AV1 | Gesture_Negativemeaning Gesuture1 | Bone_Leftforearm | NO CHANGE RECORD | null | null | 200 |
| FEBRUARY 21, 2017 12:00:19.017 | FEBRUARY 21, 2017 12:00:18.000 | FEBRUARY 21, 2017 12:00:19.000 | AV1 | Gesture_Negativemeaning Gesuture1 | Bone_Lefthand | NO CHANGE RECORD | null | null | 200 |
| .. | .. | .. | .. | .. | .. | .. | .. | .. | .. |

FIG. 16D

BEHAVIOR LOG UPDATE RECORDING TABLE ~1600

| DB RECORDING TIME | RECORDING START TIME | RECORDING UPDATE TIME | BEHAVING AVATAR ID | BEHAVIOR LOG TYPE LABEL | UPDATE MONITORING TARGET | UPDATE STATUS | DATA AT RECORDING START | DATA AT RECORDING UPDATE | SOCIAL BEHAVIOR LOG RECORDING ID REFERENCE VALUE |
|---|---|---|---|---|---|---|---|---|---|
| FEBRUARY 21, 2017 12:00:30.010 | FEBRUARY 21, 2017 12:00:29.000 | FEBRUARY 21, 2017 12:00:30.000 | AV1 | Gesture_NegativemeaningGesture1 | Bone_Rightarm | NO CHANGE RECORD | null | null | 200 |
| FEBRUARY 21, 2017 12:00:30.012 | FEBRUARY 21, 2017 12:00:29.000 | FEBRUARY 21, 2017 12:00:30.000 | AV1 | Gesture_NegativemeaningGesture1 | Bone_Rightforearm | CHANGE BEING RECORDED | ((-5.96, 2.23, -2.17), (40, 80, -70)) | ((-5.96, 2.23, -2.17), (45, 6, 10)) | 200 |
| FEBRUARY 21, 2017 12:00:30.014 | FEBRUARY 21, 2017 12:00:29.000 | FEBRUARY 21, 2017 12:00:30.000 | AV1 | Gesture_NegativemeaningGesture1 | Bone_Righthand | CHANGE BEING RECORDED | ((-5.96, 2.23, -2.17), (70, 10, -50)) | ((3.98, 2.52, 7.15), (-2.39, 100, 3.14)) | 200 |
| FEBRUARY 21, 2017 12:00:30.016 | FEBRUARY 21, 2017 12:00:29.000 | FEBRUARY 21, 2017 12:00:30.000 | AV1 | Gesture_NegativemeaningGesture1 | Bone_Leftarm | NO CHANGE RECORD | null | null | 200 |
| FEBRUARY 21, 2017 12:00:30.017 | FEBRUARY 21, 2017 12:00:29.000 | FEBRUARY 21, 2017 12:00:30.000 | AV1 | Gesture_NegativemeaningGesture1 | Bone_Leftforearm | CHANGE BEING RECORDED | ((1.18, 2.25, -2.98), (100, 10, 100)) | ((1.18, 2.25, -2.98), (40, -3, -5)) | 200 |
| FEBRUARY 21, 2017 12:00:30.017 | FEBRUARY 21, 2017 12:00:29.000 | FEBRUARY 21, 2017 12:00:30.000 | AV1 | Gesture_NegativemeaningGesture1 | Bone_Lefthand | CHANGE BEING RECORDED | ((0, 2.45, -3.58), (-40, -30, -9.55)) | ((0, 2.45, -3.58), (-30, -120, -6)) | 200 |
| ... | ... | ... | ... | ... | ... | ... | ... | ... | ... |

FIG. 17

SOCIAL BEHAVIOR LOG RECORDING TABLE ~1700

| DB RECORDING TIME | RECORDING START TIME | RECORDING END TIME | BEHAVING AVATAR ID | BEHAVED AVATAR ID | SOCIAL BEHAVIOR LOG RECORDING ID | SOCIAL BEHAVIOR TYPE LABEL | BEHAVIOR LOG TYPE LABEL |
|---|---|---|---|---|---|---|---|
| .. | .. | .. | .. | .. | .. | .. | .. |
| FEBRUARY 21, 2017 12:00:03.015 | FEBRUARY 21, 2017 12:00:00.000 | FEBRUARY 21, 2017 12:00:02.000 | AV1 | AV2 | 100 | Orientation_Upperbody_Directto | Orientation_Upperbody |
| FEBRUARY 21, 2017 12:00:05.018 | FEBRUARY 21, 2017 12:00:00.000 | FEBRUARY 21, 2017 12:00:05.000 | AV1 | null | 101 | Lean_Upperbody_Forward | Lean_Upperbody |
| .. | .. | .. | .. | .. | .. | .. | .. |
| FEBRUARY 21, 2017 12:00:15.018 | FEBRUARY 21, 2017 12:00:05.000 | FEBRUARY 21, 2017 12:00:06.000 | AV1 | AV2 | 199 | Gesture_PositivemeaningGesture | Gesture_PositivemeaningGesture1 |
| FEBRUARY 21, 2017 12:00:36.019 | FEBRUARY 21, 2017 12:00:16.000 | FEBRUARY 21, 2017 12:00:36.000 | AV1 | AV2 | 200 | Gesture_NegativemeaningGesutere | Gesture_NegativemeaningGesutere1 |
| .. | .. | .. | .. | .. | .. | .. | .. |
| FEBRUARY 21, 2017 12:00:40.017 | FEBRUARY 21, 2017 12:00:39.000 | FEBRUARY 21, 2017 12:00:40.000 | AV1 | AV2 | 250 | Distance_Bodyparts_Closeto | Distance_Bodyparts |
| .. | .. | .. | .. | .. | .. | .. | .. |

FIG. 18A

SOCIAL BEHAVIOR VALUE CALCULATION RECORDING TABLE 1800

| DB RECORDING TIME | RECORDING START TIME | RECORDING END TIME | BEHAVING AVATAR ID | BEHAVED AVATAR ID | SOCIAL BEHAVIOR LOG RECORDING ID | SOCIAL BEHAVIOR TYPE LABEL | INTENSITY OF SOCIAL BEHAVIOR | ATTRIBUTE VALUE OF SOCIAL BEHAVIOR | CONTINUED SECONDS OF SOCIAL BEHAVIOR | SOCIAL BEHAVIOR APPROACH AND AVOIDANCE TENDENCY | INFORMATION DISCLOSURE BY NON-VERBAL ACTION (WHETHER OR NOT THERE IS TOUCH ON BODY) | INFORMATION DISCLOSURE BY NON-VERBAL ACTION (WHETHER INTENTION AND DEMEANOR (EXPRESSION OR THE LIKE) ARE PRESENTED) | INFORMATION DISCLOSED BY NON-VERBAL ACTION (WHETHER OR NOT THERE IS TOUCH ON BODY) | INFORMATION DISCLOSED BY NON-VERBAL ACTION (WHETHER OR NOT INTENTION AND DEMEANOR (EXPRESSION OR THE LIKE) ARE PRESENTED) |
|---|---|---|---|---|---|---|---|---|---|---|---|---|---|---|
| .. | .. | .. | .. | .. | .. | .. | .. | .. | .. | .. | .. | .. | .. | .. |
| FEBRUARY 21, 2017 11:50:01.055 | FEBRUARY 21, 2017 11:50:00.030 | FEBRUARY 21, 2017 11:50:01.050 | AV2 | AV1 | 75 | Gesture_Positivemeaning_Gesture | 3 | 1 | 1 | APPROACH TENDENCY | NO | YES | NO | .. |
| .. | .. | .. | .. | .. | .. | .. | .. | .. | .. | .. | .. | .. | .. | .. |
| FEBRUARY 21, 2017 11:54:59.720 | FEBRUARY 21, 2017 11:54:13.055 | FEBRUARY 21, 2017 11:54:58.312 | AV2 | AV1 | 80 | Attention_joint | 3 | 1 | 45 | APPROACH TENDENCY | NO | YES | NO | NO |
| .. | .. | .. | .. | .. | .. | .. | .. | .. | .. | .. | .. | .. | .. | .. |
| FEBRUARY 21, 2017 12:00:03.017 | FEBRUARY 21, 2017 12:00:00.000 | FEBRUARY 21, 2017 12:00:02.000 | AV2 | AV1 | 99 | Orientation_Upperbody_Directto | 5 | 10 | 9 | APPROACH TENDENCY | NO | YES | NO | NO |
| FEBRUARY 21, 2017 12:00:03.018 | FEBRUARY 21, 2017 12:00:00.000 | FEBRUARY 21, 2017 12:00:02.000 | AV1 | AV2 | 100 | Orientation_Upperbody_Directto | 5 | 10 | 2 | APPROACH TENDENCY | NO | NO | NO | NO |
| FEBRUARY 21, 2017 12:00:05.020 | FEBRUARY 21, 2017 12:00:00.000 | FEBRUARY 21, 2017 12:00:05.000 | AV1 | AV2 | 101 | Lean_Upperbody_Forward | 5 | 60 | 5 | APPROACH TENDENCY | NO | NO | NO | NO |
| .. | .. | .. | .. | .. | .. | .. | .. | .. | .. | .. | .. | .. | .. | .. |

FIG. 18B

SOCIAL BEHAVIOR VALUE CALCULATION RECORDING TABLE 1800

| DB RECORDING TIME | RECORDING START TIME | RECORDING END TIME | BEHAVING AVATAR ID | BEHAVED AVATAR ID | SOCIAL BEHAVIOR LOG RECORDING ID | SOCIAL BEHAVIOR TYPE LABEL | INTENSITY OF SOCIAL BEHAVIOR | ATTRIBUTE VALUE OF SOCIAL BEHAVIOR | CONTINUED SECONDS OF SOCIAL BEHAVIOR | SOCIAL BEHAVIOR APPROACH AND AVOIDANCE TENDENCY | INFORMATION DISCLOSURE BY NON-VERBAL ACTION (WHETHER OR NOT THERE IS TOUCH ON BODY) | INFORMATION DISCLOSURE BY NON-VERBAL ACTION (WHETHER INTENTION AND DEMEANOR (EXPRESSION OR THE LIKE) ARE PRESENTED) | INFORMATION DISCLOSED BY NON-VERBAL ACTION (WHETHER OR NOT THERE IS TOUCH ON BODY) | INFORMATION DISCLOSED BY NON-VERBAL ACTION (WHETHER OR NOT INTENTION AND DEMEANOR (EXPRESSION OR THE LIKE) ARE PRESENTED) |
|---|---|---|---|---|---|---|---|---|---|---|---|---|---|---|
| FEBRUARY 21, 2017 12:00:15.020 | FEBRUARY 21, 2017 12:00:05.000 | FEBRUARY 21, 2017 12:00:06.000 | AV1 | AV2 | 199 | Gesture_Positivemeaning Gesture | 1 | 2 | 1 | APPROACH TENDENCY | NO | YES | NO | NO |
| FEBRUARY 21, 2017 12:00:36.020 | FEBRUARY 21, 2017 12:00:16.000 | FEBRUARY 21, 2017 12:00:36.000 | AV1 | AV2 | 200 | Gesture_Negativemeaning Gesuture | 3 | null | 20 | AVOIDANCE TENDENCY | NO | YES | NO | YES |
| .. | .. | .. | .. | .. | .. | .. | .. | .. | .. | .. | .. | .. | .. | .. |
| FEBRUARY 21, 2017 12:00:40.020 | FEBRUARY 21, 2017 12:00:39.000 | FEBRUARY 21, 2017 12:00:40.000 | AV2 | AV1 | 250 | Distance_Bodyparts_Close to | 5 | 7 | 10 | APPROACH TENDENCY | YES | NO | YES | NO |
| .. | .. | .. | .. | .. | .. | .. | .. | .. | .. | .. | .. | .. | .. | .. |
| JULY 25, 2017 13:00:30.075 | JULY 25, 2017 13:00:30.000 | JULY 25, 2017 13:00:30.070 | AV2 | AV1 | 25001 | Gesture_Positivemeaning Gesture | 1 | 2 | 1 | APPROACH TENDENCY | NO | NO | NO | NO |
| JULY 25, 2017 13:00:32.056 | JULY 25, 2017 13:00:30.080 | JULY 25, 2017 13:00:32.051 | AV2 | AV1 | 25002 | Orientation_Face_Indirect to | 3 | 6 | 2 | APPROACH TENDENCY | NO | NO | NO | NO |
| JULY 25, 2017 13:00:40.058 | JULY 25, 2017 13:00:31.052 | JULY 25, 2017 13:00:40.051 | AV2 | AV1 | 25003 | Attention_joint | 5 | 5 | 9 | APPROACH TENDENCY | NO | NO | NO | YES |
| .. | .. | .. | .. | .. | .. | .. | .. | .. | .. | .. | .. | .. | .. | .. |

FIG. 19

| DB RECORDING TIME | BEHAVING AVATAR ID | BEHAVED AVATAR ID | DIALOGUE STRATEGY |
|---|---|---|---|
| : | : | : | : |
| FEBRUARY 21, 2017 12:01:00.040 | AV2 | AV1 | Shortly_negative STRATEGY |
| : | : | : | : |
| JULY 25, 2017 13:00:29.080 | AV2 | AV1 | Totally_positive STRATEGY |
| : | : | : | : |

DIALOGUE STRATEGY DETERMINATION RECORDING TABLE ~1900

FIG. 21

TEMPORAL INTERVAL SOCIAL BEHAVIOR ACTION TENDENCY AMOUNT THRESHOLD DEFINITION DATA TABLE 2100

| CATEGORY ID | ACTION TENDENCY | THRESHOLD (RATIO OF FREQUENCY) | THRESHOLD (RATIO OF TIME [SECONDS]) |
|---|---|---|---|
| .. | .. | .. | .. |
| 1 | APPROACH ACTION TENDENCY | ACTION TENDENCY AMOUNT ≥ 0.55 | ACTION TENDENCY AMOUNT ≥ 0.20 |
| 1 | AVOIDANCE ACTION TENDENCY | ACTION TENDENCY AMOUNT ≥ 0.55 | ACTION TENDENCY AMOUNT ≥ 0.10 |
| 1 | INTERMEDIATE ACTION TENDENCY | (APPROACH ACTION TENDENCY &&AVOIDANCE ACTION TENDENCY)\|\| (NOT APPROACH ACTION TENDENCY &&NOT AVOIDANCE ACTION TENDENCY) | (APPROACH ACTION TENDENCY &&AVOIDANCE ACTION TENDENCY)\|\| (NOT APPROACH ACTION TENDENCY &&NOT AVOIDANCE ACTION TENDENCY) |
| .. | .. | .. | .. |

FIG. 23

TEMPORAL INTERVAL SOCIAL BEHAVIOR ACTION TENDENCY AMOUNT RECORDING TABLE ~2300

| DB RECORDING TIME | START TIME OF JUDGMENT RANGE | END TIME OF JUDGMENT RANGE | BEHAVING AVATAR ID | BEHAVED AVATAR ID | APPROACH ACTION TENDENCY AMOUNT (FREQUENCY) | AVOIDANCE ACTION TENDENCY AMOUNT (FREQUENCY) | APPROACH ACTION TENDENCY AMOUNT (TIME [SECONDS]) | AVOIDANCE ACTION TENDENCY AMOUNT (TIME [SECONDS]) | APPROACH ACTION TENDENCY AMOUNT (RATIO OF FREQUENCY) | AVOIDANCE ACTION TENDENCY AMOUNT (RATIO OF FREQUENCY) | APPROACH ACTION TENDENCY AMOUNT (RATIO OF TIME [SECONDS]) | AVOIDANCE ACTION TENDENCY AMOUNT (RATIO OF TIME [SECONDS]) |
|---|---|---|---|---|---|---|---|---|---|---|---|---|
| .. | .. | .. | .. | .. | .. | .. | .. | .. | .. | .. | .. | .. |
| FEBRUARY 21, 2017 12:01:00.030 | FEBRUARY 21, 2017 12:00:00.000 | FEBRUARY 21, 2017 12:01:00.000 | AV1 | AV2 | 10 | 12 | 11 | 15 | 0.45 | 0.55 | 0.18 | 0.25 |
| .. | .. | .. | .. | .. | .. | .. | .. | .. | .. | .. | .. | .. |

FIG. 24

TEMPORAL INTERVAL SOCIAL BEHAVIOR ACTION TENDENCY RECORDING TABLE ~2400

| DB RECORDING TIME | START TIME OF JUDGMENT RANGE | END TIME OF JUDGMENT RANGE | BEHAVING AVATAR ID | BEHAVED AVATAR ID | SOCIAL BEHAVIOR ACTION TENDENCY |
|---|---|---|---|---|---|
| FEBRUARY 21, 2017 12:01:00.030 | FEBRUARY 21, 2017 12:00:00.000 | FEBRUARY 21, 2017 12:01:00.000 | AV1 | AV2 | INTERMEDIATE ACTION TENDENCY |
| FEBRUARY 21, 2017 12:01:00.030 | FEBRUARY 21, 2017 12:00:00.000 | FEBRUARY 21, 2017 12:01:00.000 | AV2 | AV1 | AVOIDANCE ACTION TENDENCY |
| .. | .. | .. | .. | .. | .. |

FIG. 25

COOPERATIVE ACTION POSSIBILITY JUDGMENT RECORDING TABLE ~2500

| DB RECORDING TIME | START TIME OF JUDGMENT RANGE | END TIME OF JUDGMENT RANGE | BEHAVING AVATAR ID | BEHAVED AVATAR ID | COOPERATIVE ACTION POSSIBILITY |
|---|---|---|---|---|---|
| FEBRUARY 21, 2017 12:01:00.030 | FEBRUARY 21, 2017 12:00:00.000 | FEBRUARY 21, 2017 12:01:00.000 | AV1 | AV2 | High |
| FEBRUARY 21, 2017 12:01:00.030 | FEBRUARY 21, 2017 12:00:00.000 | FEBRUARY 21, 2017 12:01:00.000 | AV2 | AV1 | High |
| : | : | : | : | : | : |

FIG. 26

SOCIAL BEHAVIOR ACCEPTABILITY JUDGMENT RECORDING TABLE 2600

| DB RECORDING TIME | START TIME OF JUDGMENT RANGE | END TIME OF JUDGMENT RANGE | BEHAVING AVATAR ID | BEHAVED AVATAR ID | SOCIAL BEHAVIOR ACTION TENDENCY | COOPERATIVE ACTION POSSIBILITY | SOCIAL BEHAVIOR ACCEPTABILITY |
|---|---|---|---|---|---|---|---|
| FEBRUARY 21, 2017 12:01:00.030 | FEBRUARY 21, 2017 12:00:00.000 | FEBRUARY 21, 2017 12:01:00.000 | AV1 | AV2 | INTERMEDIATE ACTION TENDENCY | High | Acceptable |
| FEBRUARY 21, 2017 12:01:00.030 | FEBRUARY 21, 2017 12:00:00.000 | FEBRUARY 21, 2017 12:01:00.000 | AV2 | AV1 | AVOIDANCE ACTION TENDENCY | High | Not acceptable |
| .. | .. | .. | .. | .. | .. | .. | .. |

FIG. 27

RECORDING TABLE OF DIALOGUE STRATEGY DETERMINATION CORRESPONDING TO SOCIAL BEHAVIOR ACCEPTABILITY ~2700

| DB RECORDING TIME | START TIME OF JUDGMENT RANGE | END TIME OF JUDGMENT RANGE | BEHAVING AVATAR ID | BEHAVED AVATAR ID | DIALOGUE STRATEGY |
|---|---|---|---|---|---|
| FEBRUARY 21, 2017 12:01:00.030 | FEBRUARY 21, 2017 12:00:00.000 | FEBRUARY 21, 2017 12:01:00.000 | AV1 | AV2 | positive STRATEGY (default) |
| FEBRUARY 21, 2017 12:01:00.030 | FEBRUARY 21, 2017 12:00:00.000 | FEBRUARY 21, 2017 12:01:00.000 | AV2 | AV1 | shortly_negative STRATEGY |
| .. | .. | .. | .. | .. | .. |

FIG. 29

| DIALOGUE STRATEGY DEFINITION DATA TABLE PER RELATIONSHIP LEVEL | | |
|---|---:|---|
| RELATIONSHIP LEVEL | DISTANCE FROM DEFAULT STRATEGY | DIALOGUE STRATEGY |
| 0_superficial | 3 | Sunnyly_positive STRATEGY |
| 0_superficial | 2 | Sunnyly_shortly_positive STRATEGY |
| 0_superficial | 0 | Shortly_positive STRATEGY |
| 0_superficial | −1 | Minimaly_positive STRATEGY |
| 0_superficial | −2 | Minimaly_shortly_positive STRATEGY |
| 1_intimate | 3 | Openly_positive STRATEGY |
| 1_intimate | 2 | Openly_shortly_positive STRATEGY |
| 1_intimate | 1 | Sunnyly_positive STRATEGY |
| 1_intimate | 0 | Sunnyly_shortly_positive STRATEGY |
| 1_intimate | −1 | Totally_positive STRATEGY |
| 1_intimate | −4 | Stressfuly_positive STRATEGY |
| 1_intimate | −5 | Stressfuly_shortly_positive STRATEGY |
| 1_intimate | −6 | Shortly_negative STRATEGY |
| 1_intimate | −7 | Totally_negative STRATEGY |
| 2_personal | 7 | Agressively_positive STRATEGY |
| 2_personal | 6 | Agressively_shortly_positive STRATEGY |
| 2_personal | 4 | Openly_positive STRATEGY |
| 2_personal | 2 | Sunnyly_positive STRATEGY |
| 2_personal | 0 | Totally_positive STRATEGY |
| 2_personal | −8 | Strongly_negative STRATEGY |
| 2_personal | −9 | Strongly_shortly_negative STRATEGY |
| 2_personal | −10 | Totally_negative STRATEGY |

SPEECH VALUE CALCULATION RECORDING TABLE 3100

| DB RECORDING TIME | RECORDING START TIME | RECORDING END TIME | BEHAVING AVATAR ID | BEHAVED AVATAR ID | SPOKEN VOICE | RECEIVED VOICE | SPOKEN TEXT | RECEIVED TEXT | INFORMATION DISCLOSURE FREQUENCY BASED ON PERSONAL INFORMATION | INFORMATION DISCLOSURE FREQUENCY BASED ON GENERAL TOPIC | INFORMATION DISCLOSED FREQUENCY BASED ON PERSONAL INFORMATION | INFORMATION DISCLOSED FREQUENCY BASED ON GENERAL TOPIC |
|---|---|---|---|---|---|---|---|---|---|---|---|---|
| ... | ... | ... | ... | ... | ... | ... | ... | ... | ... | ... | ... | ... |
| FEBRUARY 21, 2017 11:50:02.085 | FEBRUARY 21, 2017 11:50:00.042 | FEBRUARY 21, 2017 11:50:02.080 | AV1 | AV2 | U1-2017020 21115000 042.wav | U2-2017020 21115000 042.wav | Correct. My name is Taro. | Correct. My name is Taro. | 1 | 0 | 1 | 0 |
| FEBRUARY 21, 2017 11:50:02.085 | FEBRUARY 21, 2017 11:50:12.120 | FEBRUARY 21, 2017 11:50:15.870 | AV2 | AV1 | U2-2017020 21115012 120.wav | U1-2017020 21115012 120.wav | OK, Taro, Paying at the table is common in my country. | OK, Taro, paying got the table. It's common in my country. | 0 | 1 | 0 | 0 |
| FEBRUARY 21, 2017 11:50:02.085 | FEBRUARY 21, 2017 11:50:16.200 | FEBRUARY 21, 2017 11:50:30.050 | AV2 | AV1 | U2-2017020 21115016 200.wav | U1-2017020 21115016 200.wav | Which do you prefer in general? | Which do you prefer in general? | 0 | 0 | 0 | 0 |
| ... | ... | ... | ... | ... | ... | ... | ... | ... | ... | ... | ... | ... |

FIG. 33

RECORDING TABLE OF INFORMATION DISCLOSURE AMOUNT TO DIALOGUE PARTNER ~3300

| DB RECORDING TIME | RECORDING START TIME | RECORDING END TIME | BEHAVING AVATAR ID | BEHAVED AVATAR ID | INFORMATION DISCLOSURE AMOUNT | INFORMATION DISCLOSURE SCORE BASED ON NON-VERBAL ACTION | INFORMATION DISCLOSURE SCORE BASED ON VERBAL ACTION |
|---|---|---|---|---|---|---|---|
| : | : | : | : | : | : | : | : |
| JULY 21, 2017 11:55:00.001 | FEBRUARY 21, 2017 11:50:00.000 | FEBRUARY 21, 2017 11:55:00.000 | AV2 | AV1 | 11 | 10 | 1 |
| JULY 21, 2017 11:55:00.002 | FEBRUARY 21, 2017 11:50:00.000 | FEBRUARY 21, 2017 11:55:00.000 | AV1 | AV2 | 10 | 5 | 5 |
| : | : | : | : | : | : | : | : |

FIG. 34

JUDGMENT RECORDING TABLE OF RELATIONSHIP LEVEL CONSIDERED TO DIALOGUE PARTNER ~3400

| DB RECORDING TIME | RECORDING START TIME | RECORDING END TIME | BEHAVING AVATAR ID | BEHAVED AVATAR ID | CUMULATIVE INFORMATION DISCLOSURE AMOUNT | RELATIONSHIP LEVEL CONSIDERING DIALOGUE PARTNER APPROPRIATE |
|---|---|---|---|---|---|---|
| : | : | : | : | : | : | : |
| FEBRUARY 21, 2017 11:50:00.001 | FEBRUARY 21, 2017 11:45:00.000 | FEBRUARY 21, 2017 11:50:00.000 | AV2 | AV1 | 5 | 0_superficial |
| FEBRUARY 21, 2017 11:55:00.002 | FEBRUARY 21, 2017 11:50:00.000 | FEBRUARY 21, 2017 11:55:00.000 | AV2 | AV1 | 16 | 0_superficial |
| : | : | : | : | : | : | : |
| JULY 21, 2017 11:50:00.001 | JULY 21, 2017 11:45:00.000 | JULY 21, 2017 11:50:00.000 | AV2 | AV1 | 5 | 1_intimate |
| JULY 21, 2017 11:55:00.002 | JULY 21, 2017 11:50:00.000 | JULY 21, 2017 11:55:00.000 | AV2 | AV1 | 20 | 1_intimate |
| : | : | : | : | : | : | : |

FIG. 35

RELATIONSHIP PROGRESS DEGREE RECORDING TABLE ~3500

| DB RECORDING TIME | RECORDING START TIME | RECORDING END TIME | BEHAVING AVATAR ID | BEHAVED AVATAR ID | RELATIONSHIP LEVEL CONSIDERING DIALOGUE PARTNER APPROPRIATE | RELATIONSHIP PROGRESS DEGREE |
|---|---|---|---|---|---|---|
| .. | .. | .. | .. | .. | .. | .. |
| FEBRUARY 21, 2017 11:50:00.003 | FEBRUARY 21, 2017 11:45:00.000 | FEBRUARY 21, 2017 11:50:00.000 | AV2 | AV1 | 0_superficial | 5% |
| FEBRUARY 21, 2017 11:55:00.004 | FEBRUARY 21, 2017 11:50:00.000 | FEBRUARY 21, 2017 11:55:00.000 | AV2 | AV1 | 0_superficial | 16% |
| .. | .. | .. | .. | .. | .. | .. |
| JULY 21, 2017 11:50:00.003 | JULY 21, 2017 11:45:00.000 | JULY 21, 2017 11:50:00.000 | AV2 | AV1 | 1_intimate | 1% |
| JULY 21, 2017 11:55:00.005 | JULY 21, 2017 11:50:00.000 | JULY 21, 2017 11:55:00.000 | AV2 | AV1 | 1_intimate | 2% |
| .. | .. | .. | .. | .. | .. | .. |

FIG. 37

| DB RECORDING TIME | RECORDING START TIME | RECORDING END TIME | BEHAVING AVATAR ID | BEHAVED AVATAR ID | INFORMATION DISCLOSED AMOUNT | INFORMATION DISCLOSED SCORE BASED ON NON-VERBAL ACTION | INFORMATION DISCLOSED SCORE BASED ON VERBAL ACTION |
|---|---|---|---|---|---|---|---|
| ⋮ | ⋮ | ⋮ | ⋮ | ⋮ | ⋮ | ⋮ | ⋮ |
| JULY 21, 2017 11:55:00.005 | FEBRUARY 21, 2017 11:50:00.000 | FEBRUARY 21, 2017 11:55:00.000 | AV2 | AV1 | 10 | 10 | 0 |
| JULY 21, 2017 11:55:00.007 | FEBRUARY 21, 2017 11:50:00.000 | FEBRUARY 21, 2017 11:55:00.000 | AV1 | AV2 | 10 | 5 | 5 |
| ⋮ | ⋮ | ⋮ | ⋮ | ⋮ | ⋮ | ⋮ | ⋮ |

RECORDING TABLE OF INFORMATION DISCLOSED AMOUNT FROM DIALOGUE PARTNER ~3700

FIG. 38

RELATEDNESS LEVEL ESTIMATION RECORDING TABLE CONSIDERING DIALOGUE PARTNER APPROPRIATE BASED ON INFORMATION DISCLOSED AMOUNT FROM DIALOGUE PARTNER ~3800

| DB RECORDING TIME | RECORDING START TIME | RECORDING END TIME | BEHAVING AVATAR ID | BEHAVED AVATAR ID | CUMULATIVE INFORMATION DISCLOSED AMOUNT | RELATEDNESS LEVEL CONSIDERING DIALOGUE PARTNER APPROPRIATE |
|---|---|---|---|---|---|---|
| ... | ... | ... | ... | ... | ... | ... |
| FEBRUARY 21, 2017 11:50:00.009 | FEBRUARY 21, 2017 11:45:00.000 | FEBRUARY 21, 2017 11:50:00.000 | AV1 | AV2 | 5 | 0_superficial |
| FEBRUARY 21, 2017 11:55:00.010 | FEBRUARY 21, 2017 11:50:00.000 | FEBRUARY 21, 2017 11:55:00.000 | AV1 | AV2 | 15 | 0_superficial |
| ... | ... | ... | ... | ... | ... | ... |
| JULY 21, 2017 11:50:00.007 | JULY 21, 2017 11:45:00.000 | JULY 21, 2017 11:50:00.000 | AV1 | AV2 | 25 | 0_superficial |
| JULY 21, 2017 11:55:00.008 | JULY 21, 2017 11:50:00.000 | JULY 21, 2017 11:55:00.000 | AV1 | AV2 | 27 | 0_superficial |
| ... | ... | ... | ... | ... | ... | ... |

FIG. 41

RECORDING TABLE OF DIALOGUE STRATEGY DETERMINATION CORRESPONDING TO RELATIONSHIP LEVEL — 4100

| DB RECORDING TIME | BEHAVING AVATAR ID | BEHAVED AVATAR ID | RELATIONSHIP ADJUSTMENT DIRECTION CONTROL | DIALOGUE STRATEGY |
|---|---|---|---|---|
| FEBRUARY 21, 2017 11:50:00.010 | AV2 | AV1 | - | Minimaly_positive STRATEGY |
| .. | .. | .. | .. | .. |

FIG. 43

REACTIVE SOCIAL BEHAVIOR DEFINITION DATA TABLE PER DIALOGUE STRATEGY — 4300

| DIALOGUE STRATEGY | PERMISSION CONTROL CONDITION OF REACTIVE SOCIAL BEHAVIOR | RECOMMENDED SOCIAL BEHAVIOR AND SOCIAL BEHAVIOR GROUP |
|---|---|---|
| ⋮ | ⋮ | ⋮ |
| Minimaly_positive STRATEGY | Deny ALL; Allow ANY(Gesture_positivemeaningGesture, Type = nod, Attributescore < 2;); | Approaching_seqRefreshJointandCare |
| Minimaly_shortly_positive STRATEGY | Deny ALL; Allow ANY(Orientation_Face_*;); | Approaching_seqMoveandMutualtry |
| ⋮ | ⋮ | ⋮ |
| Shortly_positive STRATEGY | Allow ALL; | Approaching_seqNodandCare |
| Stressfuly_positive STRATEGY | Deny ALL; Allow ANY(Orientation_*, Intention < 3;); | Approaching_seqMoveQuestioningandMutualtry |
| Stressfully_shortly_positive STRATEGY | Allow ALL; | Approaching_seqMoveQuestioningandMutualtry |
| Strongly_negative STRATEGY | Allow ALL; | Avoiding_seqMoveandOppsitegesture |
| Strongly_shortly_negative STRATEGY | Allow ALL; | Avoiding_seqOppsitegestureandAttentivemorethanpast |
| Sunnyly_positive STRATEGY | Deny ALL; Allow ANY(Attention_*;); | Approaching_MoveatClose |
| Sunnyly_shortly_positive STRATEGY | Deny ALL;Allow ANY (Gesture_NegativemeaningGesutere, Duration > 10;); | Approaching_seqCare |
| Totally_negative STRATEGY | Allow ALL;Deny ANY (Gesture_NegativemeaningGesutere;); | Avoiding_seqNeg |
| Totally_positive STRATEGY |  | Approaching_seqStandard |
| ⋮ | ⋮ | ⋮ |

FIG. 44

| SOCIAL BEHAVIOR GROUP DEFINITION DATA TABLE | 4400 |
|---|---|
| SOCIAL BEHAVIOR GROUP | COMPONENT |
| : | : |
| Approaching_ seqStandard | (OR<br>(SEQ<br>(Gesture_Positivemeaninggestureto, type = nod)<br>(Avoiding_seqKeepaway)<br>)<br>(SEQ<br>(Approaching_seqMutualtry)<br>(SEQ ANYORDER<br>(Lean_Backward)<br>(Gesture_Positivemeaninggestureto, type = nod))<br>)<br>(Approaching_seqMutualtry)<br>) |
| Avoiding_ seqKeepaway | (SEQ<br>(Orientation_Face_Indirectto)<br>(Orientation_Upperbody_Indirectto)<br>) |
| Approaching_ seqMutualtry | (SEQ<br>(SEQ<br>(SEQ ANY (Orientation_UpperBody_Directto))<br>(SEQ ANY<br>(Orientation_Face_Directto)<br>(Orientation_Face_Directto)<br>)<br>(SEQ ANY (Orientation_UB_Directto))<br>)<br>(SEQ ANY (Attention_Mutual))<br>(SEQ<br>(SEQ ANY (Orientation_Face_Directto))<br>(SEQ ANY (Lean_Backward))<br>(SEQ ANY<br>(Distance_BodyParts_Closeto, type=closeside_upper_arm)<br>(Distance_BodyParts_Farfrom, type=closeside_upper_arm)<br>)<br>(SEQ ANY (Gesture_Positivemeaninggestureto, type = smile))<br>(SEQ ANY (Orientation_Face_Indirectto))<br>)<br>) |
| : | : |

FIG. 45

| APPROACH AND AVOIDANCE TENDENCY EVALUATION VALUE DEFINITION DATA TABLE OF SOCIAL BEHAVIOR AND SOCIAL BEHAVIOR GROUP ~4500 | |
|---|---|
| APPROACH AND AVOIDANCE TENDENCY EVALUATION VALUE | APPROACH AND AVOIDANCE TENDENCY EVALUATION VALUE DETERMINATION CONDITION |
| 1 | Approaching_* if (duration < 1); Avoiding_* if (duration < 2); |
| 2 | Approaching_* if ((duration >= 1) AND (duration <3)); Avoiding_* if ((duration >= 2) AND (duration < 3)); |
| 3 | default |
| 4 | Approaching_* if (duration >= 3); Avoiding_* if (duration >= 3); Avoiding_seqKeepaway; |
| 5 | Approaching_* if (intention >= 7); Avoiding_* if (intention >= 7); Avoiding_seqNeg; |

FIG. 48

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | Avoiding_seqKeepaway | 108 | 1 | TRUE | FALSE | Approaching_seqStandard |
| 108 | (SEQ (Orientation_Face_Indirectto) (Orientation_Upperbody_Indirectto) ) | Null | 1 | TRUE | FALSE | Avoiding_seqKeepaway |

RECORDING TABLE OF SOCIAL BEHAVIOR IN EXECUTION STACK 1 ~4800

FIG. 50A

RECORDING TABLE OF SOCIAL BEHAVIOR IN EXECUTION STACK 2-1 — 5001

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 2 | TRUE | FALSE | Approaching_seqStandard |
| 107 | Avoiding_seqKeepaway | 108 | 1 | TRUE | FALSE | Approaching_seqStandard |
| 108 | (SEQ (Orientation_Face_Indirectto) (Orientation_Upperbody_Indirectto) ) | Null | 1 | TRUE | FALSE | Avoiding_seqKeepaway |

FIG. 50B

RECORDING TABLE OF SOCIAL BEHAVIOR IN EXECUTION STACK 2-2 — 5002

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | Avoiding_seqKeepaway | 108 | 1 | TRUE | FALSE | Approaching_seqStandard |
| 108 | (SEQ (Orientation_Face_Indirectto) (Orientation_Upperbody_Indirectto) ) | Null | 2 | TRUE | FALSE | Avoiding_seqKeepaway |

FIG. 51

RECORDING TABLE OF SOCIAL BEHAVIOR IN EXECUTION STACK 2-3 ~5100

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | Avoiding_seqKeepaway | 108 | 1 | TRUE | FALSE | Approaching_seqStandard |
| 108 | (SEQ (Orientation_Face_Indirectto) (Orientation_Upperbody_Indirectto) ) | 109 | 1 | TRUE | FALSE | Avoiding_seqKeepaway |
| 109 | (Attention_joint, intention=5, attributescore=5, duration=9) | Null | 1 | FALSE | TRUE | Null |

FIG. 52

RECORDING TABLE OF SOCIAL BEHAVIOR IN EXECUTION STACK 2-4 ~5200

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | Avoiding_seqKeepaway | 108 | 1 | TRUE | FALSE | Approaching_seqStandard |
| 108 | (SEQ<br>(Orientation_Face_Indirectto)<br>(Orientation_Upperbody_Indirectto)<br>) | 109 | 1 | TRUE | FALSE | Avoiding_seqKeepaway |
| 109 | (SEQ<br>(Attention_joint, intention=5, attributescore=5, duration=9)<br>(Lean_Upperbody_Backward, duration=3)<br>) | Null | 1 | FALSE | TRUE | Null |

FIG. 53

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| | RECORDING TABLE OF SOCIAL BEHAVIOR IN EXECUTION STACK 2-5 | | | | | |
| 106 | (Gesture_Positivemeaninggestureto, type=nod) | 107 | 1 | TRUE | FALSE | Approaching_seqStandard |
| 107 | (Attention_joint, intention=5, attributescore=5, duration=9) | Null | 1 | FALSE | FALSE | Null |

RECORDING TABLE OF SOCIAL BEHAVIOR IN EXECUTION STACK 2-6  5400

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | (Attention_joint, intention=5, attributescore=5, duration=9) | 108 | 1 | FALSE | FALSE | Null |
| 108 | Avoiding_seqKeepaway | 109 | 1 | TRUE | FALSE | Approaching_seqStandard |
| 109 | (SEQ (Orientation_Face_Indirectto) (Orientation_Upperbody_Indirectto) ) | Null | 1 | TRUE | FALSE | Avoiding_seqKeepaway |

FIG. 55

RECORDING TABLE OF SOCIAL BEHAVIOR IN EXECUTION STACK 2-7 ~5500

| EXECUTION PLAN ID | EXECUTION STACK OF SOCIAL BEHAVIOR AND SOCIAL BEHAVIOR GROUP | NEXT EXECUTION PLAN ID | Schedule INTENSITY | REACTIVE CONTROL | SYNTHESIS CONTROL | REACTIVE SOCIAL BEHAVIOR GROUP BEING EXECUTED |
|---|---|---|---|---|---|---|
| 106 | (Gesture_Positivemeaninggestureto, type=nod) | 107 | 1 | TRUE | FALSE | Approaching_seqStandard |
| 107 | (Attention_joint, intention=5, attributescore=5, duration=9) | 108 | 1 | FALSE | FALSE | Null |
| 108 | (Lean_Upperbody_Backward, intention=2) | 109 | 1 | FALSE | FALSE | Null |
| 109 | Avoiding_seqKeepaway | 110 | 1 | TRUE | FALSE | Approaching_seqStandard |
| 110 | (SEQ (Orientation_Face_Indirectto) (Orientation_Upperbody_Indirectto) ) | Null | 1 | TRUE | FALSE | Avoiding_seqKeepaway |

FIG. 57

SOCIAL BEHAVIOR CONTROL LOG TABLE ~5700

| DB RECORDING TIME | RECORDING START TIME | RECORDING END TIME | BEHAVING AVATAR ID | BEHAVED AVATAR ID | EXECUTION PLAN ID OF SOCIAL BEHAVIOR PERFORMED FROM EXECUTION STACK | REACTIVE CONTROL | SYNTHESIS CONTROL | SOCIAL BEHAVIOR LOG RECORDING ID |
|---|---|---|---|---|---|---|---|---|
| .. | .. | .. | .. | .. | .. | .. | .. | .. |
| JULY 25, 2017 13:00:30.071 | JULY 25, 2017 13:00:30.000 | JULY 25, 2017 13:00:30.070 | AV2 | AV1 | 106 | TRUE | FALSE | 25001 |
| JULY 25, 2017 13:00:32.052 | JULY 25, 2017 13:00:30.080 | JULY 25, 2017 13:00:32.051 | AV2 | AV1 | 107 | TRUE | FALSE | 25002 |
| JULY 25, 2017 13:00:40.052 | JULY 25, 2017 13:00:31.052 | JULY 25, 2017 13:00:40.051 | AV2 | AV1 | 108 | TRUE | FALSE | 25003 |
| .. | .. | .. | .. | .. | .. | .. | .. | .. |

US 10,788,887 B2

IMAGE GENERATION PROGRAM, IMAGE GENERATION DEVICE, AND IMAGE GENERATION METHOD

CROSS-REFERENCE TO RELATED APPLICATION

This application is based upon and claims the benefit of priority of the prior Japanese Patent Application No. 2017-233534, filed on Dec. 5, 2017, the entire contents of which are incorporated herein by reference.

FIELD

The embodiments discussed herein are related to an image generation program, an image generation device, and an image generation method.

BACKGROUND

There has been known a technology that achieves communications among users at remote locations by way of an avatar in a virtual space or a robot in a real space (avatar in a broad sense), the robot simulating a user's actions. Related techniques are disclosed in, for example, Japanese Laid-open Patent Publication Nos. 2009-77380 and 2006-262010.

However, unlike communications directly performed by users in a real space, communications achieved in communication service described above have low immediacy. There is thus a problem that a reactive behavior (for example, a behavior with high immediacy such as a partner (user) looking at a speaker in response to the speaker starting to speak) may not be presented to a communication partner.

SUMMARY

According to an aspect of the embodiments, an image generation method, for displaying avatars, is disclosed. The method includes: identifying tendency in a predetermined temporal interval of a social behavior performed by a second user to a first user if the first user performs the social behavior to the second user, of the users performing communications by way of avatars; and controlling such that the social behavior selected based on the identified tendency is presented to the first user by way of the avatar of the second user, if the first user performs the social behavior to the second user.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9A to 9C are diagrams illustrating examples of respective tables stored in a sensor data DB;

FIG. 10 is a diagram illustrating an example of a log table relating to avatar display information stored in a log DB;

FIG. 11 is a diagram illustrating an example of a monitoring target data log definition data table stored in a definition data DB;

FIG. 12 is a diagram illustrating an example of a social behavior judgment API definition data table stored in the definition data DB;

FIG. 13 is a diagram illustrating an example of a social behavior approach and avoidance tendency definition data table stored in the definition data DB;

FIG. 14 is a diagram illustrating an example of a control definition data table on whether a reactive social behavior for a dialogue strategy is permitted, stored in the definition data DB;

FIGS. 16A to 16D are diagrams illustrating an example of a behavior log update recording table recorded in an evaluation information DB;

FIG. 17 is a diagram illustrating an example of a social behavior log recording table recorded in the evaluation information DB;

FIGS. 18A and 18B are diagrams illustrating an example of a social behavior value calculation recording table recorded in the evaluation information DB;

FIG. 19 is a diagram illustrating an example of a dialogue strategy determination recording table recorded in the evaluation information DB;

FIG. 21 is a diagram illustrating an example of a temporal interval social behavior action tendency amount threshold definition data table stored in the definition data DB;

FIG. 23 is a diagram illustrating a temporal interval social behavior action tendency amount recording table recorded in the definition data DB;

FIG. 24 is a diagram illustrating an example of a temporal interval social behavior action tendency recording table recorded in the evaluation information DB;

FIG. 25 is a diagram illustrating an example of a cooperative action possibility judgment recording table recorded in the evaluation information DB;

FIG. 26 is a diagram illustrating an example of a social behavior acceptability judgment recording table recorded in the evaluation information DB;

FIG. 27 is a diagram illustrating an example of a recording table of dialogue strategy determination corresponding to social behavior acceptability, recorded in the evaluation information DB;

FIG. 29 is a diagram illustrating an example of a dialogue strategy definition data table by relationship level, stored in the definition data DB;

FIG. 31 is a diagram illustrating an example of a speech value calculation recording table recorded in the evaluation information DB;

FIG. 33 is a diagram illustrating an example of a recording table of information disclosure amount to dialogue partner recorded in the evaluation information DB;

FIG. 34 is a diagram illustrating an example of a judgment recording table of relationship level considered appropriate to dialogue partner, recorded in the evaluation information DB;

FIG. 35 is a diagram illustrating an example of a relationship progress degree recording table, recorded in the evaluation information DB;

FIG. 37 is a diagram illustrating an example of a recording table of information disclosed amount from dialogue partner, recorded the evaluation information DB;

FIG. 38 is a diagram illustrating an example of a relatedness level estimation recording table considering dialogue partner appropriate based on information disclosed amount from dialogue partner, recorded in the evaluation information DB;

FIG. 41 is a diagram illustrating an example of a recording table of dialogue strategy determination corresponding to relationship level, recorded in the evaluation information DB;

FIG. 43 is a diagram illustrating an example of a reactive social behavior definition data table per dialogue strategy, stored in the definition data DB;

FIG. 44 is a diagram illustrating an example of a social behavior group definition data table stored in the definition data DB;

FIG. 45 is a diagram illustrating an approach and avoidance tendency evaluation value definition data table of social behavior and social behavior group, stored in the definition data DB;

FIG. 48 is a first diagram illustrating an example of a recording table of social behavior in execution stack, recorded in the evaluation information DB;

FIGS. 50A and 50B are second diagrams illustrating an example of the recording table of social behavior in execution stack, recorded in the evaluation information DB;

FIG. 51 is a third diagram illustrating an example of the recording table of social behavior in execution stack, recorded in the evaluation information DB;

FIG. 52 is a fourth diagram illustrating an example of the recording table of social behavior in execution stack, recorded in the evaluation information DB;

FIG. 53 is a fifth diagram illustrating an example of the recording table of social behavior in execution stack, recorded in the evaluation information DB;

FIG. 54 is a sixth diagram illustrating an example of the recording table of social behavior in execution stack, recorded in the evaluation information DB;

FIG. 55 is a seventh diagram illustrating an example of the recording table of social behavior in execution stack, recorded in the evaluation information DB;

FIG. 57 is a diagram illustrating an example of a social behavior control log table recorded in the evaluation information DB.

DESCRIPTION OF EMBODIMENTS

In the following, respective embodiments are described with reference to the attached drawings. Note that in this specification and the drawings, an overlapping description is omitted by assignment of identical numerals to components having substantially identical function and configuration.

First Embodiment

<Overall Configuration of Image Generation System>

Figure 1:
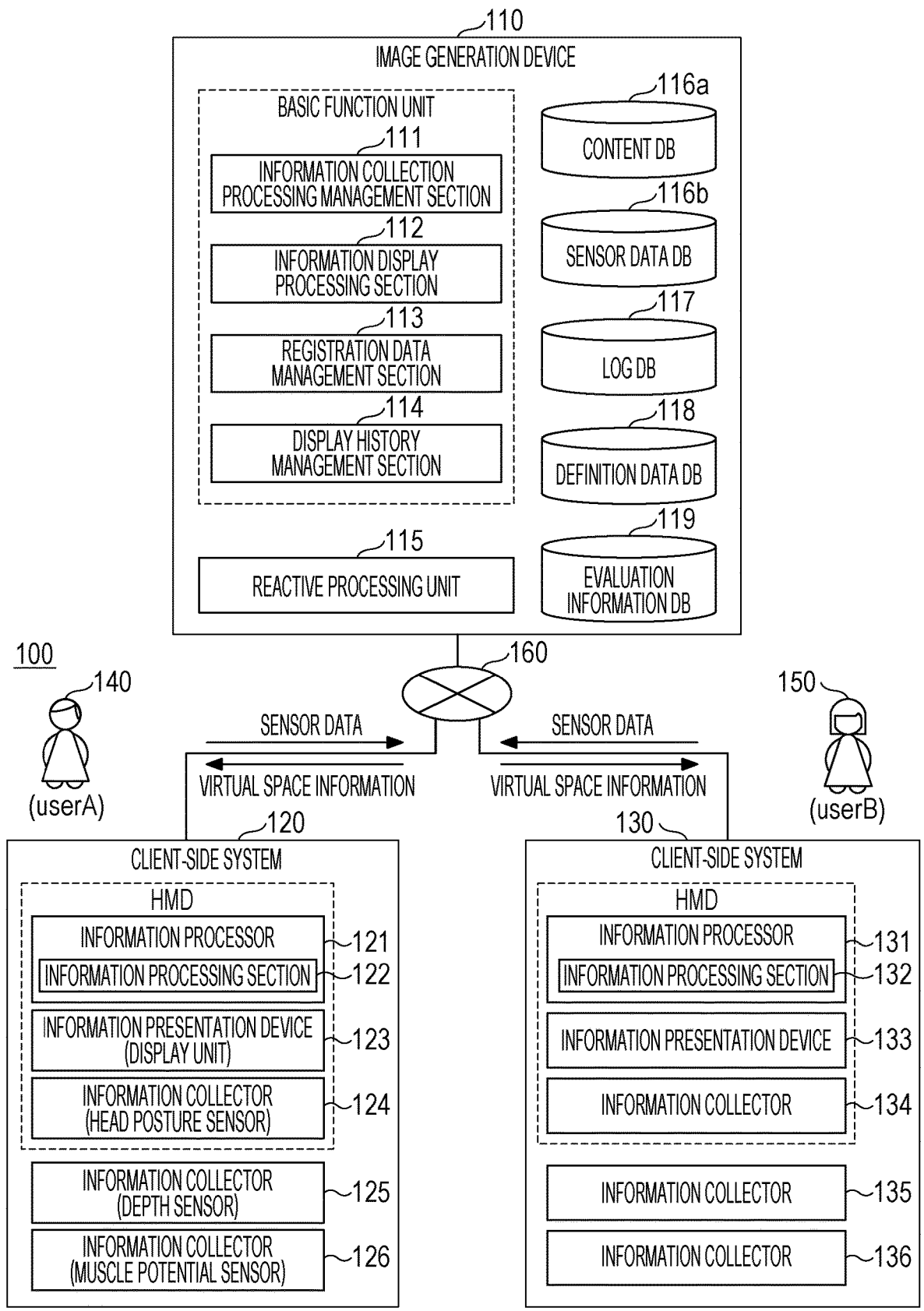
FIG. 1 is a diagram illustrating an example of an overall configuration of an image generation system.

First, an image generation system is described. FIG. 1 is a diagram illustrating an example of an overall configuration of an image generation system. As illustrated in FIG. 1, the image generation system 100 includes an image generation device 110 where server software is located, and client-side systems 120, 130 respectively including an information processor 121, 131 where client application software is located. The image generation device 110 and the client-side systems 120, 130 are connected by way of a network 160 such as the Internet or a Local Area Network (LAN) or the like.

In the image generation system 100, the image generation device 110 and the client-side systems 120, 130 divide and execute overall processing. With this, the image generation system 100 provides a communication service that achieves communications between users by way of an avatar (image in a state associated with a user).

A user 140 (user ID="userA") and a user 150 (user ID="userB") utilize the communication service provided by the image generation system 100 at separate locations. By using the communication service, the users 140 and 150 may perform communications by way of the avatar in a same virtual space.

The image generation device 110 is a server device that collects sensor data obtained by sensing actions of the users 140 and 150 and performs various types of processing.

An image generation program is installed as the server software in the image generation device 110. The image generation program being executed, the image generation device 110 includes a basic function unit 1101 and a reactive processing unit 115.

The basic function unit 1101 includes an information collection processing management section 111, an information display processing section 112, a registration data management section 113, and a display history management section 114, and performs basic functions for providing the communication service.

The information collection processing management section 111 collects and stores, in a sensor data database (hereinafter referred to as Database (DB)) 116b, the sensor data obtained as a result of the sensing of the actions of the users 140 and 150.

The information display processing section 112 generates an image of the avatar in the virtual space based on the sensor data stored in the sensor data DB 116b. The information display processing section 112 generates the avatar image using an avatar skeleton model stored in a content DB 116a.

The avatar skeleton model is a human-like image, and is an image expressing an action of each part of the user, using a plurality of the avatar skeleton models. Note that an avatar skeleton is an object serving as a base point to move avatar's head or limbs. A plurality of the avatar skeletons are included in one avatar skeleton model.

The information display processing section 112 calculates, for each of the avatar skeletons, positional coordinates and a rotation angle in the virtual space based on the sensor data, and reflects the calculated positional coordinates and rotation angle in the avatar skeleton model, thereby generating the avatar image.

The information display processing section 112 also generates virtual space information by incorporating the avatar image into an image (background image) of the virtual space stored in the content DB 116a and transmits the virtual space information to the client-side systems 120, 130.

Note that the information display processing section 112 changes the avatar image to be incorporated into the image of the virtual space based on an instruction from the reactive processing unit 115. For example, if the reactive processing unit 115 issues the instruction to display the avatar image generated by the reactive processing unit 115, the information display processing section 112 generates the virtual space information by incorporating the avatar image generated by the reactive processing unit 115.

The registration data management section 113 registers various types of information in the content DB 116a, the definition data DB 118, or the like, the various types of information being used until the information collection processing management section 111 collects the sensor data and the information display processing section 112 generates and transmits the virtual space information.

The display history management section 114 records, in a "log table related to display information" stored in the log DB 117, the data used for generation of the avatar image included in the virtual space information transmitted by the information display processing section 112. Note that the data used for generation of the avatar image is specifically the data on the positional coordinates and the rotation angle of the respective avatar skeletons.

The reactive processing unit 115 generates an image of the avatar depicting a reactive behavior of a second user, in a scene where the second user desirably performs the reactive behavior to a first user. The reactive processing unit 115 also instructs the information display processing section 112 to display the generated avatar image.

This is because in the scene where it is desirable to perform the reactive behavior, it is not possible to present the reactive behavior to the first user even if the avatar image is generated based on the sensor data that senses an actual action of the second user.

Thus, the reactive processing unit 115 generates the avatar image based on the reactive behavior that would be performed by the second user to the first user. This enables the reactive processing unit 115 to achieve presentation control processing that presents to the first user the second user's reactive behavior, without waiting for the sensor data that senses the actual action by the second user.

Note that in the following, a description is given on the assumption that the first user is the user 140 (user ID="userA") and the second user is the user 150 (user ID="userB"). In addition, in the following, a partner (user) to whom the reactive behavior is performed is referred to as a "dialogue partner".

Subsequently, the client-side system is described. As illustrated in FIG. 1, in the image generation system 100, the client-side system 120 and the client-side system 130 have a similar configuration. Namely, the elements 1201, 121-126 may have similar or same functionalities as the elements 1301, 131-136, respectively. Thus, the client-side system 120 is described here.

The client-side system 120 includes an information processor 121, an information presentation device 123, and information collectors 124 to 126.

In the information processor 121, an information processing program is installed as client application software. The information processing program being executed, the information processor 121 serves as the information processing section 122. The information processing section 122 transmits to the image generation device 110 the sensor data outputted from the information collectors 124 to 126, and receives and outputs to the information presentation device 123 the virtual space information transmitted from the image generation device 110.

Note that although in the first embodiment, the information processor 121 is described as an information processor mounted in a head-mounted display (HMD) 1201, the information processor 121 may not be mounted in the HMD. For example, the information processor 121 may be mounted in an environmentally embedded type terminal surrounding the user 140. Alternatively, the information processor 121 may be mounted in a wearable mobile terminal such as contact lenses and glasses or a stationary server device or the like.

The information presentation device 123 displays to the user 140 the virtual space information transmitted from the image generation device 110. Note that in the first embodiment, the information presentation device 123 is implemented by a display device of the HMD 1201.

Each of the information collectors 124 to 126 senses a non-verbal action of the user 140 in a real space and outputs the sensor data.

In the first embodiment, the information collector 124 is a head posture sensor and mounted in the HMD 1201. A head posture sensor 124 senses "head position/orientation" included in the non-verbal action of the user 140 in the real space and outputs head posture data.

In addition, in the first embodiment, the information collector 125 is a depth sensor. The depth sensor 125 is placed in front of the user 140, and outputs depth data and two-dimensional distance image or the like by sensing a three-dimensional distance from the location of placement to the user 140, the depth data and the two-dimensional distance image or the like varying depending on the non-verbal action of the user 140 in the real space. The depth data is data representing a depth (deepness) (3 cm or the like, for example). In addition, the distance image refers to an image obtained by plotting the depth data obtained from the depth sensor 125 on an XY plane. In each pixel on the distance image is stored a value of a distance to an object on each of XY coordinate positions obtained from the depth sensor 125 (nearest object when viewed from the depth sensor 125). Note that the data obtained from the depth sensor 125 (including a color image or the like, in addition to the depth data and the distance image) is collectively referred to as depth sensor data.

In addition, in the first embodiment, the information collector 126 is a muscle potential sensor (a.k.a. a Myoelectricity (EMG) sensor). The muscle potential sensor 126 senses a "facial expression change" included in the non-verbal action of the user 140 in the real space and outputs muscle potential data (or EMG data).

Note that in the following, although the description is given on the assumption that one user is assigned on one device (information processor) on which the client application software is located, a plurality of users may be assigned on the one device.

In addition, in the following, although the description is given on the assumption that each of the server software and the client application software is located on one device (image generation device, information processor), more than one software may be located on the one device.

Alternatively, the server software and the client application software may be located on one device. For example, an image processing program and the information processing program may be installed in each of the information processors 121, 131.

Alternatively, for both the server software and the client application software, functions implemented in each of the software may be distributed and located in a plurality of devices.

In addition, in the following, the client application software identifies the user 140, and transforms the virtual space information transmitted from the image generation device 110 into the virtual space information corresponding to the identified user 140 and displays the virtual space information. In addition, in the following, the description is given on the assumption that the sensor data obtained as a result of the sensing of the non-verbal action of the user 140 is associated with the user 140 and then transmitted to the image generation device 110.

Note that the information processor 121 in which the client application software is located is access controlled by the client application software or the server software. That is to say, in the following, the client application software is started only when identity confirmation (user authentication) is performed in advance at the information processor 121 in which the client application software is located.

In addition, in the following, the client application software confirms specifications of the information presentation device 123, transforms the virtual space information transmitted from the image generation device 110 into virtual space information corresponding to the confirmed specifications, and displays the virtual space information.

In addition, in the following, the client application software checks the information processor 121, associates the sensor data obtained as a result of the sensing of the non-verbal action of the user 140 with the information processor 121, and transmits the sensor data to the image generation device 110.

In addition, in the following, although the description is given on the assumption that the user 140 has one kind of an identifier for identifying the user 140, the user 140 may have identifiers that differ for each service in a case where the image generation system 100 provides a plurality of services. In that case, however, the image generation system 100 manages association of the plurality of identifiers that the user 140 has.

In addition, in the following, although the description is given on the assumption that the head posture sensor, the depth sensor, and the muscle potential sensor sense the non-verbal action of the user 140 as the information collectors 124 to 126, any other sensor may sense the non-verbal action of the user 140. The other sensor includes, for example, an image capturing device, a photo image (color image) capturing device, a voice capturing device (microphone or the like), a biological sensor, a brain wave sensor, or the like. Here, "voice" may include not only a human voice, but also any kind of audio sound.

Note that in a contactless sensor, no data of the user 140 may exist in the sensor data, as such a case where the user 140 is not seen in the photo image taking the user 140. In addition, for example, there is also a case where more than one user is shown in the photo image shooting the user 140, and it is not distinguishable which user is sensed. In the present embodiment, a measure is separately taken on such an event, and the sensor data is correctly associated with the user 140 in the image generation device 110.

In addition, in the following, although the description is given on the assumption that the sensor data itself sensed by the information collectors 124 to 126 is transmitted to the image generation device 110, intermediate information derivable from the sensed sensor data may be transmitted. For example, if facial image data of the user 140 is sensed, information representing big and small changes in a smile derived by focusing on facial parts of the user 140 may be transmitted to the image generation device 110. Alternatively, information representing a posture change derived by focusing on size of a face of the user 140 may be transmitted to the image generation device 110.

In addition, in the following, a time stamp is added to the sensor data transmitted from the information processors 121, 131. In addition, for the time stamp to be added at this time, the time is set between the client-side system 120 and the client-side system 130.

Furthermore, in the following, although the description is given based on a display unit as the information presentation device 123, the HMD 1201 may have another information presentation device. The information presentation device other than the display unit includes a voice output device (speaker or the like), for example.

<Image in Virtual Space>

Figure 2:
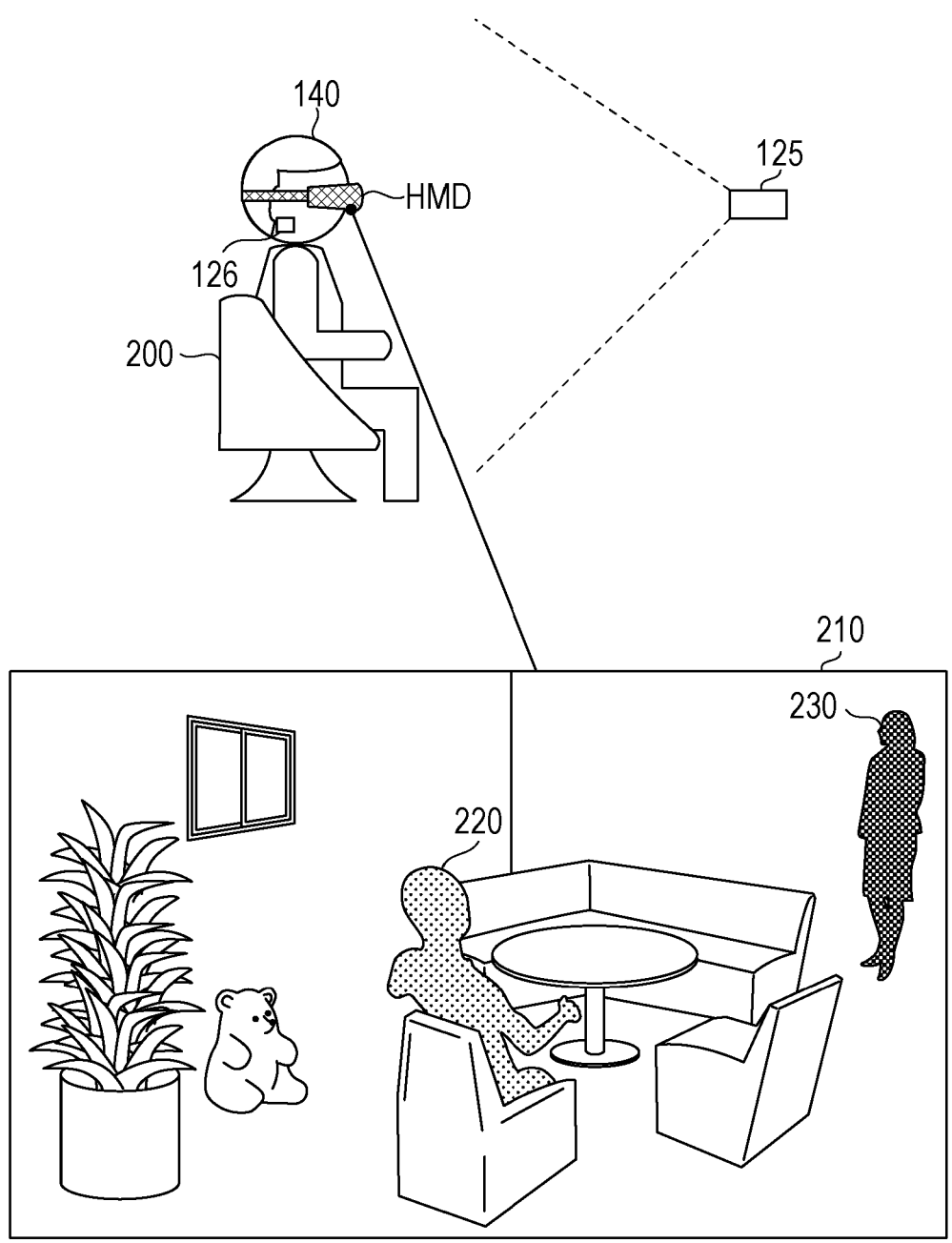
FIG. 2 is a diagram illustrating an example of an image in a virtual space.

In the following, description is given of the virtual space image including the avatar image of the user 140, 150. FIG. 2 is a diagram illustrating an example of the image in the virtual space.

As illustrated in FIG. 2, in the real space, the user 140 utilizing the communication service puts on the HMD 1201 (HMD mounted with the head posture sensor 124 and the display unit 123) and the muscle potential sensor 126 and sits on a chair 200, for example. In addition, the depth sensor 125 is placed in front of the user 140 and senses the user 140.

The head posture data, the depth sensor data, and the muscle potential data that the head posture sensor 124, the depth sensor 125, and the muscle potential sensor 126 obtain by sensing are transmitted to the image generation device 110, and the avatar image of the user 140 is generated in the image generation device 110. Similar processing is also performed on the user 150 and the avatar image of the user 150 is generated in the image generation device 110.

Furthermore, the avatar image generated in the image generation device 110 is incorporated into the virtual space image and transmitted as the virtual space information to the information processors 121 and 131, respectively, illustrated in FIG. 1.

An image 210 illustrated in FIG. 2 is an example of the virtual space image included in the virtual space information transmitted to the information processor 121. The image 210 includes the avatar image 220 of the user 140 and the avatar image 230 of the user 150. As illustrated in FIG. 2, the image 210 is displayed as if the user 140 is looking at the image 220 of his or her own avatar from behind. If the user 140 performs the non-verbal action in this state, the avatar image 220 in the image 210 also changes. According to the image 210, from behind of the avatar image 220, the user 140 may confirm the avatar image 220 changing in the virtual space in accordance with his or her own non-verbal action. Note that a display aspect of the avatar image 220 in the image 210 is not limited thereto, and the avatar image 220 may be displayed as if the user 140 sees from a position of his or her own eyes, like a case where the user 140 looks in the real space. In this case, the user 140 visually recognizes a part (arm or leg, or the like) of the avatar image 220.

<Manner of Expression of Avatar Image>

In the following, description is given of a manner of expression of the avatar image in the virtual space. The avatar image in the virtual space may be expressed, using a different manner of expression by the part, in order to reflect the user's non-verbal action in the real space. In the following, however, the description is given on the assumption that any part is expressed by means of the avatar skeleton level.

As described above, the plurality of the avatar skeletons may be included in one avatar skeleton model. For example, a head of the avatar skeleton model includes the avatar skeleton of the head. The positional coordinates and the rotation angle of the avatar skeleton of the head are calculated based on the head posture data. In addition, the limbs of the avatar skeleton model other than the head include the avatar skeletons of the limbs other than the head. These positional coordinates and rotation angle of the avatar skeletons are calculated based on the depth sensor data.

Figure 3:
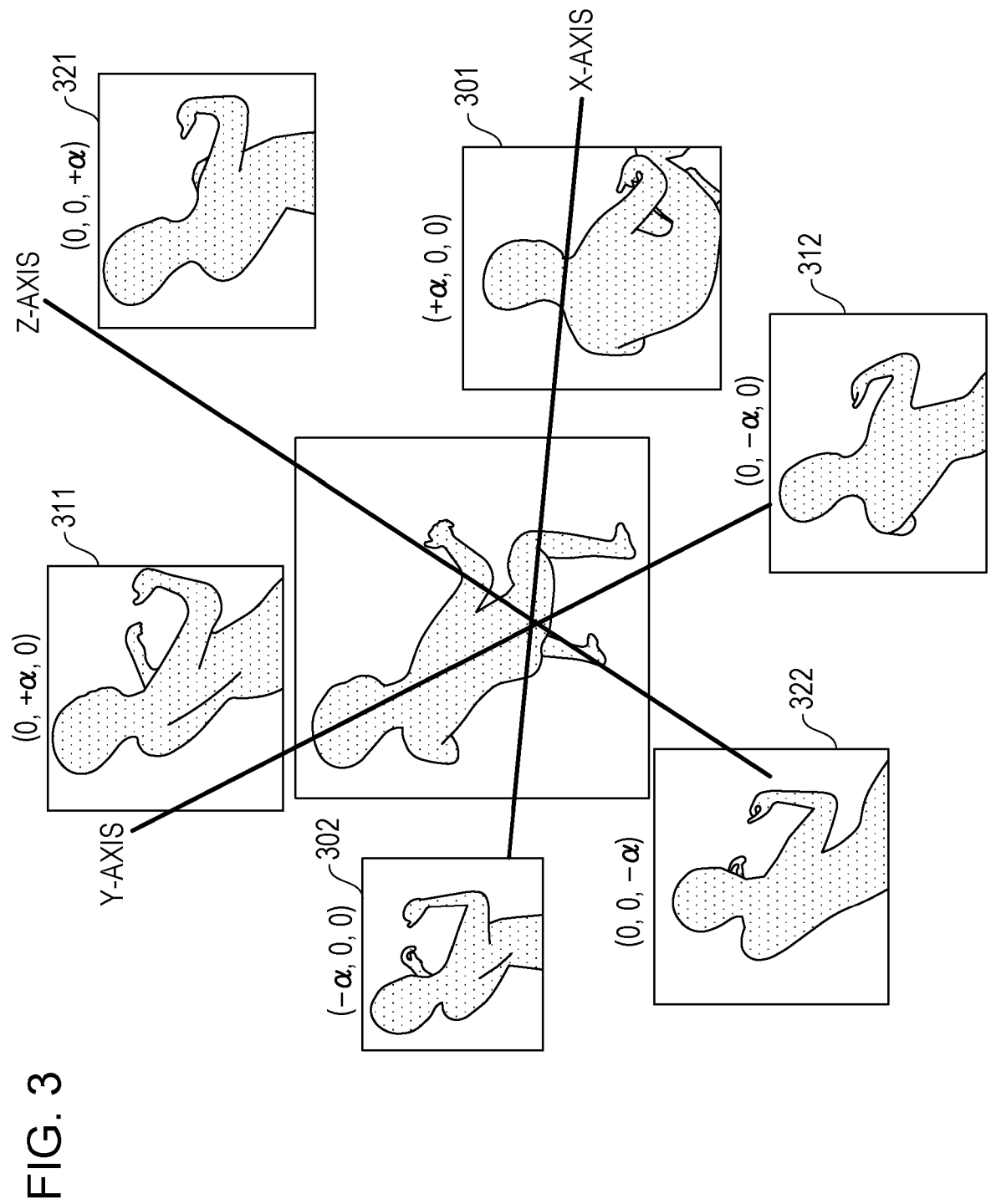
FIG. 3 is a diagram illustrating an example of an expression method of an avatar image.

Here, by way of example, description is given of the manner of expression for expressing an image of an upper body of the avatar using the avatar skeleton model. FIG. 3 is a diagram illustrating an example of the manner of expression of an avatar image, and expresses, as the avatar image, the user's action to bend his or her upper body forward or backward, the user's action to change orientation of his or her upper body so as to look from side to side, and the action to swing the entire upper body to a left or right lateral face. In the case of the manner of expression using the avatar skeleton model, these actions may be expressed as a change of the rotation angle of the avatar skeleton ("Bone_Chest") relative to three axis directions with a position of the avatar's waist as an origin.

Note that in FIG. 3, an X-axis, a Y-axis, and a Z-axis of a coordinate system uniquely defined in the virtual space is respectively made a right-left direction, an up-down direction, and a forward-backward direction of the avatar.

An image 301 represents the avatar image when the avatar skeleton rotates $+\alpha$ [degrees] relative to the X-axis, and an image 302 represents the avatar image when the avatar skeleton rotates $-\alpha$ [degrees] relative to the X-axis. In addition, an image 311 represents the avatar image when the avatar skeleton rotates $+\alpha$ [degrees] relative to the Y-axis, and an image 312 represents the avatar image when the avatar skeleton rotates $-\alpha$ [degrees] relative to the Y-axis.

Furthermore, an image 321 represents the avatar image when the avatar skeleton rotates $+\alpha$[degrees] relative to the Z-axis, and an image 322 represents the avatar image when the avatar skeleton rotates $-\alpha$[degrees] relative to the Z-axis.

<Basic Information on Social Behavior>

In the following, a social behavior and basic information used to judge the social behavior are described. The social behavior (Social Behavior) refers to a non-verbal action to be done on a social entity, among predetermined human non-verbal actions in the real space.

For example, if non-verbal action of a predetermined person is the non-verbal action to go forward, it may be said that the non-verbal action of the predetermined person is the social behavior of approaching to other person (social behavior indicating approach tendency) when the other person is present at a destination to which the predetermined person goes. To the contrary, if the predetermined person performs the non-verbal action to go forward when the other person is nearby and as a result, the other person moves away, it may be said that the non-verbal action of the predetermined person is the social behavior of letting the other person move away (social behavior indicating avoidance tendency).

Similarly, for example, if the non-verbal action of a predetermined person is the non-verbal action to turn a position and orientation of his or her head to the right, and when the other person is on the right side, it may be said that the non-verbal action of the predetermined person is the social behavior of turning his or her face to the other person. That is, it may be said that the non-verbal action of the predetermined person is the social behavior indicating the approach tendency. To the contrary, if the predetermined person performs the non-verbal action to go forward while the other person is nearby and as a result, he or she moves away from the other person, it may be said that the non-verbal action of the predetermined person is the social behavior of moving away from the other person (social behavior indicating the avoidance tendency).

Thus, if the social behavior is judged in the virtual space, it is desirable to calculate the basic information such as a physical distance or a rotation angle between the avatar of the predetermined person and the avatar of the other person.

Figure 4:
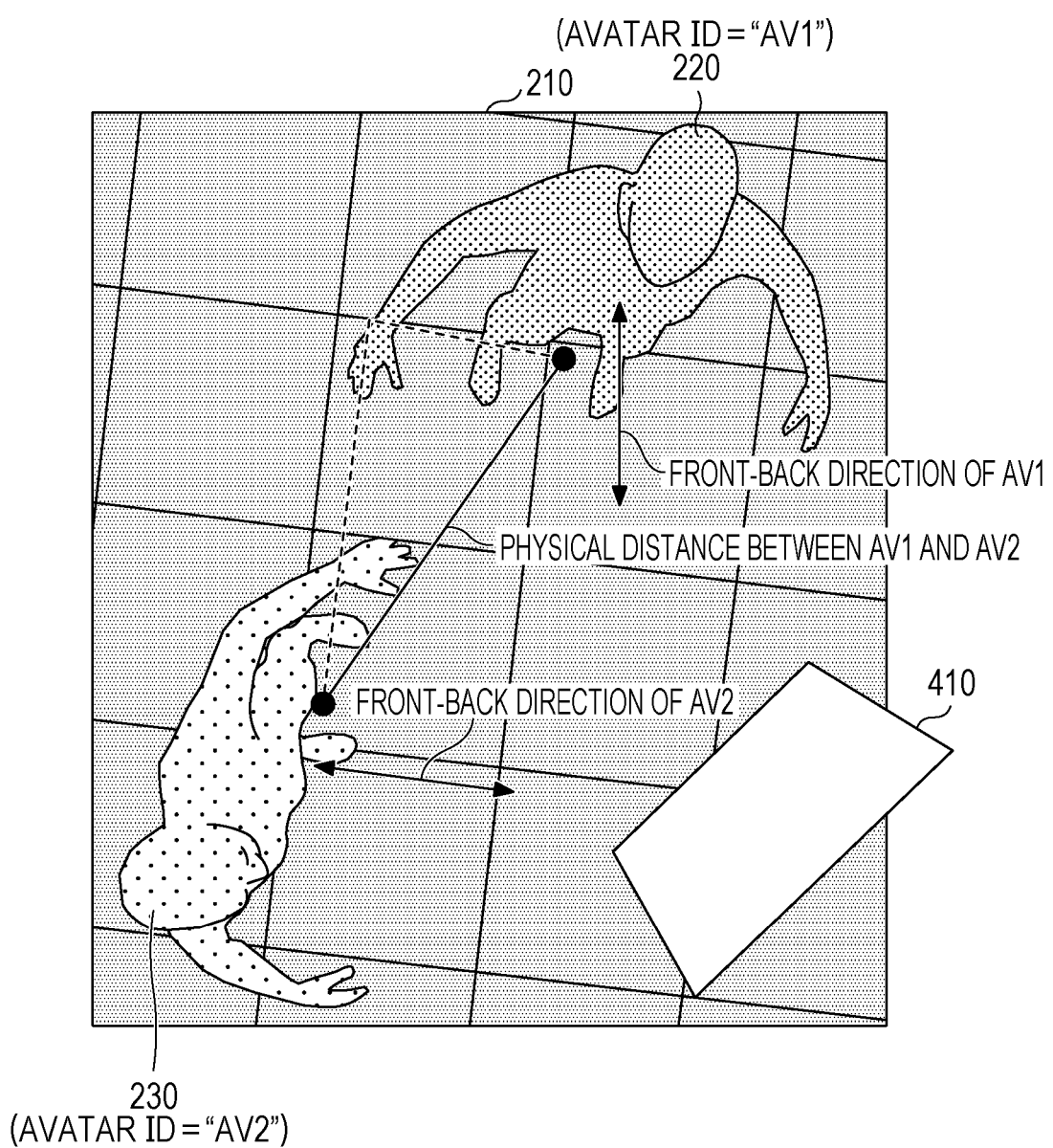
FIG. 4 is a diagram illustrating basic information on a social behavior.

FIG. 4 is a diagram illustrating the basic information on the social behavior. In the image 210 illustrated in FIG. 4, suppose that the positional coordinates in the virtual space of the image 220 of the avatar of the user 140 (illustrated in FIG. 1) (avatar ID="AV1") are (0, 0, 0). In addition, suppose that the positional coordinates in the virtual space of the image 230 of the avatar of the user 150 (illustrated in FIG. 1) (avatar ID="AV2") are (10, 0, 17.32). In this case, as the basic information, the physical distance between the image 220 of the avatar of the user 140 and the image 230 of the avatar of the user 150 may be calculated to be "20 (=0.2 [m])".

In addition, in FIG. 4, suppose that the rotation angle in the virtual space of the image 220 of the avatar of the user 140 is (0, 0, 0) and the rotation angle in the virtual space of the image 230 of the avatar of the user 150 is (0, −90, 0). In this case, as the basic information, the rotation angle on an XZ plane from a front-back direction of the image 230 of the avatar of the user 150 to the image 220 of the avatar of the user 140 may be calculated to be "−90 [degrees]". In addition, as the basic information, the rotation angle on the XZ plane from the front-back direction of the image 220 of the avatar of the user 140 to the image 230 of the avatar of the user 150 may be calculated to be "+90 [degrees]".

Note that in the example of FIG. 4, an image 410 of the object is also placed in the virtual space, in addition to the image 220 of the avatar of the user 140 and the image 230 of the avatar of the user 150. The positional coordinates in the virtual space of the image 410 of the object is (−6, 21, 17), and the rotation angle in the virtual space is (90, 140, 0). Therefore, the basic information may also be calculated for the image 410 of the object.

<Hardware Configuration of Image Generation Device>

Figure 5:
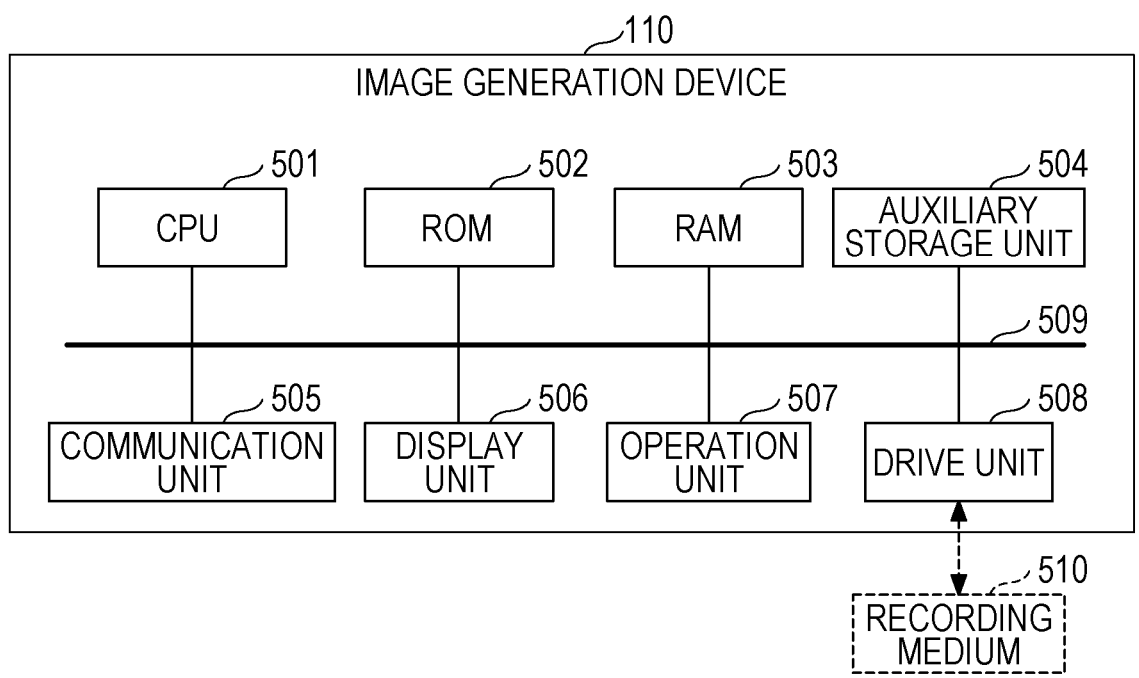
FIG. 5 is a diagram illustrating an example of a hardware configuration of an image generation device.

In the following, description is given of a hardware configuration of the image generation device 110 included in the image generation system 100 (illustrated in FIG. 1). FIG. 5 is a diagram illustrating an example of the hardware configuration of the image generation device 110. As illustrated in FIG. 5, the image generation device 110 includes a central processing unit (CPU) 501, a read only memory (ROM) 502, and a random access memory (RAM) 503. The CPU 501, the ROM 502, and the RAM 503 form a computer. In addition, the image generation device 110 includes an auxiliary storage unit 504, a communication unit 505, a display unit 506, an operation unit 507, and a drive unit 508. Note that each component of the image generation device 110 is mutually connected via a bus 509.

The CPU 501 executes various programs (for example, an image generation program as server software) installed in the auxiliary storage unit 504. The ROM 502 is a non-volatile memory. The ROM 502 is a main storage unit that stores various programs, data, or the like which are desirable for the CPU 501 to execute the various programs stored in the auxiliary storage unit 504. Specifically, the ROM 502 stores a boot program or the like such as a basic input/output system (BIOS) or an extensible firmware interface (EFI).

The RAM 503 is a volatile memory such as a dynamic random access memory (DRAM) or a static random access memory (SRAM), and acts as the main storage unit. The RAM 503 provides a working area to be expanded when the CPU 501 executes the various programs stored in the auxiliary storage unit 504.

The auxiliary storage unit 504 stores various programs installed in the image generation device 110 or information (various contents, various definition information, or the like) to be used when the various programs are executed. The auxiliary storage unit 504 also stores information (sensor data, log table, or the like) to be acquired through execution of the various programs. Note that the foregoing content DB 116a, sensor data DB 116b, log DB 117, definition data DB 118, and an evaluation information DB 119 may be implemented in the auxiliary storage unit 504.

The communication unit 505 is a device for communicating with the information processors 121, 131 of the client-side systems 120, 130 (each of which is illustrated in FIG. 1) connected to the image generation device 110. The display unit 506 is a device that displays a processing result or a processing state of the image generation device 110. The operation unit 507 is a device for inputting various instructions to the image generation device 110.

The drive unit 508 is a device for setting a recording medium 510. The recording medium 510 used herein includes a medium that optically, electrically, or magnetically stores information, such as a CD-ROM, a flexible disk, a magneto-optic disk. The recording medium 510 may also include a semiconductor memory or the like that electrically stores information, such as the ROM, a flash memory, or the like.

Note that the various programs to be installed in the auxiliary storage unit 504 are installed by, for example, the distributed recording medium 510 being set in the drive unit 508, and the various programs recorded in the recording medium 510 being read by the drive unit 508. Alternatively, the various programs to be installed in the auxiliary storage unit 504 may be installed through downloading from the network 160 (illustrated in FIG. 1) by way of the communication unit 505.

<Hardware Configuration of HMD Mounted with Information Processor>

Figure 6:
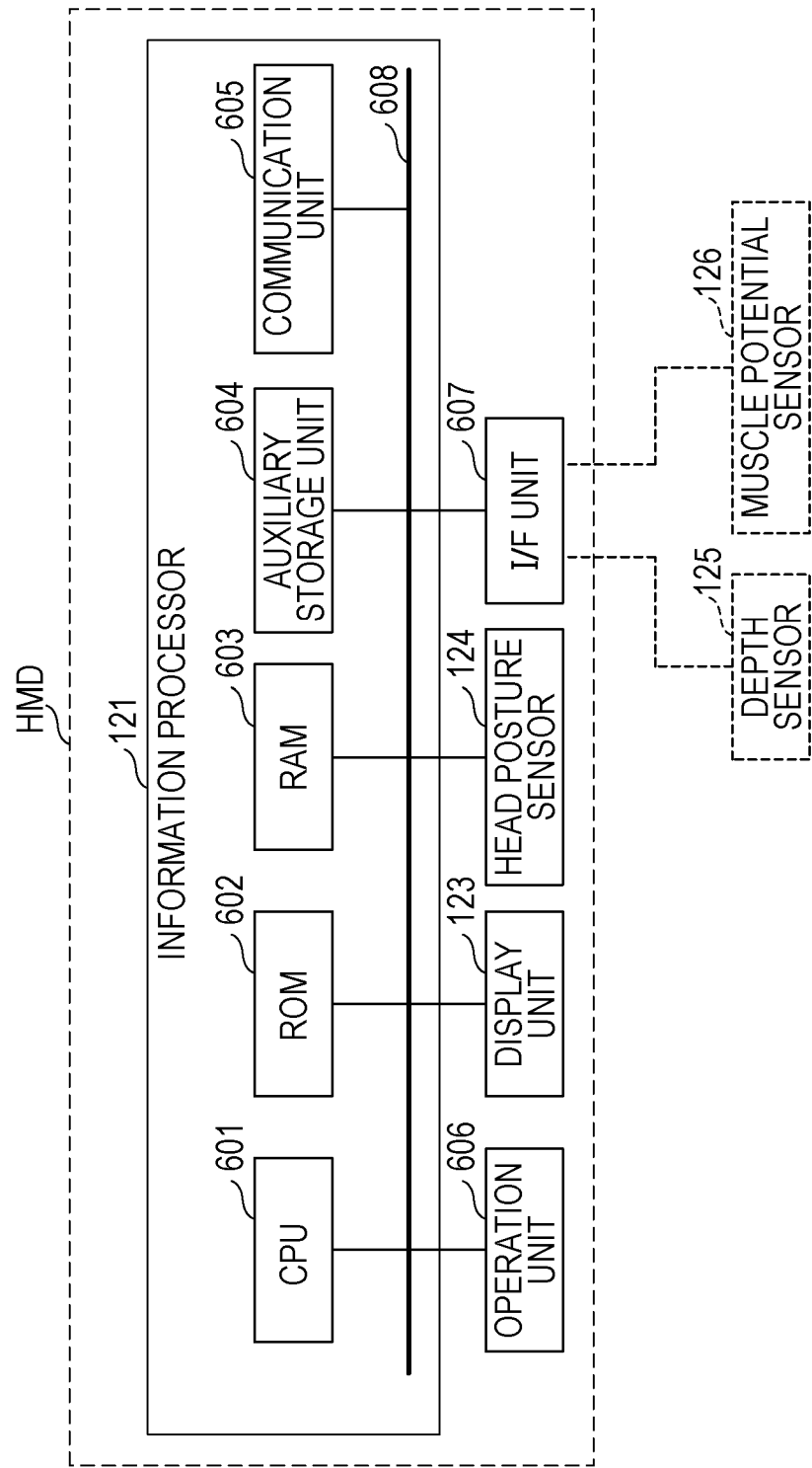
FIG. 6 is a diagram illustrating an example of the hardware configuration of an HMD mounted with an information processor.

In the following, description is given of a hardware configuration of the HMD 1201 mounted with the information processor 121. FIG. 6 is a diagram illustrating an example of the hardware configuration of the HMD mounted with which the information processor. As illustrated in FIG. 6, the information processor 121 mounted in the HMD includes a CPU 601, a ROM 602, and a RAM 603. The information processor 121 mounted in the HMD also includes an auxiliary storage unit 604 and a communication unit 605. The HMD further includes an operation unit 606, a display unit 123, the head posture sensor 124, and an interface (I/F) unit 607, and the respective components are mutually connected via a bus 608. Note that although the voice output device (speaker, or the like) as other sensor or the voice capturing device (microphone, or the like) as other information presentation device is placed in the HMD, the voice output device and the voice capturing device are omitted here.

The CPU 601 executes the various programs (for example, the information processing program as client application software) installed in the auxiliary storage unit 604. The ROM 602 is a non-volatile memory. The ROM 602 is the main storage unit that stores various programs, data, or the like which are desirable for the CPU 601 to execute the various programs stored in the auxiliary storage unit 604. Specifically, the ROM 602 stores a boot program or the like such as the BIOS or the EFI.

The RAM 603 is a volatile memory such as the DRAM or the SRAM, and acts as the main storage unit. The RAM 603 provides the working area to be expanded when the CPU 601 executes the various programs stored in the auxiliary storage unit 604.

The auxiliary storage unit 604 stores installed various programs or information to be used when the various programs are executed. The communication unit 605 is a device for communicating with the image generation device 110.

The operation unit 606 is a device for inputting various instructions to the HMD. The display unit 123 is a device for displaying images in the virtual space included in the virtual space information transmitted from the image generation device 110.

The head posture sensor 124 senses "head position and orientation" included in the non-verbal action of the user 140 (illustrated in FIG. 1) in the real space and outputs the head posture data.

The I/F unit 607 connects with the depth sensor 125 and the muscle potential sensor 126, acquires the depth sensor data outputted from the depth sensor 125 and the muscle potential data outputted from the muscle potential sensor 126.

The sensor data acquired, such as the head posture data, the depth sensor data, and the muscle potential data, are transmitted to the image generation device 110 by the communication unit 605. Note that although an example of FIG. 6 illustrates a case where the HMD is formed as an integral device, the HMD may be integrally formed or may be formed by a plurality of separate devices.

<Overview of Presentation Control Processing of Reactive Processing Unit>

Figure 7:
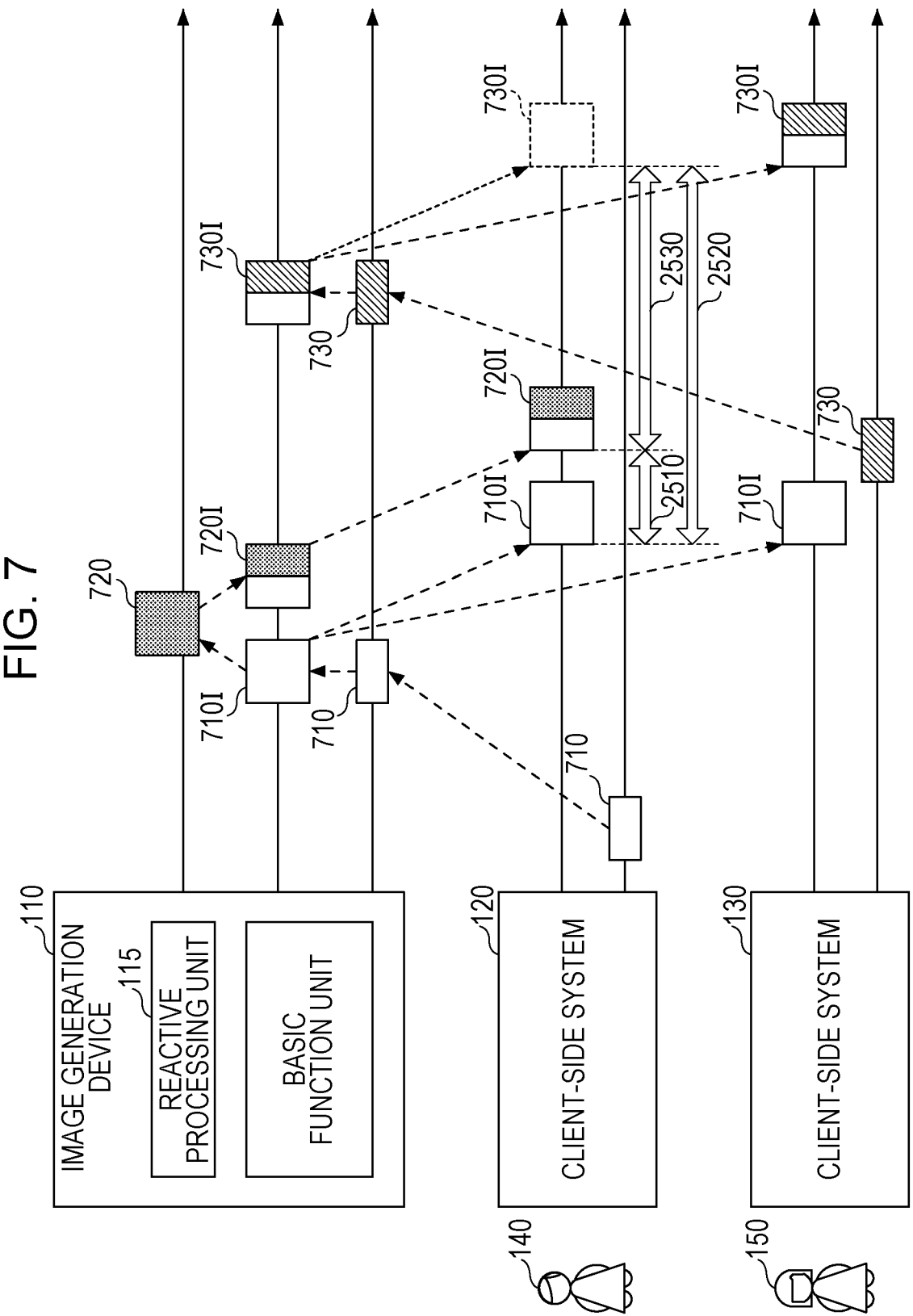
FIG. 7 is a diagram illustrating an overview of presentation control processing of a reactive processing unit of the image generation device.

In the following, description is given of an overview of the presentation control processing implemented by the reactive processing unit 115 of the image generation device 110. FIG. 7 is a diagram illustrating the overview of the presentation control processing of the reactive processing unit of the image generation device.

In FIG. 7, of three solid lines extending from the image generation device 110, the first solid line indicates a timing when the reactive processing unit 115 generates the image of the avatar of the user 150 in order to present reactive social behavior to the user 140. In addition, the second solid line indicates the timing when the basic function unit generates the avatar image and generates the virtual space information, based on the sensor data obtained by sensing actions of the users 140 and 150, respectively. Furthermore, the third solid line indicates the timing when the basic function unit receives the sensor data obtained by sensing the actions of the users 140 and 150, respectively.

In FIG. 7, of two lines extending from the client-side systems 120, 130, the first solid line indicates the timing when the client-side systems 120, 130 receive the virtual space information. In addition, the second solid line indicates the timing when the client-side systems 120, 130 collect the sensor data.

Note that in FIG. 7, rectangular graphics placed on the solid lines to indicate the respective timings include graphics a height of which in a vertical direction is high and the graphics the height of which in the vertical direction is low. The former represents data related to a group of images and the latter represents data other than the group of images.

As illustrated in FIG. 7, when the client-side system 120 collects sensor data 710 corresponding to the social behavior of the user 140 to the user 150, the client-side system 120 transmits the collected sensor data 710 to the image generation device 110.

The basic function unit of the image generation device 110 generates a virtual space image 7101 by generating an image of the avatar of the user 140 based on the sensor data 710 received from the client-side system 120 and incorporating the generated image of the avatar. The basic function unit of the image generation device 110 also transmits the generated virtual space image 7101 to the client-side systems 120, 130.

At this time, the reactive processing unit 115 of the image generation device 110 generates an image 720 of the avatar and notifies the basic function unit of the image, in order to present to the user 140 the reactive social behavior of the user 150 to the social behavior of the user 140.

With this, the basic function unit of the image generation device 110 generates a virtual space image 7201 incorporating the image 720 of the avatar and transmits the virtual space image 7201 to the client-side system 120.

This enables the client-side system 120 to receive and display the virtual space image 7201 immediately after receiving and displaying the virtual space image 7101. As described above, the virtual space image 7101 includes the image of the avatar responding to the social behavior of the user 140, and the virtual space image 7201 includes the image 720 of the avatar representing the reactive social behavior of the user 150. Thus, the client-side system 120 may present the reactive social behavior of the user 150 to the user 140 (The presentation of the reactive social behavior of the user 150 may be controlled to a time lag depicted by an arrow 2510).

On the other hand, the client-side system 130 receives and displays the virtual space image 7101. With this, the user 150 performs some social behavior and the client-side system 130 collects corresponding sensor data 730 and transmits the sensor data 730 to the image generation device 110.

The basic function unit of the image generation device 110 generates a virtual space image 7301 by generating an image of the avatar of the user 150 based on the sensor data 730 received from the client-side system 130 and incorporating the generated avatar image. The basic function unit of the image generation device 110 also transmits the generated virtual space image 7301 to the client-side system 130.

At this time, suppose that as with a conventional communication system, the virtual space image 7301 is also transmitted to the client-side system 120. In this case, the client-side system 120 receives the virtual space image 7101 and then displays the virtual space image 7301, with the time lag of an arrow 2520.

As described above, the virtual space image 7101 includes the image of the avatar corresponding to the social behavior of the user 140, and the virtual space image 7301 includes the image of the avatar corresponding to the social behavior of the user 150. Thus, in the conventional communication system, the social behavior of the user 150 is presented to the user 140, with the time lag of the arrow 2520, and reactive presentation is not possible.

In contrast to this, as described above, with the reactive processing unit 115, the time lag may be controlled to the time lag of the arrow 2510 and shortened by time duration depicted by the arrow 2530. More specifically, the social behavior which is more reactive than usual may be presented to the user 140.

<Functional Configuration of Reactive Processing Unit of Image Generation Device>

Figure 8:
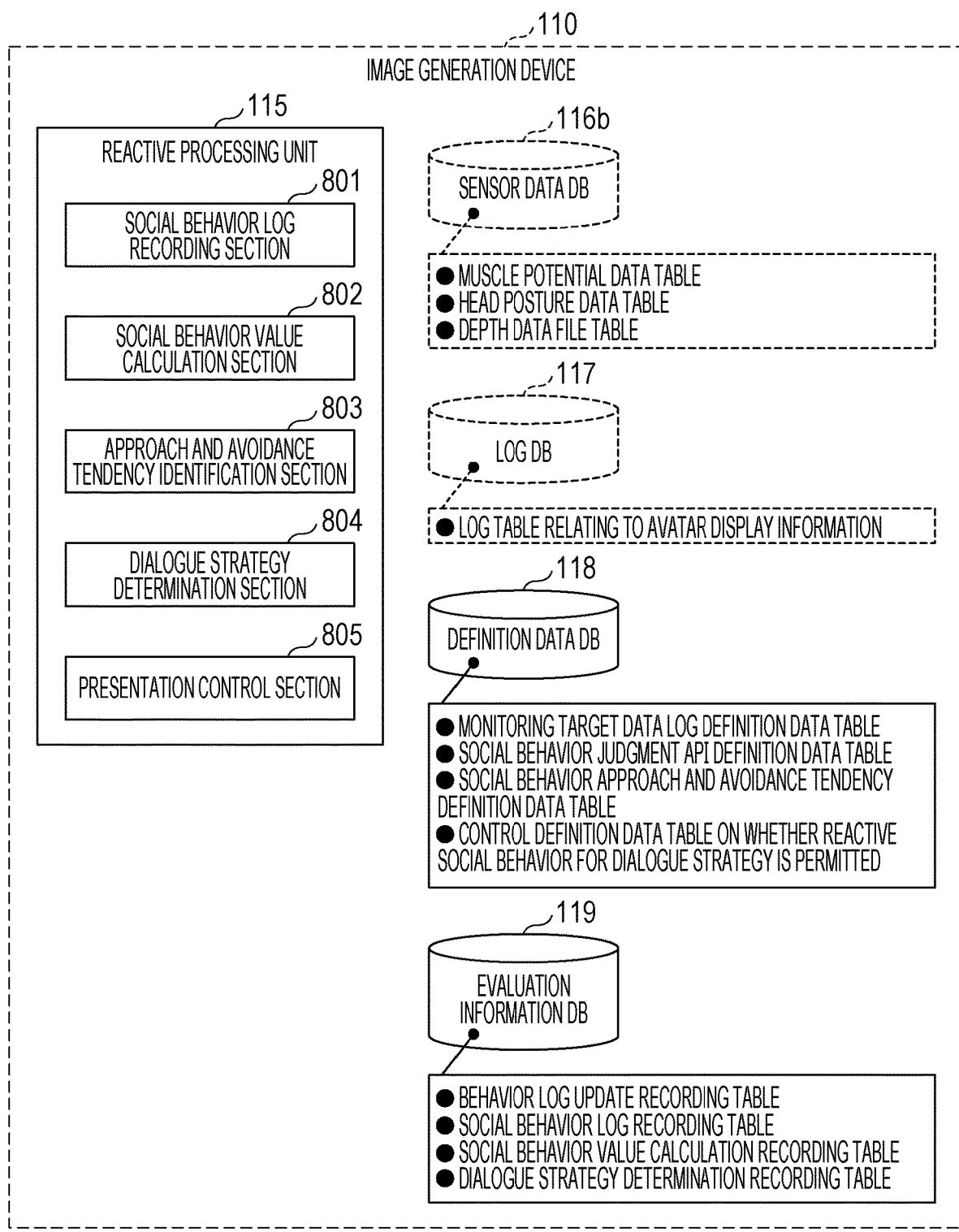
FIG. 8 is a first diagram illustrating a functional configuration of the reactive processing unit of the image generation device.

In the following, description is given of a functional configuration of the reactive processing unit 115 of the image generation device 110. FIG. 8 is a first diagram illustrating the functional configuration of the reactive processing unit of the image generation device. As illustrated in FIG. 8, the reactive processing unit 115 includes a social behavior log recording section 801, a social behavior value calculation section 802, an approach and avoidance tendency identification section 803, a dialogue strategy determination section 804, and a presentation control section 805.

The social behavior log recording section 801 monitors a "log table relating to avatar display information" stored in the log DB 117. Note that as described above, the "log table relating to avatar display information" is a table recording, as log data, data used when the basic function unit of the image generation device 110 generates the avatar image, based on the respective tables stored in the sensor data DB 116b.

When monitoring the "log table relating to avatar display information", the social behavior log recording section 801 refers to a "monitoring target data log definition data table" stored in the definition data DB 118 and identifies the avatar skeleton and an update threshold of the part targeted for monitoring.

In addition, of log data included in the "log table relating to avatar display information", the social behavior log recording section 801 identifies log data for which a change in the positional coordinates and the rotation angle of the avatar skeleton of the part targeted for the part exceeds the update threshold. In addition, the social behavior log recording section 801 records the identified log data in a "behavior log update recording table" of the evaluation information DB 119.

Note that the social behavior log recording section 801 may also refer to the "behavior log update recording table" stored in the evaluation information DB 119, in addition to the "log table relating to avatar display information" stored in the log DB 117. This is because the "behavior log update recording table" records the positional coordinates and the rotation angle at previous time points of the avatar skeleton of the part targeted for monitoring.

Furthermore, the social behavior log recording section 801 judges whether or not the identified log table corresponds to the social behavior. If so, the social behavior log recording section 801 records the identified log data in the "social behavior log recording table".

Note that when judging whether or not the identified log data corresponds to the social behavior, the social behavior log recording section 801 uses an API defined in a social behavior judgment API definition data table of the definition data DB 118. The API stands for Application Programming Interface and acts as a library to judge the social behavior.

The social behavior value calculation section 802 calculates or identifies various information relating to the social behavior, for each log data recorded in the "social behavior log recording table". The various information relating to the social behavior includes—intensity of the social behavior, —an attribute value of the social behavior, —information indicating approach tendency and avoidance tendency of the social behavior, —whether or not there is a touch on a body part by the social behavior, —whether or not an expression is presented due to the social behavior, —whether or not there is a touch on the body part due to reception of the social behavior, —whether or not there the expression is presented due to the reception of the social behavior, or the like. Of the above, in the first embodiment, the information indicating the social behavior approach tendency and the avoidance tendency is used in determining a dialogue strategy (information for identifying practicable behavior or behavior practice of which be avoided). The information indicating the social behavior approach tendency and the avoidance tendency is information indicating whether each log data indicates the social behavior of the approach tendency or the social behavior of the avoidance tendency. The social behavior value calculation section 802 identifies the social behavior tendency by referring to the "social behavior approach and avoidance tendency definition data table", for example.

The social behavior value calculation section 802 also records various information relating to the social behavior in a "social behavior value calculation recording table" of the evaluation information DB 119.

Note that among the various information relating to the social behavior, which is calculated or identified by the social behavior value calculation section 802, any information other than the information indicating the social behavior approach tendency and the avoidance tendency shall be used in determining the dialogue strategy, in a second embodiment.

The approach and avoidance tendency identification section 803 is an example of the identification section. The approach and avoidance tendency identification section 803 judges the social behavior tendency to the dialogue partner in a predetermined temporal interval, based on the "social behavior value calculation recording table". Specifically, the approach and avoidance tendency identification section 803 identifies the social behavior tendency to the dialogue partner by referring to information indicating the "social behavior approach tendency and avoidance tendency" in the predetermined temporal interval recorded in the "social behavior value calculation recording table".

The dialogue strategy determination section 804 is an example of the determination section. The dialogue strategy determination section 804 determines the dialogue strategy which is an example of a communication strategy to the dialogue partner, based on the social behavior to the dialogue partner, identified by the approach and avoidance tendency identification section 803.

The presentation control section 805 is an example of the control section. If it is judged that user 140 performs the social behavior to the user 150, for example, the presentation control section 805 judges whether the reactive social behavior is permitted for the determined dialogue strategy (dialogue strategy of the user 150 to the user 140). Note that in judging whether or not the reactive social behavior is permitted, the presentation control section 805 refers to a "control definition data table on whether reactive social behavior for dialogue strategy is permitted" of the definition data DB 118.

If the presentation control section 805 judges that the reactive social behavior is permitted, the presentation control section 805 also generates the avatar image indicating the reactive social behavior of the user 150, which is associated with the determined dialogue strategy, and transmits the avatar image to the information display processing section 112 (illustrated in FIG. 1). In addition, the presentation control section 805 instructs the information display processing section 112 to display the avatar image indicating the reactive social behavior of the user 150. Furthermore, the presentation control section 805 records the dialogue strategy of this time in a "dialogue strategy determination recording table" of the evaluation information DB 119.

<Description of Table Relating to Processing of Respective Components of Reactive Processing Unit>

In the following, description is given of respective tables relating to processing of the respective components (social behavior log recording section 801 to the presentation control section 805) of the reactive processing unit 115.

(1) Respective Tables of the Sensor Data DB 116*b*

FIGS. 9A to 9C are diagrams illustrating examples of the respective tables stored in the sensor data DB. Of the examples, FIG. 9A illustrates a muscle potential data table 900 in which the muscle potential data is stored. As illustrated in FIG. 9A, the muscle potential data table 900 in which the muscle potential data is stored includes, as an information item, "DB recording time", "sensor recording time", "user ID", "information collector ID", and "muscle potential activity value (or EMG value)".

In the "DB recording time" is recorded a time stamp to be added when the muscle potential data transmitted from the client-side systems 120, 130 is stored in the sensor data DB 116*b*.

In the "Sensor recording time" is recorded the time stamp added when the muscle potential sensors 126, 136 sense the users 140, 150.

In the "User ID" is recorded an identifier identifying the users 140, 150 sensed by the muscle potential sensors 126, 136.

In the "Information collector ID", the identifier identifying the muscle potential sensor is recorded. The muscle potential sensor has the identifier that varies depending on a location where the sensing takes place. Of data rows in FIG. 9A, "TcA_c3_zygomaticus (check)" on a first row is the identifier of the muscle potential sensor that senses cheeks.

In addition, of the data rows in FIG. 9A, "TcA_c3_orbicularis (under eye)" on a second row is the identifier of the muscle potential sensor that senses an under eye area. Furthermore, of the data rows in FIG. 9A, "TcA_c3_corrugator (blow)" on a third row is the identifier of the muscle potential sensor that senses an eyebrow.

In the "Muscle potential activity value" are recorded values of the muscle potential data sensed by the respective muscle potential sensors.

FIG. 9B illustrates a head posture data table 910 in which the head posture data is stored. As illustrated in FIG. 9B, items of information included in the head posture data table 910 are roughly same as the items of information included in the muscle potential data table 900.

Note that in the "information collector ID" in the head posture data table 910, "TcA_c1" indicates that the information processor with the information processor ID of "TcA" is associated with the information collector of the information collector type "c1". Specifically, "TcA_c1" is the head posture sensor 124 associated with the information processor 121.

In addition, in the "header posture data", data representing the positional coordinates of the head and data representing the rotation angle of the head are recorded.

FIG. 9C illustrates a depth sensor data file table 920 in which the depth sensor data is stored. As illustrated in FIG. 9C, the "depth sensor data file table" 920 includes, as the information item, the "DB recording time", the "user ID", and the "information collector ID", similar to other sensor data tables. In addition, the "depth sensor data file table" 920 includes, as the information item, "sensor recording start time", "sensor recording end time", and "depth sensor data recording file URI".

In the "sensor recording start time", time when the depth sensors 125, 135 start sensing is recorded. In the case of the depth sensors 125, 135, the sensor data is outputted as a file of a predetermined recording length. Thus, in the "sensor recording start time" is recorded the time stamp added when the first depth sensor data included in each file is sensed.

In the "sensor recording end time" is recorded time when the sensing by the depth sensors 125, 135 (illustrated in FIG. 1) ends. Specifically, the time stamp added when the last depth sensor data included in the file of the predetermined recording length is sensed is recorded.

In the "depth sensor data recording file URI" is recorded an URI representative of a location where the file having the predetermined recording length is stored.

Note that in the "information collector ID" in the "depth sensor data file table" 920, "TcA_c2" indicates that the information processor with the information processor ID of "TcA" is associated with the information collector of the information collector type "c2". Specifically, "TcA_c2" represents the depth sensor 125 associated with the information processor 121.

(2) Tables of Log DB 117

FIG. 10 is a diagram illustrating an example of the log table relating to avatar display information stored in the log DB. A "log table relating to avatar display information" 1000 records data (positional coordinates and the rotation angle of the respective avatar skeletons) used in generating the avatar image as the log data.

As illustrated in FIG. 10, the "log table relating to avatar display information" 1000 includes, as the information item, the "DB recording time", "user current time", the "user ID", "information processor ID", "log type label", and "log data of avatar display information".

In the "DB recording time" is recorded time when the data used in generating the avatar image is recorded, as the log data, in the "log table relating to avatar display information" 1000.

In the "user current time", time when the user performs the non-verbal action corresponding to the log data is recorded. In the "user ID", the identifier identifying the user who performs the non-verbal action is recorded.

In the "information processor ID" is recorded the identifier identifying the information processor that manages the user who performs the non-verbal action.

In the "log type label", information indicating a method of expression in generating the avatar image is recorded. In an example of FIG. 10, "bone" indicating that the non-verbal action is expressed through the use of the avatar skeleton model and "mesh" indicating that the non-verbal action is expressed through the use of a mesh are recorded.

In the "log data of avatar display information", the data used in generating the avatar image is recorded as a structured list.

An example of the first row of the data rows in FIG. 10 indicates that as a result of the user 140 with the user ID="userA" performing the non-verbal action at "11:00:00:000 on Jul. 27, 2015", the positional coordinates of the avatar skeleton of the head becomes (0, 18, −10). In addition, the example also indicates that the rotation angle of the avatar skeleton of the head becomes (0, 1, 0). The example also indicates that the log data of the avatar display information including the positional coordinates and the rotation angle are recorded in the in the log DB 117 at "11:00:00:020 on Jul. 27, 2015".

(3) Respective Tables of the Definition Data DB 118

In the following, description is given of the respective tables stored in the definition data DB 118.

(3-1) Monitoring Target Data Log Definition Data Table

FIG. 11 is a diagram illustrating an example of the monitoring target data log definition data table stored in the definition data DB. As illustrated in FIG. 11, the "monitoring target data log definition data table" 1100 includes, as the information item, "behavior log type label", "update threshold", "update monitoring target", "sensor input information", and the "information collector ID".

The "behavior log type label" defines a type of behavior of the part targeted for monitoring when the social behavior log recording section 801 (illustrated in FIG. 8) monitors the "log table relating to avatar display information" 1000 (illustrated in FIG. 10) and the "behavior log update recording table" 1600 (illustrated in FIGS. 16A-16D).

The "update monitoring target" defines the threshold to be used when the social behavior log recording section 801 judges whether or not the log data stored in the "log table relating to avatar display information" 1000 or the like is to be recorded in the "behavior log update recording table".

The "update monitoring target" defines a specific avatar skeleton for monitoring a type of the behavior of the part defined in the "behavior log type label".

The "sensor input information" defines a type of the sensor data for identifying the positional coordinates and the rotation angle of the avatar skeleton of the part defined for the "update monitoring target". The "information collector ID" defines the identifier for identifying the sensor used to collect the sensor data defined in the "sensor input information".

In an example on the first row of the data rows of FIG. 11, the avatar skeleton is targeted for monitoring, the avatar skeleton being calculated based on the depth sensor data sensed by the depth sensor which is identified by the identifier="TcA_c2". Specifically, the avatar skeleton (Bone_Head, Bone_Righthand, and Bone_Lefthand) of the head or a right arm or a left arm is targeted for monitoring.

The social behavior log recording section 801 refers to the "log table relating to avatar display information" 1000 and the "behavior log update recording table" 1600, described below. Then, the social behavior log recording section 801 judges whether or not the change in the positional coordinates (X coordinate, Y coordinate, and Z coordinate) of any of the avatar skeletons of these avatar skeletons is larger than "1". This enables the social behavior log recording section 801 to monitor the behavior that changes the physical distance of the body parts (Distance_Bodyparts) in the virtual spaces of the image 220 of the avatar of the user 140 and the image 230 of the avatar of the user 150. Here, the social behavior log recording section 801 may monitor the behavior that changes the physical distance of the head, the right arm, and the left arm.

(3-2) Social Behavior Judgment API Data Table

FIG. 12 is a diagram illustrating an example of a social behavior judgment API definition data table stored in the definition data DB. The "social behavior judgment API definition data table" 1200 is a table to be used in judging whether or not the log data recorded in the "behavior log update recording table" by the social behavior log recording section 801 (illustrated in FIG. 8) corresponds to the social behavior.

As illustrated in FIG. 12, the social behavior judgment API definition data table 1200 includes, as the information item, "social behavior type label", "social behavior judgment API", and "behavior log type label".

The "social behavior type label" defines a type of the social behavior judged by the social behavior judgment API. The "social behavior judgment API" defines the API to be used in judging the social behavior. The API to be used in judging the social behavior is defined depending on the "behavior log type label" in the "monitoring target data log definition data table" 1100 (illustrated in FIG. 11).

Thus, the "social behavior judgment API" is associated with the "behavior log type label" and defined. The "behavior log type label" defines the type of the behavior defined in the "monitoring target data log definition data table" 1100.

An example on the fifth row of the data rows of FIG. 12 indicates that for the log data for which the change in the physical distance of the body parts (Distance_Bodyparts) is more than the update threshold, the social behavior log recording section 801 judges the type of social behavior. According to the example, the social behavior log recording section 801 uses movement confirmation API to judge whether or not the log data corresponds to the social behavior (Distance_Bodyparts_Closeto).

(3-3) Social Behavior Approach and Avoidance Tendency Definition Data Table

FIG. 13 is a diagram illustrating an example of the social behavior approach and avoidance tendency definition data table stored in the definition data DB. The "social behavior approach and avoidance tendency definition data table" 1300 is used when the social behavior value calculation section 802 (illustrated in FIG. 8) judges whether the social behavior judged by the social behavior log recording section 801 is the approach tendency or the avoidance tendency.

As illustrated in FIG. 13, the "social behavior approach and avoidance tendency definition data table" 1300 includes "social behavior log type label" and "approach and avoidance tendency", as the information item.

The "social behavior log type label" defines the type of social behavior (all of the social behavior types defined in the "social behavior judgment API definition data table" 1200 are defined). The "approach and avoidance tendency" defines any of the approach tendency or the avoidance tendency for the type of each social behavior.

An example on the fifth row of the data rows of FIG. 13 indicates that if the social behavior type is the "Distance_Bodyparts_Closeto", the social behavior value calculation section 802 judges that the social behavior is the social behavior of the approach tendency.

Note that the respective records stored in the "social behavior log type label" of the "social behavior approach and avoidance tendency definition data table" 1300 mean the following actions.

For example, "Distance_Upperbody_Closeto" refers to an action to move an upper body to a partner, and "Distance_Upperbody_Farfrom" refers to an action to move the upper body away from the partner. In addition, "Distance_Face_Closeto" refers to an action to move a face to the partner, and "Distance_Face_Farfrom" refers to an action to move the face away from the partner.

In addition, "Distance_Bodyparts_Closeto" refers to an action to move the body part close to the partner and "Distance_Bodyparts_Farfrom" refers to an action to move the body part away from the partner. "Attention_Mutual" refers to an action to pay attention to each other and "Attention_Averted" refers to an action to avert the attention.

In addition, "Attention_Joint" refers to an action to pay attention to a same object as the partner does, and "Attention_Following" refers to an action to pay attention following the partner paying attention. "Orientation_Face_Directto" refers to an action to turn a face to a direction in which the partner is present, and "Orientation_Face_Indirectto" refers to an action to turn the face to a direction opposite to the direction in which the partner is present.

In addition, "Orientation_Upperbody_Directto" refers to an action to turn the upper body to a direction in which the partner is present, and "Orientation_Upperbody_Indirectto" refers to an action to turn the upper body to the direction opposite to the direction in which the partner is present. "Lean_Upperbody_Forward" refers to an action to lean the upper body forward, and "Lean_Upperbody_Backward" refers to an action to lean the upper body backward.

In addition, "Gesture_Smileto" refers to an action to smile. Furthermore, "Gesture_Positivemeaninggestureto" refers to an action to give a positive sign, and "Gesture_Negativemeaninggestureto" refers to an action to give a negative sign.

(3-4) Control Definition Data Table on Whether Reactive Social Behavior for Dialogue Strategy is Permitted FIG. 14 is a diagram illustrating an example of a control definition data table on whether a reactive social behavior for a dialogue strategy is permitted, stored in the definition data DB. The "control definition data table on whether reactive social behavior for dialogue strategy is permitted" 1400 is used when the presentation control section 805 (illustrated in FIG. 8) judges whether or not the reactive social behavior is permitted.

As illustrated in FIG. 14, the "control definition data table on whether reactive social behavior for dialogue strategy is permitted" 1400 includes, as the information item, "permission control condition ID", "permission control condition", and "implementation flag".

The "permission control condition ID" defines the identifier for identifying a permission control condition. The "permission control condition" defines a condition for permitting presentation to the dialogue partner of the reactive social behavior to the dialogue strategy. The "implementation flag" defines information indicating whether or not the permission based on the corresponding "permission control condition" is given.

In an example of FIG. 14, two conditions are defined as the "permission control condition". In the case of the permission control condition identified by a permission control condition ID="1", presentation of the reactive social behavior to the dialogue partner is not permitted even in any dialogue strategy. However, the presentation of the reactive social behavior starting with "shortly" to the dialogue partner is permitted.

In the case of the permission control condition identified by the permission control condition ID="2", the presentation of the reactive social behavior to the dialogue partner is permitted in any dialogue strategy. However, the presentation of the reactive social behavior starting with "Enforcing_Totally" to the dialogue partner is not permitted.

Note that in the example of FIG. 14, the "implementation flag" of the permission control condition ID="1" is "TRUE", and the "implementation flag" of the permission control condition ID="2" is "FALSE". Thus, in the case of the example of the FIG. 14, the presentation control section 805 controls whether or not to present to the dialogue partner the reactive social behavior, based on the permission control condition of the permission control condition ID="1".

<Details of Presentation Control Processing of Reactive Processing Unit>

Figure 15:
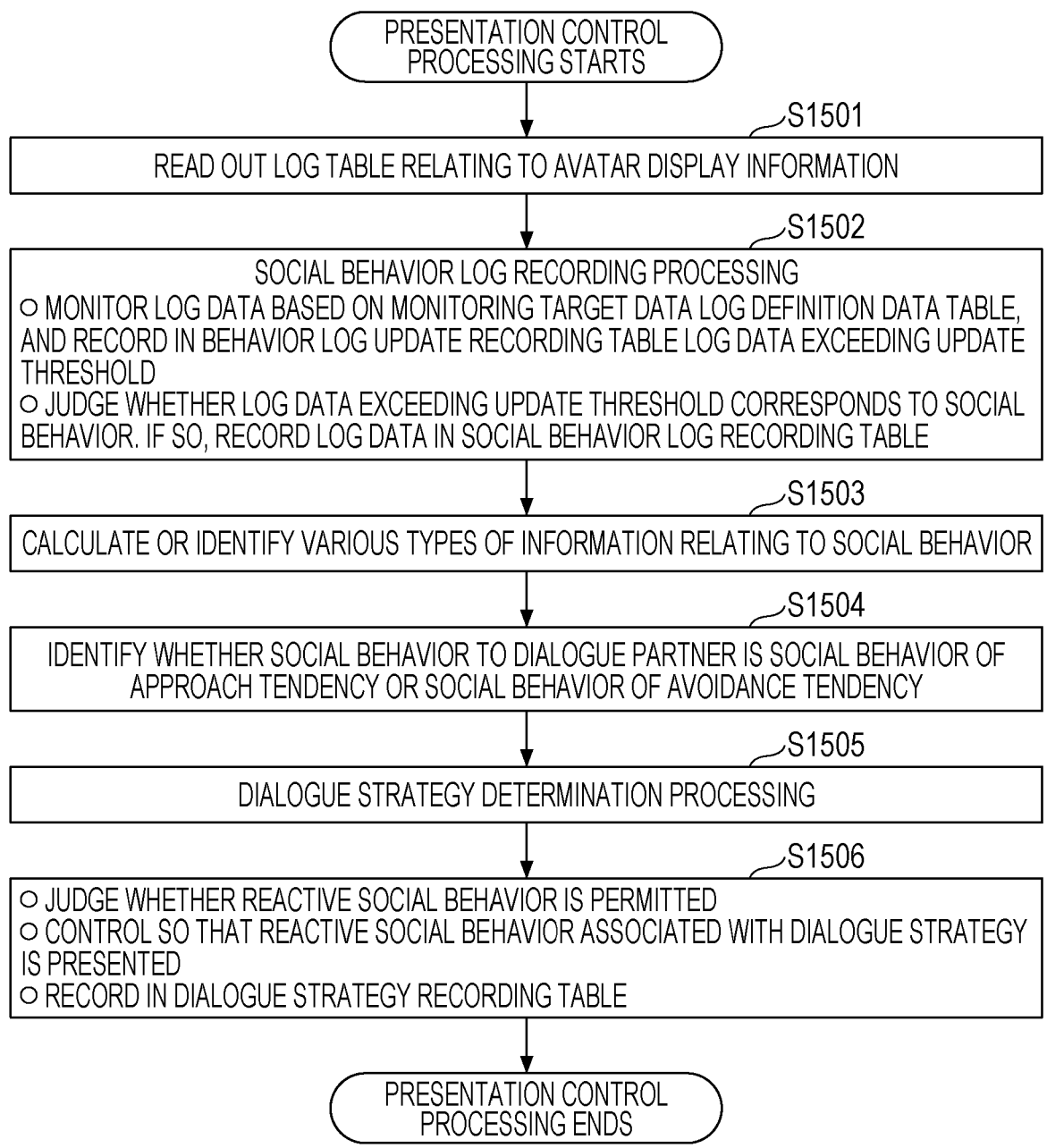
FIG. 15 is a first flowchart illustrating details of the presentation control processing of the reactive processing unit.

In the following, detailed description is given of the presentation control processing of the reactive processing unit 115 (illustrated in FIG. 1). FIG. 15 is a first flowchart illustrating details of the presentation control processing of the reactive processing unit. The presentation control processing illustrated in FIG. 15 is started when the users 140 and 150 (illustrated in FIG. 1) start to utilize the communication service and the log data is stored in the "log table relating to avatar display information" 1000 (illustrated in FIG. 10). Meanwhile, in the following, although it is described that the dialogue strategy is determined every time the presentation control processing is performed, the dialogue strategy may be determined for every predetermined period or whenever a certain amount of the social behavior recorded.

In step S1501, the social behavior log recording section 801 (illustrated in FIG. 8) reads out the "log table relating to avatar display information" 1000 and the "behavior log update recording table" 1600 (illustrated in FIGS. 16A-16D) described below.

In step S1502, the social behavior log recording section 801 monitors the log data in the "log table relating to avatar display information" 1000, based on the "monitoring target data log definition data table" 1100 (illustrated in FIG. 11), or the like. In addition, if the log data exceeding the update threshold is detected, the social behavior log recording section 801 records the log data in the "behavior log update recording table" of the evaluation information DB 119. FIGS. 16A to 16D are diagrams illustrating an example of the behavior log update recording table recorded in the evaluation information DB. Note that details of the "behavior log update recording table" 1600 illustrated in FIGS. 16A and 16D are described below.

Furthermore, the social behavior log recording section 801 judges whether or not the log data recorded in "behavior log update recording table" 1600 corresponds to the social behavior. If so, the social behavior log recording section 801 judges a type of the social behavior, using the social behavior judgment API. Additionally, the social behavior log recording section 801 determines any of which social behavior judgment API is used, by referring to the "social behavior judgment API definition data table" 1200 (illustrated in FIG. 12).

Furthermore, the social behavior log recording section 801 records the log data judged to correspond to the social behavior together with the judged type of the social behavior in the "social behavior log recording table" in the evaluation information DB. FIG. 17 is a diagram illustrating an example of the social behavior log recording table recorded in the evaluation information DB. Note that details of the "social behavior log recording table" 1700 illustrated in FIG. 17 are described below.

In step S1503, the social behavior value calculation section 802 calculates or identifies various information relating to the social behavior judged by the social behavior log recording section 801.

Specifically, the social behavior value calculation section 802 calculates or identifies, as the various information relating to the social behavior, intensity of the social behavior, the attribute value of the social behavior, continued seconds of the social behavior, and approach and avoidance tendency of the social behavior. Additionally, when identifying the approach and avoidance tendency of the social behavior, the social behavior value calculation section 802 refers to the "social behavior approach and avoidance tendency definition data table" 1300 (illustrated in FIG. 13).

Furthermore, the social behavior value calculation section 802 calculates, as the various information relating to the social behavior, information disclosure by the non-verbal action (whether or not there is a touch on the body) and presentation of the information disclosure by the non-verbal action (whether or not the intention and the demeanor (expression or the like) are presented).

Furthermore, the social behavior value calculation section 802 calculates, as the various information relating to the social behavior, information disclosed by the non-verbal action (whether or not there is the touch on the body) and presentation of the information disclosed by the non-verbal action (whether or not an intention and a demeanor (expression or the like) are presented).

The social behavior value calculation section 802 records the calculated or identified various information relating to the social behavior in the "social behavior value calculation recording table". FIGS. 18A and 18B are diagrams illustrating an example of the social behavior value calculation recording table recorded in the evaluation information DB. Note that details of the "social behavior value calculation recording table" 1800 illustrated in FIGS. 18A and 18B are described below.

In step S1504, the approach and avoidance tendency identification section 803 refers to the "social behavior value calculation recording table" 1800. As described above, in the first embodiment, the dialogue strategy is determined based on the "social behavior approach and avoidance tendency" recorded in the various information record in the "social behavior value calculation recording table" 1800.

Then, the approach and avoidance tendency identification section 803 refers to the log data that is the log data in the predetermined temporal interval and has a behaving avatar ID="AV2" and a behaved avatar ID="AV1", in the "social behavior value calculation recording table" 1800. The approach and avoidance tendency identification section 803 identifies whether tendency of the social behavior of the user 150 to the user 140 in the predetermined temporal interval is the approach tendency or the avoidance tendency.

In step S1505, the dialogue strategy determination section 804 determines the dialogue strategy. Specifically, the dialogue strategy determination section 804 determines the dialogue strategy of the user 150 to the user 140 based on the identified tendency.

In step S1506, the presentation control section 805 refers to the "control definition data table on whether reactive social behavior for dialogue strategy is permitted" 1400 (illustrated in FIG. 14). With this, the presentation control section 805 judges whether or not presentation of the reactive social behavior for the determined dialogue strategy to the user 140 is permitted.

If the presentation control section 805 judges that the presentation is permitted, the presentation control section 805 controls to generate the avatar image based on the reactive social behavior associated with the determined dialogue strategy and present to the user 140. Note that in the first embodiment, the reactive social behavior associated with the dialogue strategy is predefined.

Furthermore, the presentation control section 805 records the determined dialogue strategy in the "dialogue strategy determination recording table" of the evaluation information DB 119 (illustrated in FIG. 8). FIG. 19 is a diagram illustrating an example of the dialogue strategy determination recording table recorded in the evaluation information DB. Note that details of the "dialogue strategy determination recording table" 1900 illustrated in FIG. 19 are described below.

<Description of Table Recorded by Reactive Processing Unit>

In the following, description is given of the respective tables recorded in the evaluation information DB 119 that are recorded as the reactive processing unit 115 performs the presentation control processing (FIG. 15).

(1) Behavior Log Update Recording Table 1600.

First, the "behavior log update recording table" 1600 of FIGS. 16A-16D is described. As illustrated in FIGS. 16A-16D, the "behavior log update recording table" 1600 includes, as the information item, the "DB recording time", "recording start time", "recording update time", the "behaving avatar ID", the "behavior log type label", and the "update monitoring target". The "behavior log update recording table" 1600 also includes, as the information item, "update status", "data at recording start", "data at recording update", and "social behavior log recording ID reference value".

In the "DB recording time" is recorded time when the social behavior log recording section 801 (illustrated in FIG. 8) records in the "behavior log update recording table" 1600 that there is the log data exceeding the update threshold.

In the "recording start time" is recorded time when the user starts to record the non-verbal action corresponding to the log data exceeding the update threshold.

In the "recording update time" is recorded time when the user performs the corresponding non-verbal action corresponding to the log data at the time when the log data exceeds the update threshold.

In the "behavior avatar ID" is recorded the avatar identifier of the user who performs the non-verbal action corresponding to the log data exceeding the update threshold.

In the "behavior log type label" is recorded the type of the behavior of the part targeted for monitoring when the social behavior log recording section 801 monitors the "log table relating to avatar display information" 1000 (illustrated in FIG. 10) or the like.

In the "update monitoring target" is recorded the specific avatar skeleton used to monitor the type of the behavior of the part recorded in the "behavior log type label".

In the "update status" is recorded a result of a comparison with the update threshold. If a difference between the log data at the previous time and the log data at the present time exceeds the update threshold, "change being recorded" is recorded in the "update status". On the other hand, if the difference between the log data at the previous time and the log data at the present time does not exceed the update threshold, "no change record" is recorded in the "update status". Note that for the avatar skeleton of the part targeted for monitoring, as long as "change being recorded" continues, same time is recorded in the "recording start time".

If the log data exceeding the update value is the log data for which the positional coordinates or the rotation angle of the avatar skeleton of the part targeted for monitoring are in change being recorded, in the "data at recording start" are recorded the positional coordinates and the rotation angle of when the change recording starts.

If the log data exceeding the update threshold is the log data for which the positional coordinates or the rotation angle of the avatar skeleton of the part targeted for monitoring are in change being recorded, in the "data at recording update" are recorded the positional coordinates and the rotation angle of when the record is updated.

In the "social behavior log recording ID reference value" is recorded the identifier for referring to the record on the database of the social behavior log data, if the social behavior log recording section 801 judges that the log data exceeding the update threshold corresponds to the social behavior.

(2) Social Behavior Log Recording Table 1700

In the following, the "social behavior log recording table" 1700 of FIG. 17 is described. As illustrated in FIG. 17, the "social behavior log recording table" 1700 includes, as the information item, the "DB recording time", the "recording start time", the "recording end time", the "behaving avatar ID", and the "behaved avatar ID". The "social behavior log recording table" 1700 also includes, as the information item, the "social behavior log recording ID", the "social behavior type label", and the "social behavior log type label".

In the "DB recording time" is recorded time when the log data recorded in the "social behavior log update recording table" 1600 (illustrated in FIGS. 16A-16D) is judged to correspond to the social behavior and recorded in the "social behavior log recording table" 1700.

In the "recording start time" is record time when the user starts the non-verbal action corresponding to the log data judged to correspond to the social behavior.

In the "recording end time" is recorded time when the user ends the non-verbal action corresponding to the log data judged to correspond to the social behavior.

In the "behaving avatar ID" is recorded the identifier identifying the avatar of the user who performs the social behavior.

In the "behaved avatar ID" is recorded the identifier identifying the avatar of the user who receives the social behavior.

In the "social behavior log recording ID" is recorded the identifier for identifying the log data of the judged social behavior.

In the "social behavior type label" is recorded the type of the judged social behavior. In the "behavior log type label" is recorded the type of the behavior indicated by the log data judged to corresponding to the social behavior.

(3) Social Behavior Value Calculation Recording Table 1800

In the following, the "social behavior value calculation recording table" 1800 of FIGS. 18A-18B is described. As illustrated in FIGS. 18A-18B, the "social behavior value calculation recording table" 1800 includes, as the information item, the "DB recording time", the "recording start time", the "recording end time", the "behaving avatar ID", the "behaved avatar ID", and the "social behavior log recording ID".

The "social behavior value calculation recording table" 1800 also includes, as the information item, the "social behavior type label", "intensity of social behavior", and "attribute value of social behavior".

The "social behavior value calculation recording table" 1800 also includes "continued seconds of social behavior" and "social behavior approach and avoidance tendency", as the information item.

The "social behavior value calculation recording table" 1800 also includes, as the information item, "information disclosure by non-verbal action (whether or not there is touch on body)" and "information disclosure by non-verbal action (whether or not intention and demeanor (expression or the like) are presented)".

The "social behavior value calculation recording table" 1800 also includes, as the information item, "information disclosed by non-verbal action (whether or not there is touch on body)" and "information disclosed by non-verbal action (whether or not intention and demeanor (expression or the like) are presented)".

Of these information items, when the respective information items are viewed in a direction from the left to the right of FIGS. 18A-18B, the respective information items from the "DB recording time" from the "social behavior type label" are similar to the respective information items included in the "social behavior log recording table" 1700 (illustrated in FIG. 17). Thus, description is omitted. Here, description is given of the various information relating to the social behavior when the respective information items are viewed in the direction from the left to the right of FIGS. 18A-18B. That is, description is given of information recorded in the respective information items from the "intensity of social behavior" to the "information disclosed by non-verbal action (whether or not intention and demeanor (expression or the like) are presented)".

In the "intensity of social behavior" is recorded a numeric value representing the intensity of the social behavior. In the "attribute value of social behavior" is recorded an amount of change in the physical distance or the amount of change in the rotation angle that are calculated when it is judged whether or not to correspond to the social behavior.

In the "continued seconds of social behavior" is recorded the continued time (seconds) of the log data judged to correspond to the social behavior.

In the "social behavior approach and avoidance tendency" is recorded a result of judgment that judges whether the social behavior is the social behavior of the approach tendency or the social behavior of the avoidance tendency.

In the "information disclosure by non-verbal action (whether or not there is touch on body)" is recorded information indicating whether or not the avatar of the user who performs the social behavior by performing the non-verbal action touches the avatar of the user who receives the social behavior.

In the "information disclosure by non-verbal action (whether or not intention and demeanor (expression or the like) are presented)" is recorded information indicating whether or not the expression or the like of the avatar of the user who performs the social behavior by performing the non-verbal action is presented to the user who receives the social behavior.

In the "information disclosed by non-verbal action (whether or not there is touch on body)" is recorded information indicating whether or not the avatar of the user who receives the social behavior is touched by the avatar of the user who performs the social behavior by performing the non-verbal action.

In the "information disclosed by non-verbal action (whether or not intention and demeanor (expression or the like) are presented)" is recorded information indicating whether or not the user who receives the social behavior is presented with the expression or the like of the avatar of the user who performs the social behavior by performing the non-verbal action.

(4) Dialogue Strategy Determination Table 1900

In the following, the "dialogue strategy determination recording table" 1900 of FIG. 19 is described. As illustrated in FIG. 19, the "dialogue strategy determination recording table" 1900 includes, as the information item, the "DB recording time", the "behaving avatar ID", the "behaved avatar ID" and the "dialogue strategy".

In the "DB recording time" is recorded time when the presentation control section 805 (illustrated in FIG. 8) records in the "dialogue strategy determination recording table" 1900 the dialogue strategy to be used to control so as to present the reactive social behavior to the dialogue partner.

In the "behaving avatar ID" and the "behaved avatar ID" are respectively recorded the user's avatar ID. In the "dialogue strategy" is recorded the dialogue strategy by the user of the avatar ID recorded in the "behaving avatar ID" to the user of the avatar ID recorded in the "behaved avatar ID".

As is clear from the foregoing description, the image generation device 110 according to the first embodiment includes the reactive processing unit 115 and monitors the log table in the "log table relating to avatar display information" and "behavior log update recording table" generated by the basic function unit (each illustrated in FIG. 1). In addition, when the first user (user 140) performs the social behavior to the second user (user 150), the reactive processing unit 115 identifies the tendency of the social behavior in the predetermined temporal interval that is performed by the second user to the first user (each illustrated in FIG. 1). The reactive processing unit 115 also determines the dialogue strategy of the second user to the first user based on the identified tendency.

Furthermore, if the first user performs the social behavior to the second user after the dialogue strategy is determined, the reactive processing unit 115 controls so that the reactive social behavior by the second user based on the determined dialogue strategy is presented to the first user.

Accordingly, with the image generation device 110 according to the first embodiment, if the first user performs the social behavior to the second user, the reactive social behavior may be presented without waiting for actual social behavior by the second user.

That is, with the image generation device 110 according to the first embodiment, if the users who are at positions spaced from each other dialogue through the avatars, it is possible to present the reactive behavior to the dialogue partner.

Second Embodiment

In the foregoing first embodiment, the description is given on the assumption that the dialogue strategy of the user 150 is determined based on the tendency of the social behavior of the user 150 to the user 140. In contrast to this, in a second embodiment, acceptability of the social behavior of the user 150 is judged based on the tendency of the social behavior of the user 150 to the user 140 in the predetermined temporal interval, and the dialogue strategy of the user 150 is determined based on the judged acceptability. Note that the acceptability of the social behavior of the user 150 refers to a possibility that the user 150 recognizes that he or she receives the social behavior when the user 140 performs the social behavior to the user 150. In the following, the second embodiment is described, mainly focusing on differences from the first embodiment.

<Functional Configuration of Reactive Processing Unit of Image Generation Device>

Figure 20:
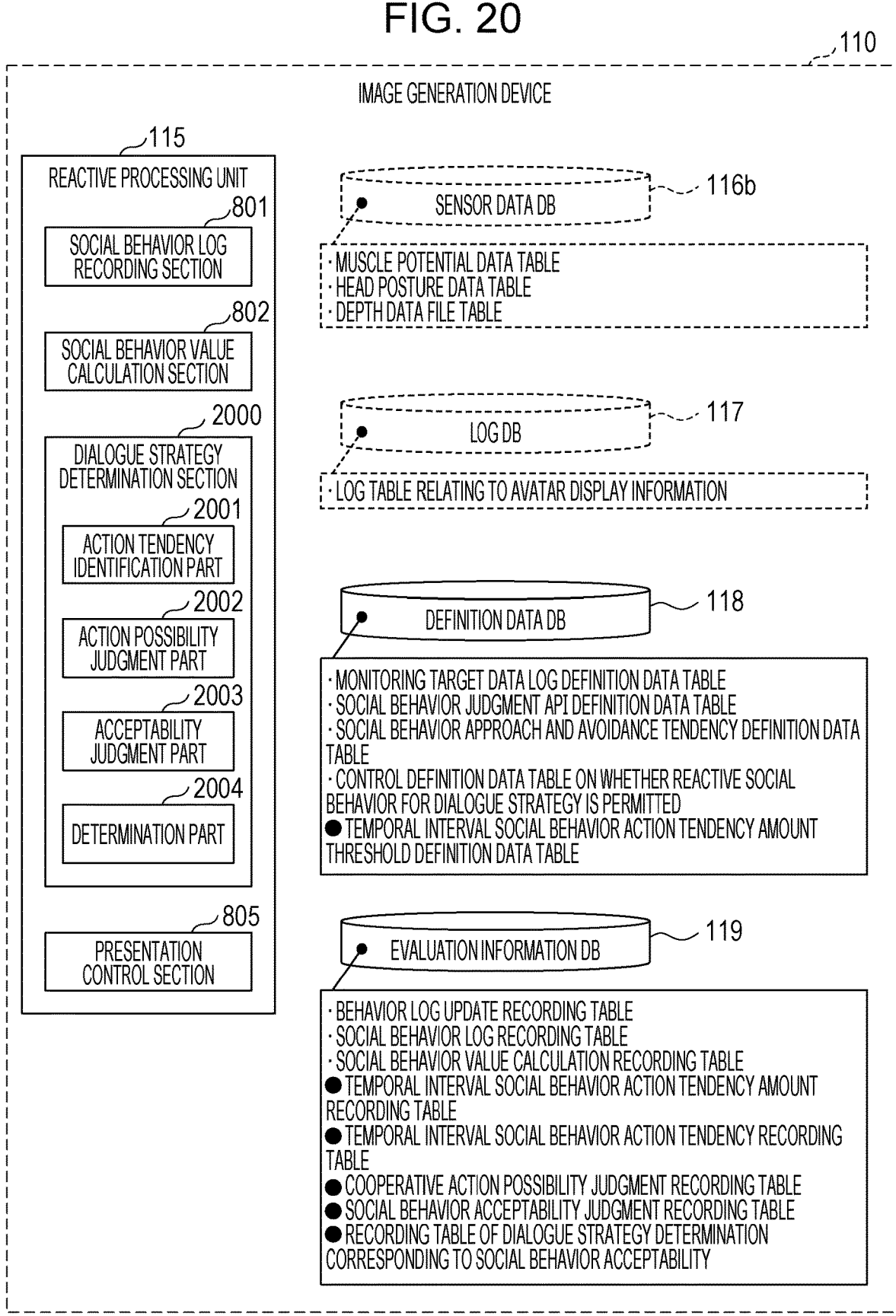
FIG. 20 is a second diagram illustrating the functional configuration of the reactive processing unit of the image generation device.

First, description is given of a functional configuration of the reactive processing unit 115 of the image generation device 110. FIG. 20 is a second diagram illustrating the functional configuration of the reactive processing unit of the image generation device.

The difference from FIG. 8 is that new tables are stored in a dialogue strategy determination section 2000, and the definition data DB 118 and the evaluation information DB 119. Note that of the tables depicted in the definition data DB 118 and the evaluation information DB 119 in FIG. 20, the tables marked with a filled circle represent the new tables.

As illustrated in FIG. 20, the dialogue strategy determination section 2000 includes an action tendency identification part 2001, an action possibility judgment part 2002, an acceptability judgment part 2003, and a determination part 2004.

The action tendency identification part 2001 refers to the "social behavior log recording table" 1700 and analyzes the social behavior performed by the user 150 to the user 140. The action tendency identification part 2001 also calculates a frequency of the approach tendencies (or an amount of time) and the frequency of the avoidance tendencies (or the amount of time) in the predetermined temporal interval.

The action tendency identification part 2001 also records the calculated frequency of the approach tendencies (or the amount of time) and frequency of the avoidance tendencies (or the amount of time) in a "temporal interval social behavior action tendency amount recording table" of the evaluation information DB 119.

The action tendency identification part 2001 also refers to a "temporal interval social behavior action tendency amount threshold definition data table" stored in the definition data DB 118 and compares the calculated frequency of approach tendencies (or the amount of time) and frequency of avoidance tendencies (or the amount of time). With this, the action tendency identification part 2001 identifies any of which of the approach action tendency, the avoidance action tendency, or the intermediate action tendency the action tendency of the social behavior performed by the user 150 to the user 140 corresponds to (illustrated in FIG. 1).

Furthermore, the action tendency identification part 2001 records the identified action tendency in the "temporal interval social behavior action tendency recording table" in the evaluation information DB 119.

The action possibility judgment part 2002 judges whether or not the user 150 may take a cooperative action to the user 140 (cooperative action possibility), and records a result of the judgment in a "cooperative action possibility judgment recording table" in the evaluation information DB 119.

The acceptability judgment part 2003 judges the possibility that the user 150 recognizes that he or she receives the social behavior when the user 140 performs the social behavior to the user 150. The acceptability judgment part 2003 judges the social behavior acceptability based on the action tendency of the social behavior of the user 150 to the user 140 and the result of the judgment on the cooperative action possibility of the user 150 to the user 140.

The determination part 2004 determines the dialogue strategy based on the result of the judgment on the social behavior acceptability of the user 150 and notifies the presentation control section 805 of the determined dialogue strategy.

Note that presentation control section 805 judges whether or not the reactive social behavior is permitted for the determined dialogue strategy. If the presentation control section 805 judges that the reactive social behavior is permitted, the presentation control section 805 transmits to the information display processing section 112 the avatar image representing the reactive social behavior of the user 150, the reactive social behavior being associated with the determined dialogue strategy. In addition, the presentation control section 805 instructs the information display processing section 112 to display the avatar image representing the reactive social behavior of the user 150. Furthermore, the presentation control section 805 records the dialogue strategy of this time in a "recording table of dialogue strategy determination corresponding to social behavior acceptability" in the evaluation information DB 119.

<Description of Table Relating to Processing of Respective Components of Reactive Processing Unit>

In the following, description is given of the table (here, "temporal interval social behavior action tendency amount threshold definition data table" stored in the definition data DB 118) relating to processing of the respective components of the reactive processing unit 115 (here, the dialogue strategy determination section 2000).

FIG. 21 is a diagram illustrating an example of the temporal interval social behavior action tendency amount threshold definition data table stored in the definition data DB. As illustrated in FIG. 21, "temporal interval social behavior action tendency amount threshold definition data table" 2100 includes, as the information item, a "category ID", the "action tendency", a "threshold (ratio of frequency)", and the "threshold (ratio of time [seconds])".

The "category ID" defines the identifier for identifying the action tendency identified by the action tendency identification part 2001. The "action tendency" defines the action tendency identified by the action tendency identification part 2001.

In the "threshold (ratio of frequency)" is defined the threshold of the action tendency amount (frequency) as a condition for identifying that the action tendency is the action tendency defined in the "action tendency". In the "threshold (ratio of time [seconds])" is defined the threshold of the action tendency amount (time) as the condition for identifying that the action tendency is the action tendency defined in the "action tendency".

According to an example of FIG. 21, if the approach action tendency amount (frequency) is 0.55 or more, and the approach action tendency amount (time) is 0.20 or more, the action tendency identification part 2001 identifies that the social behavior targeted for processing is the approach action tendency. If the approach action tendency amount (frequency) is 0.55 or more, or the approach action tendency amount (time) is 0.20 or more, the action tendency identification part 2001 may identify that the social behavior targeted for processing is the approach action tendency.

According to the example of FIG. 21, if the avoidance action tendency amount (frequency) is 0.55 or more, and the avoidance action tendency amount (time) is 0.10 or more, the action tendency identification part 2001 identifies that the social behavior targeted for processing is the avoidance action tendency. If the avoidance action tendency amount (frequency) is 0.55 or more, or the avoidance action tendency amount (time) is 0.10 or more, the action tendency identification part 2001 may identify that the social behavior targeted for processing is the avoidance action tendency.

Further, according to the example of FIG. 21, if neither the approach action tendency nor the avoidance action tendency is identified, the action tendency identification part 2001 identifies the social behavior targeted for processing is the intermediate action tendency. Or, if the social behavior targeted for processing is both the approach action tendency and the avoidance action tendency, the action tendency identification part 2001 identifies that the social behavior targeted for processing is the intermediate action tendency.

<Details of Presentation Control Processing of Reactive Processing Unit>

In the following, details of the presentation control processing of the reactive processing unit 115 (illustrated in FIG. 1) are described. Note that in the second embodiment, the presentation control processing of the reactive processing unit 115 is similar to the presentation control processing described with reference to FIG. 15 in the first embodiment, and differs only in the dialogue strategy determination processing in step S1505.

Figure 22:
FIG. 22 is a first flowchart illustrating details of dialogue strategy determination processing of the reactive processing unit.

Thus, here, of the presentation control processing of the reactive processing unit 115, details of the dialogue strategy determination processing are described. FIG. 22 is a first flowchart illustrating the details of the dialogue strategy determination processing of the reactive processing unit.

In step S2201, the action tendency identification part 2001 performs temporal interval social behavior action tendency amount calculation processing.

Specifically, the action tendency identification part 2001 refers to the "social behavior log recording table" 1700 (illustrated in FIG. 17) in the predetermined temporal interval (between time $t_{k-1}$ and time $t_k$). Then, the action tendency identification part 2001 discriminates the social behavior performed by the user 150 to the user 140 (or performed by the user 140 to the user 150 and illustrated in FIG. 8).

The action tendency identification part 2001 also calculates various action tendency amounts for the discriminated social behavior, and records in the "temporal interval social behavior action tendency amount recording table" in the evaluation information DB 119.

Specifically, the action tendency identification part 2001 calculates the frequency of approach tendencies (or the amount of time) and the frequency of avoidance tendencies (or the amount of time), and records in the "temporal interval social behavior action tendency amount recording table" in the evaluation information DB 119.

The action tendency identification part 2001 also calculates a ratio of the frequency of approach tendencies (or the amount of time) and a ratio of the frequency of avoidance tendencies (or the amount of time), and records in the "temporal interval social behavior action tendency amount recording table" in the evaluation information DB 119.

FIG. 23 is a diagram illustrating an example of the temporal interval social behavior action tendency amount recording table, stored in the evaluation information DB. A illustrated in FIG. 23, in the "temporal interval social behavior action tendency amount recording table" 2300 are recorded various action tendency amounts for the social behavior of the user of the avatar ID recorded in the "behaving avatar ID".

The example of FIG. 23 indicates that the "approach action tendency amount (frequency)", the "avoidance action tendency amount (frequency)", the "approach action tendency amount (time [seconds])", and the "avoidance action tendency amount (time [seconds])" are recorded as the action tendency amount. The example of FIG. 23 also indicates that the "approach action tendency amount (ratio of frequency)", the "avoidance action tendency amount (ratio of frequency)", the "approach action tendency amount (ratio of time [seconds])", and the "avoidance action tendency amount (ratio of time [seconds])" are further recorded as the action tendency amount.

Turning back to FIG. 22, in step S2202, the action tendency identification part 2001 performs temporal interval social behavior action tendency identification processing.

Specifically, the action tendency identification part 2001 compares the calculated approach action tendency amount and avoidance action tendency amount with the "temporal interval social behavior action tendency amount threshold definition data table" 2100. With this, the action tendency identification part 2001 identifies the action tendency of the social behavior of the user of the avatar ID recorded in the "behaving avatar ID", the social behavior being performed on the user of the avatar ID recorded in the "behaved avatar ID". In the present embodiment, the action tendency identification part 2001 identifies any of the approach action tendency, the avoidance action tendency, or the intermediate action tendency.

The action tendency identification part 2001 also records the result of the identification of the action tendency in the "temporal interval social behavior action tendency recording table" in the evaluation information DB 119.

FIG. 24 is a diagram illustrating an example of the temporal interval social behavior action tendency recording table, recorded in the evaluation information DB. As illustrated in FIG. 24, in the "temporal interval social behavior action tendency recording table" 2400 are included the "behaving avatar ID" and the "behaved avatar ID" and are recorded the avatar ID of the user who performs the social behavior and the avatar ID of the user who receives the social behavior. In addition, in the "temporal interval social behavior action tendency recording table" 2400 is included the "social behavior action tendency" and are recorded the result of the identification of the action tendency identified by the action tendency identification part 2001.

Turning back to FIG. 22, in step S2203, the action possibility judgment part 2002 performs cooperative action possibility judgment processing.

Specifically, the action possibility judgment part 2002 refers to the "social behavior action tendency" in the predetermined temporal interval (between time $t_{k-1}$ and time $t_k$) in the "temporal interval social behavior action tendency recording table" 2400. With this, the action possibility judgment part 2002 discriminates the action tendency of the social behavior performed by the user of the avatar ID recorded in the "behaving avatar ID" to the user of the avatar ID recorded in the "behaved avatar ID".

The action possibility judgment part 2002 also discriminates attribute information of the user of the avatar ID recorded in the "behaved avatar ID". The attribute information of the user of the avatar ID recorded in the "behaved avatar ID" includes age, gender, or the like of the user.

The action possibility judgment part 2002 also discriminates time elapsed after the user of the avatar ID recorded in the "behaving avatar ID" and the user of the avatar ID recorded in the "behaved avatar ID" dialogue for the first time.

Furthermore, based on the discrimination result (action tendency, attribute information, elapsed time, or the like), the action possibility judgment part 2002 judges the possibility that the user of the avatar ID recorded in the "behaved avatar ID" takes the cooperative action to the user of the avatar ID recorded in the "behaving avatar ID". The action possibility judgment part 2002 records the judgment result on the cooperative action possibility in the "cooperative action possibility judgment recording table" in the evaluation information DB 119.

FIG. 25 is a diagram illustrating an example of the cooperative action possibility judgment recording table recorded in the evaluation information DB. As illustrated in FIG. 25, the "cooperative action possibility judgment recording table" 2500 includes the "behaving avatar ID", the "behaved avatar ID", and the "cooperative action possibility". In the "cooperative action possibility judgment recording table" 2500 is recorded the judgment result of the possibility that the user of the avatar ID recorded in the "behaving avatar ID" takes the cooperative action to the user of the avatar ID recorded in the "behaved avatar ID".

The cooperative action possibility being "High" indicates that the action possibility judgment part 2002 judges that the possibility of taking the cooperative action is high. On the other hand, the cooperative action possibility being "Low" indicates that it is judged that the possibility of taking the cooperative action is not possible.

For example, if the user who receives the social behavior continues to perform the social behavior of the avoidance action tendency for 5 minutes or longer, the action possibility judgment part 2002 judges that the possibility of taking the cooperative action is low and records "Low".

In addition, for example, if the user who receives the social behavior is under primary school age, the action possibility judgment part 2002 judges that the possibility of the user taking the cooperative action is low, and records "Low".

Furthermore, for example, if the elapsed time after the user who receives the social behavior first dialogues with the user who performs the social behavior is within 10 minutes, the action possibility judgment part 2002 judges that the possibility of taking the cooperative action is low, and records "Low".

Note that the example on the first data row of FIG. 25 indicates that it is judged that the possibility of the user 140 with the avatar ID="AV1" taking the cooperative action to the user 150 with the avatar ID="AV2" is high (each illustrated in FIG. 1).

In addition, the example on the second data row of FIG. 25 indicates that it is judged that the possibility of the user 150 with the avatar ID="AV2" taking the cooperative action to the user 140 with the avatar ID="AV1" is high.

Turning back to FIG. 22, in step S2204, the acceptability judgment part 2003 performs social behavior acceptability judgment processing.

Specifically, the acceptability judgment part 2003 refers to the "social behavior action tendency" in the predetermined temporal interval (between time $t_{k-1}$ and time $t_k$) in the "temporal interval social behavior action tendency recording table" 2400. With this, the acceptability judgment part 2003 discriminates the judgment result of the possibility of the user of the avatar ID recorded in the "behaving avatar ID" performing the cooperative action to the user of the avatar ID recorded in the "behaved avatar ID".

In addition, the acceptability judgment part 2003 refers to the "cooperative action possibility" in the predetermined temporal interval (between time $t_{k-1}$ and time $t_k$) in the "cooperative action possibility judgment recording table" 2500. With this, the acceptability judgment part 2003 discriminates the judgment result on the possibility of the user of the avatar ID recorded in the "behaving avatar ID" taking the cooperative action to the user of the avatar ID recorded in the "behaved avatar ID".

The acceptability judgment part 2003 judges the social behavior acceptability at time $t_k$ based on the discriminated action tendency and the judgment result of the discriminated cooperative action possibility. That is, the acceptability judgment part 2003 judges the possibility of the discrimination that the user of the avatar ID recorded in the "behaved avatar ID" receives the social behavior from the user of the avatar ID recorded in the "behaving avatar ID".

The acceptability judgment part 2003 judges the possibility of discriminating that the social behavior is received, by judging whether both of the following conditions are satisfied:—The discriminated action tendency is the approach action tendency or the intermediate action tendency, —The judgment result of the cooperative action possibility is High.

If the above conditions are satisfied, the acceptability judgment part 2003 judges that the possibility of discriminating that to the user of the avatar ID recorded in the "behaved avatar ID", the user of the avatar ID recorded in the "behaving avatar ID" receives the social behavior is high. That is, the acceptability judgment part 2003 judges "Acceptable".

On the other hand, if either of the above conditions is not satisfied or if both of the above conditions are not satisfied, the acceptability judgment part 2003 judges that the possibility of discriminating that to the user of the avatar ID recorded in the "behaved avatar ID", the social behavior is received is low. That is, the acceptability judgment part 2003 judges "Not Acceptable".

Furthermore, the acceptability judgment part 2003 records the result of the social behavior acceptability judgment processing in the "social behavior acceptability judgment recording table" in the evaluation information DB 119.

FIG. 26 is a diagram illustrating an example of the social behavior acceptability judgment recording table recorded in the evaluation information DB. As illustrated in FIG. 26, a "social behavior acceptability judgment recording table" 2600 includes the "behaving avatar ID" and the "behaved avatar ID" and records the respective avatar IDs.

In addition, the "social behavior acceptability judgment recording table" 2600 includes the "social behavior acceptability". In the "social behavior acceptability" is recorded the acceptability of the social behavior of the user of the avatar ID recorded in the "behaving avatar ID" to the user of the avatar ID recorded in the "behaved avatar ID".

An example on the first data row of FIG. 26 indicates that the possibility of discriminating that to the user 150 with the avatar ID="AV2", the user 140 with the avatar ID="AV1" receives the social behavior is high ("Acceptable") (each illustrated in FIG. 1). This is because the action tendency of the social behavior performed by the user 140 to the user 150 is the intermediate action tendency and the cooperative action possibility of the user 150 is "High".

On the other hand, the example on the second data row of FIG. 26 indicates that the possibility of discriminating that to the user 140, the user 150 receives the social behavior is low ("Not Acceptable"). This is because the action tendency of the social behavior performed by the user 150 to the user 140 is the avoidance action tendency.

Turning back to FIG. 22, in step S2205, the determination part 2004 performs the dialogue strategy determination processing based on the social behavior acceptability judgment.

The determination part 2004 refers to the "social behavior acceptability judgment recording table" 2600. Then, the determination part 2004 determines the dialogue strategy o the user of the avatar ID recorded in the "behaved avatar ID", based on the judgment result of the social behavior acceptability recorded in the "social behavior acceptability".

For example, in the case of the first row of the data rows of the "social behavior acceptability judgment recording table" 2600, the social behavior acceptability is "Acceptable". When the social behavior acceptability to the user 150 of the behaved avatar ID="AV2" viewed from the user 140 of the behaving avatar ID="AV1" is judged, the determination part 2004 determines the dialogue strategy ("positive" strategy).

In addition, in the case of the second row of the data rows of the "social behavior acceptability judgment recording table" 2600, the social behavior acceptability is "Not Acceptable". When the social behavior acceptability to the user 140 of the behaved avatar ID="AV1" viewed from the user 150 of the behaving avatar ID="AV2" is judged, the determination part 2004 determines the dialogue strategy ("negative" strategy).

Note that the method of determining the dialogue strategy by the determination part 2004 is not limited thereto, and the dialogue strategy may be determined by combining the "social behavior action tendency", the "cooperative action possibility", and the "social behavior acceptability".

For example, if—the "social behavior acceptability"="Acceptable", —the "social behavior action tendency"=the "approach action tendency" or the "intermediate action tendency", and—the "cooperative action possibility"="Low", the dialogue strategy may be determined to be "Dynamically_positive".

Alternatively, if—the "social behavior acceptability"="Acceptable", —the "social behavior action tendency"=the "avoidance action tendency", and—the "cooperative action possibility"="Low", the dialogue strategy may be determined to be "Minimally_positive".

Alternatively, if—the "social behavior acceptability"="Not Acceptable", —the "social behavior action tendency"=the "avoidance action tendency", and—the "cooperative action possibility"="High", the dialogue strategy may be determined to be "Shortly_negative".

Note that the dialogue strategy determined by the determination part 2004 is recorded in the "recording table of dialogue strategy determination corresponding to social behavior acceptability" in the evaluation information DB 119 by the presentation control section 805. FIG. 27 is a diagram illustrating an example of the recording table of dialogue strategy determination corresponding to social behavior acceptability, recorded in the evaluation information DB.

As illustrated in FIG. 27, the "recording table of dialogue strategy determination corresponding to social behavior acceptability" 2700 includes the "behaving avatar ID" and the "behaved avatar ID", as the information item. Then, the avatar ID of the user is recorded in these information items. In addition, the "recording table of dialogue strategy determination corresponding to social behavior acceptability" 2700 also includes the "dialogue strategy", as the information item. In the "dialogue strategy" is recorded the dialogue strategy that is the dialogue strategy by the user with the avatar ID recorded in the "behaving avatar ID" to the user with the avatar ID recorded in the "behaved avatar ID", and that is determined by the determination part 2004.

According to the example on the first data row of FIG. 27, the "positive" strategy is determined as the dialogue strategy of the user 140 to the user 150 when the user 150 performs the social behavior to the user 140 (each illustrated in FIG. 1).

In addition, according to the example on the second data row of FIG. 27, the "shortly_positive" strategy is determined as the dialogue strategy of the user 150 to the user 140 when the user 140 performs the social behavior to the user 150.

As is clear from the foregoing description, in determining the dialogue strategy based on the social behavior tendency, the image generation device 110 in the second embodiment—quantifies the social behavior tendency based on the frequency or time in the predetermined temporal interval, and—identifies the action tendency through the comparison with the threshold. The image generation device 110—judges the social behavior acceptability based on the action tendency and the cooperative action possibility. The image generation device 110—determines the dialogue strategy based on the judgment result of the social behavior acceptability.

With this, according to the image generation device 110 of the second embodiment, the reactive behavior based on the dialogue strategy determined from the standpoint of the social behavior acceptability may be presented to the dialogue partner.

Third Embodiment

In the foregoing second embodiment, the case where the dialogue strategy is determined through judgment of the social behavior acceptability. In contrast to this, in a third embodiment, the dialogue strategy is determined to further judge relationship level with the dialogue partner and adjust the relationship level. Note that the relationship level is information representing level of friendliness to the dialogue partner. In the following, the third embodiment is described, mainly focusing on differences from the foregoing second embodiment.

<Functional Configuration of Reactive Processing Unit of Image Generation Device>

Figure 28:
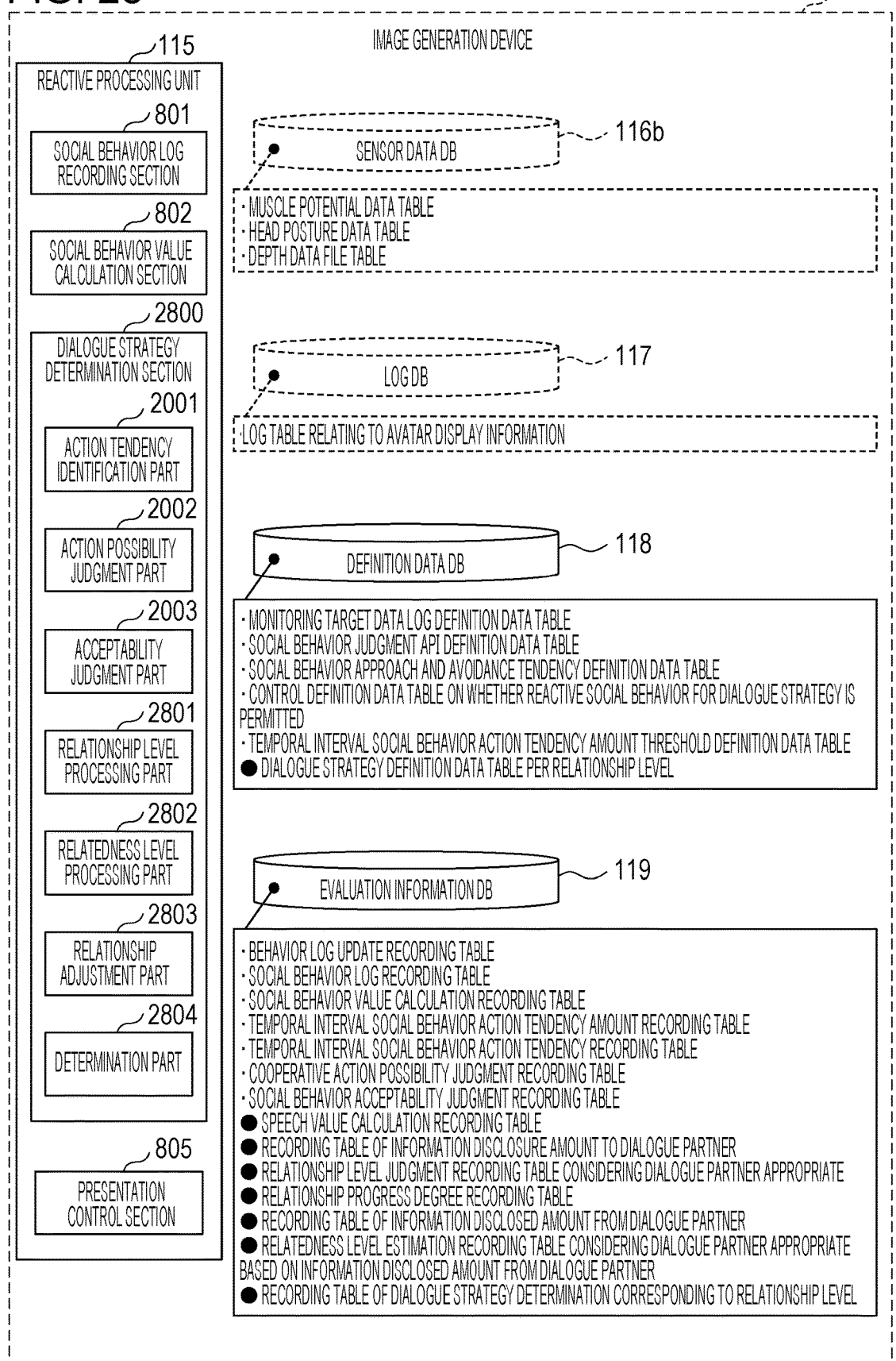
FIG. 28 is a third diagram illustrating the functional configuration of the reactive processing unit of the image generation device.

First, description is given of the functional configuration of the reactive processing unit 115 of the image generation device 110 in the third embodiment with reference to FIG. 28. FIG. 28 is a third diagram illustrating the functional configuration of the reactive processing unit of the image generation device.

The difference from FIG. 20 is that new tables are stored in a dialogue strategy determination section 2800, and the definition data DB 118 and the evaluation information DB 119. Note that of the tables depicted in the definition data DB 118 and the evaluation information DB 119 in FIG. 28, the tables marked with a filled circle represent the new tables.

As illustrated in FIG. 28, the dialogue strategy determination section 2800 includes the action tendency identification part 2001, the action possibility judgment part 2002, the acceptability judgment part 2003, a relationship level processing part 2801, a relatedness level processing part 2802, a relationship adjustment part 2803, and a determination part 2804. Here, the term "relationship" is from a view point of a behaving person, while the term "relatedness" is from a view point of a behaved person, namely a person receiving the behavior from the behaving person.

The relationship level processing part 2801 calculates an amount of information (information disclosure amount)

included in the speech or the social behavior performed by the user 150 to the user 140 (illustrated in FIG. 1), triggered by the user 150 performing the speech or the social behavior. Note that the relationship level processing part 2801 refers to the "social behavior value calculation recording table" and a "speech value calculation recording table" in calculating the information disclosure amount. The relationship level processing part 2801 also records the calculated information disclosure amount in a "recording table of information disclosure amount to dialogue partner".

The relationship level processing part 2801 also judges the relationship level considering the user 150 appropriate to the user 140, based on the calculated information disclosure amount, and records the judgment result in the "judgment recording table of relationship level considered appropriate to dialogue partner".

Furthermore, the relationship level processing part 2801 calculates a relationship progress degree between the judged relationship level and a relationship level that is a next goal of the relationship progress, and records in a "relationship progress degree recording table". Note that although in the present embodiment, description is given of a case where the relationship level is judged based on the information disclosure amount, a method of judging the relationship level is not limited thereto, and the relationship level processing part 2801 may judge the relationship level with any other judgment method.

The relatedness level processing part 2802 calculates the amount of information (information disclosed amount) included in the speech or the social behavior that the user 150 receives from the user 140, triggered by recording of the speech or the social behavior from the user 140. The relatedness level processing part 2802 records the calculated information disclosed amount in the "recording table of information disclosed amount from dialogue partner".

The relatedness level processing part 2802 also estimates a relatedness level considering the user 140 appropriate for the user 150, based on the calculated information disclosed amount. The relatedness level processing part 2802 records the estimated relatedness level in a "relatedness level estimation recording table considering dialogue partner appropriate based on information disclosed amount from dialogue partner".

If the acceptability judgment part 2003 judges that the social behavior acceptability is "Acceptable", the relationship adjustment part 2803 controls a direction of adjustment of the relationship level. Specifically, the relationship adjustment part 2803 compares the relationship level to the dialogue partner calculated for the user 150 with the relatedness level from the dialogue partner, and controls the direction of the adjustment of the relationship level of the user 150 to the user 140, based on a magnitude relationship of the relationship level to the dialogue partner calculated for the user 150 and the relatedness level from the dialogue partner.

The determination part 2804 refers to a "dialogue strategy definition data table by relationship level" stored in the definition data DB 118 and determines the dialogue strategy of the user 150 to the user 140 according to the direction of the adjustment of the relationship level.

Note that the presentation control section 805 judges whether or not the reactive social behavior is permitted, for the determined dialogue strategy. If the presentation control section 805 judges that the reactive social behavior is permitted, the presentation control section 805 also transmits to the information display processing section 112 the avatar image representing the reactive social behavior of the user 150, being associated with the determined dialogue strategy. The presentation control section 805 instructs the information display processing section 112 to display the avatar image representing the reactive social behavior of the user 150. Furthermore, the presentation control section 805 records the dialogue strategy of this time in a "recording table of dialogue strategy determination corresponding to relationship level" in the evaluation information DB119.

<Description of Table Relating to Processing of Respective Components of Reactive Processing Unit>

In the following, description is given of the tables (here, the "dialogue strategy definition data table by relationship level" stored in the definition data DB 118) including the data relating to the processing of the respective components (here, the dialogue strategy determination section 2800) of the reactive processing unit 115.

FIG. 29 is a diagram illustrating an example of the dialogue strategy definition data table by relationship level, stored in the definition data DB. As illustrated in FIG. 29, the "dialogue strategy definition data table by relationship level" 2900 includes, as the information item, the "relationship level", a "distance from a default strategy", and the "dialogue strategy".

The "relationship level" defines the relationship level of other user viewed from one user. An example of FIG. 29 indicates that the relationship level is divided into three stages. Of these stages, "0_superficial" indicates that the relationship of the other user viewed from the one user is at a superficial level. "1_intimate" indicates that the relationship of the other user viewed from the one user is at an intimate level. "2—personal" indicates that the relationship of the other user viewed from the one user is at more intimate level.

The "distance from a default strategy" defines the distance from the default strategy at each relationship level.

The "dialogue strategy" defines the dialogue strategy according to a distance from a default dialogue strategy at each relationship level.

According to FIG. 29, if the relationship level is "0_superficial", the default dialogue strategy (that is, the dialogue strategy a "distance from the default strategy" of which is 0) is a "Shortly_positive" strategy. In addition, the dialogue strategy in a positive direction to the default dialogue strategy is a "Sunnily_positive" strategy or a "Sunnily_Shortly_positive" strategy. Furthermore, the dialogue strategy in a negative direction to the default dialogue strategy is a "Minimally_positive" strategy or a "Minimally_Shortly_positive" strategy.

Similarly, the "dialogue strategy definition data table by relationship level" 2900 defines, for a case of the relationship level of "1_intimate", the default dialogue strategy, the dialogue strategy in the positive direction to the default dialogue strategy, and the dialogue strategy in the negative direction.

Similarly, the "dialogue strategy definition data table by relationship level" 2900 defines, for a case of the relationship level of "2_personal", the default dialogue strategy, the dialogue strategy in the positive direction to the default dialogue strategy, and the dialogue strategy in the negative direction.

<Details of Presentation Control Processing of Reactive Processing Unit>

In the following, details of the presentation control processing of the reactive processing unit 115 are described. Note that in the third embodiment, the presentation control processing of the reactive processing unit 115 is similar to the presentation control processing described with reference to FIG. 15 in the first embodiment, and differs only in the dialogue strategy determination processing in step S1505.

Figure 30:
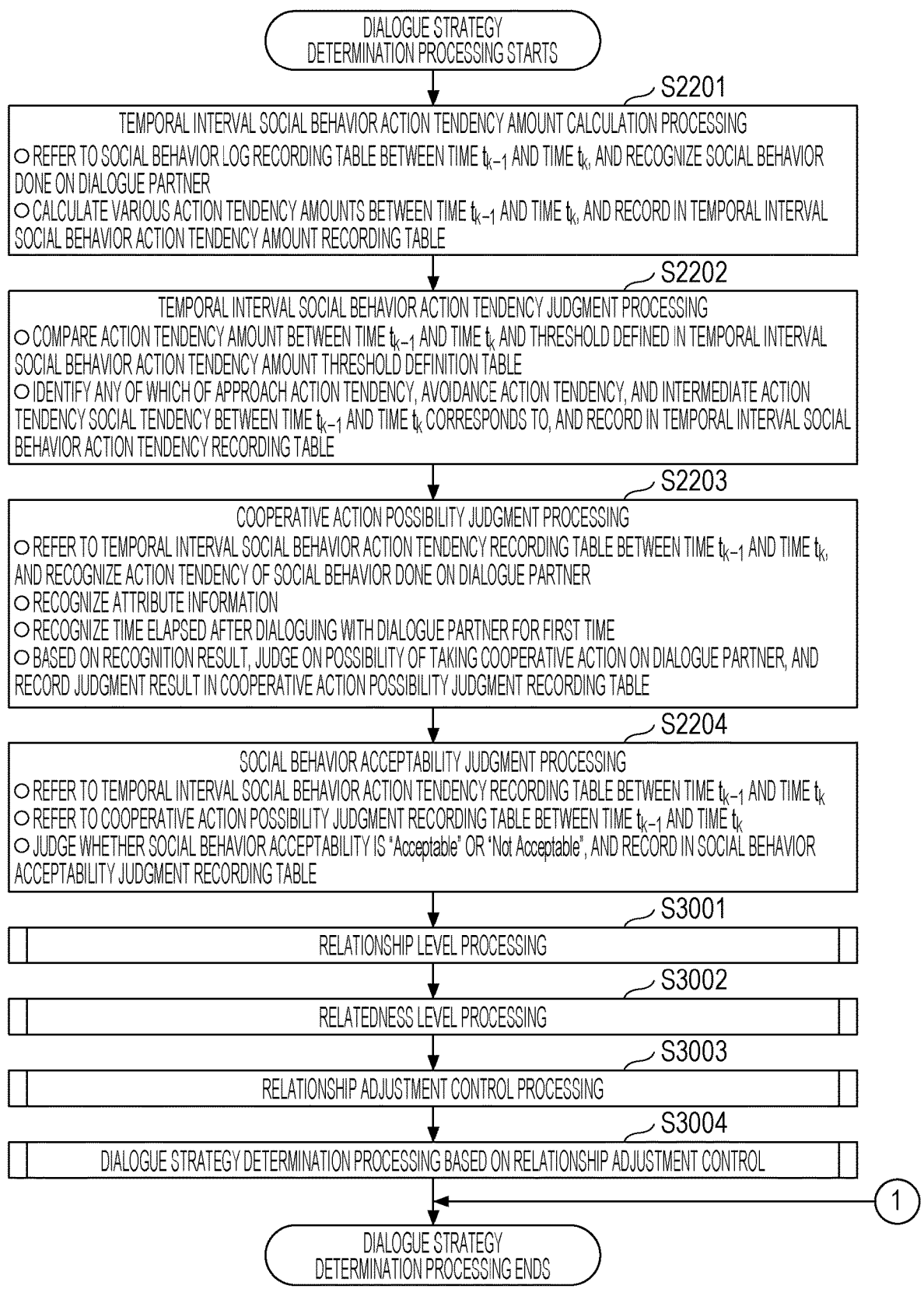
FIG. 30 is a second flowchart illustrating details of the dialogue strategy determination processing of the reactive processing unit.

Thus, here, of the presentation control processing of the reactive processing unit 115, details of the dialogue strategy determination processing are described. FIG. 30 is a second flowchart illustrating the details of the dialogue strategy determination processing of the reactive processing unit.

As illustrated in FIG. 30, the dialogue strategy determination processing of the reactive processing unit 115 (illustrated in FIG. 1) in the third embodiment has a process from steps S3001 to S3004, in addition to the process of steps s2201 to S2204 described in the second embodiment.

Step S3001 is relationship level processing by the relationship level processing part 2801, and step S3002 is relatedness level processing by the relatedness level processing part 2802. In step S3003 is relationship adjustment control processing by the relationship adjustment part 2803, and step S3004 is the dialogue strategy determination processing based on the relationship adjustment control by the determination part 2804. In the following, details of the respective processes from steps S3001 to S3004 are described.

Note that in the respective processes from steps S3001 to S3004, the various information relating to the social behavior (various information relating to the non-verbal action) as well as the various information relating to the speech (various information relating to the verbal-action) are used. Thus, here, first, description is given of the speech value calculation recording table in which the various information relating to the speech is recorded.

FIG. 31 is a diagram illustrating an example of the speech value calculation recording table recorded in the evaluation information DB. As described above, the various information relating to the social behavior (various information relating to the non-verbal action) is calculated or identified by the social behavior value calculation section 802 (illustrated in FIG. 8) and recorded in the "social behavior value calculation recording table" 1800 (illustrated in FIG. 18).

On the other hand, the various information relating to the speech (various information relating to the verbal action) is calculated by a speech value calculation section (not illustrated) and recorded in the "speech value calculation recording table" 3100.

As illustrated in FIG. 31, the "speech value calculation recording table" 3100 includes, as the information item, the "DB recording time", the "recording start time", the "recording end time", the "behaving avatar ID", and the "behaved avatar ID". The "speech value calculation recording table" 3100 also includes, as the information item, a "spoken voice", a "received voice", a "spoken text", a "received text", a "information disclosure frequency based on personal information", and "information disclosure frequency based on general topic". Furthermore, the "speech value calculation recording table" 3100 includes, as the information item, "information disclosed frequency based on personal information" and "information disclosed frequency based on general topic".

Among these, as the respective information items from the "DB recording time" to the "behaved avatar ID" when the various information items are viewed from the left-to-right direction in FIG. 31 are similar to the information items included in the "social behavior value calculation recording table" 1800, description is omitted here.

In the "spoken voice" is recorded a name of a file to which data of voice spoken by the user of the avatar ID recorded in the "behaving avatar ID" is stored.

In the "received voice" is recorded the name of the file to which data of voice received by the user of the avatar ID recorded in the "behaved avatar ID" is stored.

In the "spoken text" is recorded text data of the file the stored file name of which is recorded in the "spoken voice".

In the "received text" is recorded the text data of the file the stored file name of which is recorded in the "received voice".

In the "information disclosure frequency based on personal information" is recorded a frequency of the user of the avatar ID recorded in the "behaving avatar ID" disclosing personal information by the speech. In the "information disclosure frequency based on general topic" is recorded the frequency of the user of the avatar ID recorded in the "behaving avatar ID" disclosing a general topic by the speech.

In the "information disclosed frequency based on personal information" is recorded a frequency of the user of the avatar ID recorded in the "behaved avatar ID" receiving the personal information disclosure by receiving voice. In the "information disclosed frequency based on general topic" is recorded the frequency of the user of the avatar ID recorded in the "behaving avatar ID" receiving the general topic disclosure by receiving the voice.

(1) Details of the Relationship Level Processing (Step S3001)

Figure 32:
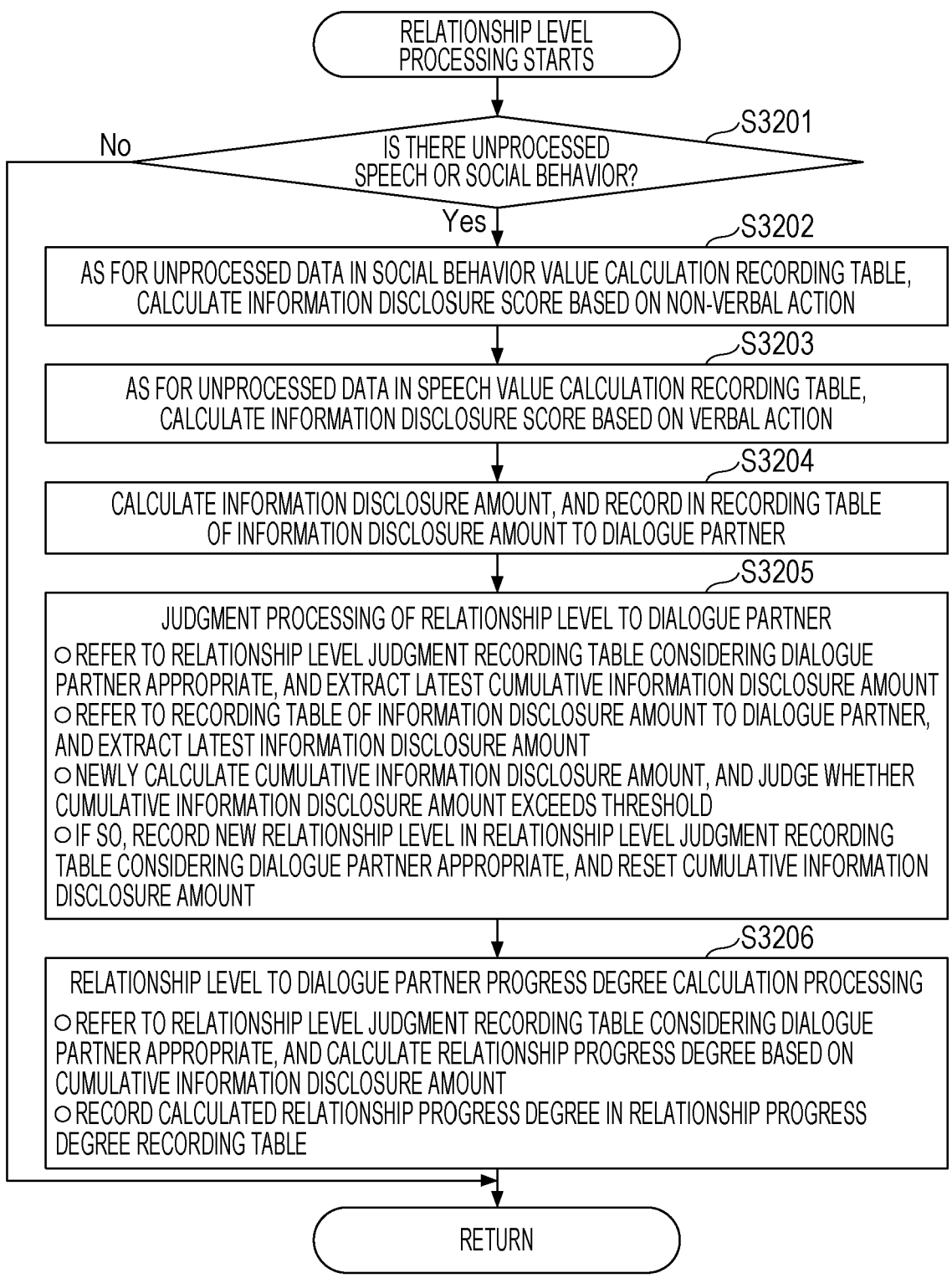
FIG. 32 is a flowchart illustrating details of relationship level processing.

FIG. 32 is a flowchart illustrating details of the relationship level processing. The relationship level processing part 2801 (illustrated in FIG. 28) performs the relationship level processing for each of the data rows of the "social behavior value calculation recording table" 1800 (illustrated in FIG. 18) and the "speech value calculation recording table" 3100 (illustrated in FIG. 31).

In step S3201, the relationship level processing part 2801 judges whether or not there is any unprocessed data row, for the "social behavior value calculation recording table" 1800 and the "speech value calculation recording table" 3100. In step S3201, if the relationship level processing part 2801 judges that there is any unprocessed data row, the processing proceeds to step S3202.

In step S3202, the relationship level processing part 2801 calculates an information disclosure score based on the non-verbal action.

Specifically, the relationship level processing part 2801 refers to the "social behavior value calculation recording table" 1800, and extracts the unprocessed data row. The relationship level processing part 2801 extracts, as the unprocessed data row, the data row that is the data row of the user 150 (behaving avatar ID="AV2") and that is recorded after the time recorded in the "recording end time" of the last processed data row.

The relationship level processing part 2801 also extracts, from the extracted unprocessed data row, the information recorded in "information disclosure by non-verbal action (whether or not there is touch on body)" and the information recorded in "information disclosure by non-verbal action (whether or not intention and demeanor (expression or the like) are presented". Furthermore, the relationship level processing part 2801 calculates the information disclosure score by the non-verbal action, based on the extracted information.

For example, on the extracted unprocessed data row, if the information recorded in the "information disclosure by non-verbal action (whether or not there is touch on body)" is "Yes", the relationship level processing part 2801 adds 5 points to the information disclosure score by the non-verbal action. Similarly, if the information recorded in the "information disclosure by non-verbal action (whether or not intention and demeanor (expression or the like) are presented" is "Yes", the relationship level processing part 2801 adds 5 points to the information disclosure score by the non-verbal action.

In step S3203, the relationship level processing part 2801 calculates the information disclosure score by the verbal-action.

Specifically, the relationship level processing part 2801 refers to the "speech value calculation recording table" 3100, and extracts the unprocessed data row. The relationship level processing part 2801 extracts, as the unprocessed data row, the data row that is the data row of the user 150 (behaving avatar ID="AV2" and that is recorded after the time recorded in the "recording end time" of the last processed data row.

The relationship level processing part 2801 also extracts, from the extracted unprocessed data row, the information recorded in the "information disclosure frequency based on personal information" and the information recorded in "information disclosure frequency based on general topic", and calculates the information disclosure score.

For example, on the extracted unprocessed data row, if the information recorded in the "information disclosure frequency based on personal information" is "1", the relationship level processing part 2801 adds 5 points to the information disclosure score by the verbal-action. Similarly, if the information recorded in the "information disclosure frequency based on general topic" is "1", the relationship level processing part 2801 adds 1 point to the information disclosure score by the verbal-action.

In step S3204, the relationship level processing part 2801 calculates the information disclosure amount to the dialogue partner, and records in the "information disclosure amount recording table".

Specifically, the relationship level processing part 2801 calculates the information disclosure amount based on the information disclosure score by the non-verbal action and the information disclosure score by the verbal-action. Note that the relationship level processing part 2801 may simply add the information disclosure score by the non-verbal action and the information disclosure score by the verbal-action to calculate the information disclosure amount or may calculate the information disclosure amount by weighting and adding.

The relationship level processing part 2801 records the calculated information disclosure amount together with the information disclosure score by the non-verbal action and the information disclosure score by the verbal-action, in the "recording table of information disclosure amount to dialogue partner" in the evaluation information dB 119.

FIG. 33 is a diagram illustrating an example of a recording table of information disclosure amount to dialogue partner recorded in the evaluation information DB. As illustrated in FIG. 33, the "recording table of information disclosure amount to dialogue partner" 3300 includes the "behaving avatar ID" and the "behaved avatar ID". In the "behaving avatar ID" and the "behaved avatar ID", the avatar ID of the user who performs the verbal-action/non-verbal action and the avatar ID of the user wo receives the social behavior as a result of the user performing the verbal-action/non-verbal action are recorded.

In addition, the "recording table of information disclosure amount to dialogue partner" 3300 includes, as the information item, the "information disclosure score by the non-verbal action" and the "information disclosure score by the verbal action". Then, in the respective information items are recorded the information disclosure score by the non-verbal action and the information disclosure score by the verbal-action calculated by the relationship level processing part 2801 (illustrated in FIG. 28).

Furthermore, in the "recording table of information disclosure amount to dialogue partner" 3300 is included the "information disclosure amount" as the information item and is recorded the information disclosure amount calculated by the relationship level processing part 2801. Note that the example of FIG. 33 indicates the case where the information disclosure amount is calculated by simply adding the information disclosure score by the non-verbal action and the information disclosure score by the verbal-action.

Turning back to FIG. 32, in step S3205, the relationship level processing part 2801 performs processing to judge the relationship level to the dialogue partner.

Specifically, the relationship level processing part 2801 refers to the "judgment recording table of relationship level considered appropriate to dialogue partner", and extracts the latest value recorded in "cumulative information disclosure amount". Note that FIG. 34 is a diagram illustrating an example of the judgment recording table of relationship level considered appropriate to dialogue partner, recorded in the evaluation information DB.

The relationship level processing part 2801 also extracts the latest value recorded in the "information disclosure amount" in "recording table of information disclosure amount to dialogue partner" 3300.

Then, the relationship level processing part 2801 newly calculates cumulative information disclosure amount based on the latest value recorded in the "cumulative information disclosure amount" and the latest value recorded in the "information disclosure amount".

The relationship level processing part 2801 also judges whether or not the newly calculated cumulative information disclosure amount exceeds a predetermined threshold.

If the relationship level processing part 2801 judges that the newly calculated cumulative information disclosure amount exceeds the predetermined threshold, the relationship level processing part 2801 refers to the "judgment recording table of relationship level considered appropriate to dialogue partner" 3400. The relationship level processing part 2801 extracts the latest relationship level recorded in the "relationship level considered appropriate to dialogue partner". The relationship level processing part 2801 also moves the extracted relationship level to the next relationship level.

Moving to the next relationship level refers to changing the extracted relationship level to "1_intimate" if the extracted relationship level is "0_superficial". Alternatively, moving to the next relationship level refers to changing the extracted relationship level to "2_personal" if the extracted relationship level is "1_intimate".

The relationship level processing part 2801 associates the extracted relationship level of the next relationship level with the newly calculated cumulative information disclosure amount, and records in the "judgment recording table of relationship level considered appropriate to dialogue partner" 3400. Note that the relationship level processing part 2801 resets the cumulative information disclosure amount to 0, if the relationship level processing part 2801 records the next relationship level.

In step S3206, the relationship level processing part 2801 performs processing to calculate relationship level progress to the dialogue partner.

Specifically, the relationship level processing part 2801 refers to the "judgment recording table of relationship level considered appropriate to dialogue partner" 3400, and extracts the value newly recorded in the "cumulative information disclosure amount". The relationship level processing part 2801 also extracts a threshold used to calculate the "relationship level considered appropriate to dialogue partner" in the "judgment recording table of relationship level considered appropriate to dialogue partner" 3400.

Furthermore, the relationship level processing part 2801 calculates the relationship progress degree based on the extracted "cumulative information disclosure amount" and the extracted threshold. The relationship progress degree is an indicator of how much the cumulative information disclosure amount increases at each relationship level (0_superficial, 1_intimate, and 2_personal). As described above, the cumulative information amount increases to the predetermined threshold for moving to the next relationship level, and is reset when exceeding the predetermined threshold. Thus, the relationship progress degree is calculated based on a ratio of the newly calculated cumulative information disclosure amount to the threshold for moving to the next relationship level.

The relationship level processing part 2801 records the relationship progress degree in the "relationship progress degree recording table" in the evaluation information DB 119.

FIG. 35 is a diagram illustrating an example of a relationship progress degree recording table, recorded in the evaluation information DB. As illustrated in FIG. 35, the "relationship progress degree recording table" 3500 includes, as the information item, the "relationship level considered appropriate to dialogue partner" and "relationship progress degree". In the respective information items is recorded the calculation result calculated in the relationship level processing part 2801 (illustrated in FIG. 28).

(2) Details of the Relatedness Level Processing (Step S3002)

Figure 36:
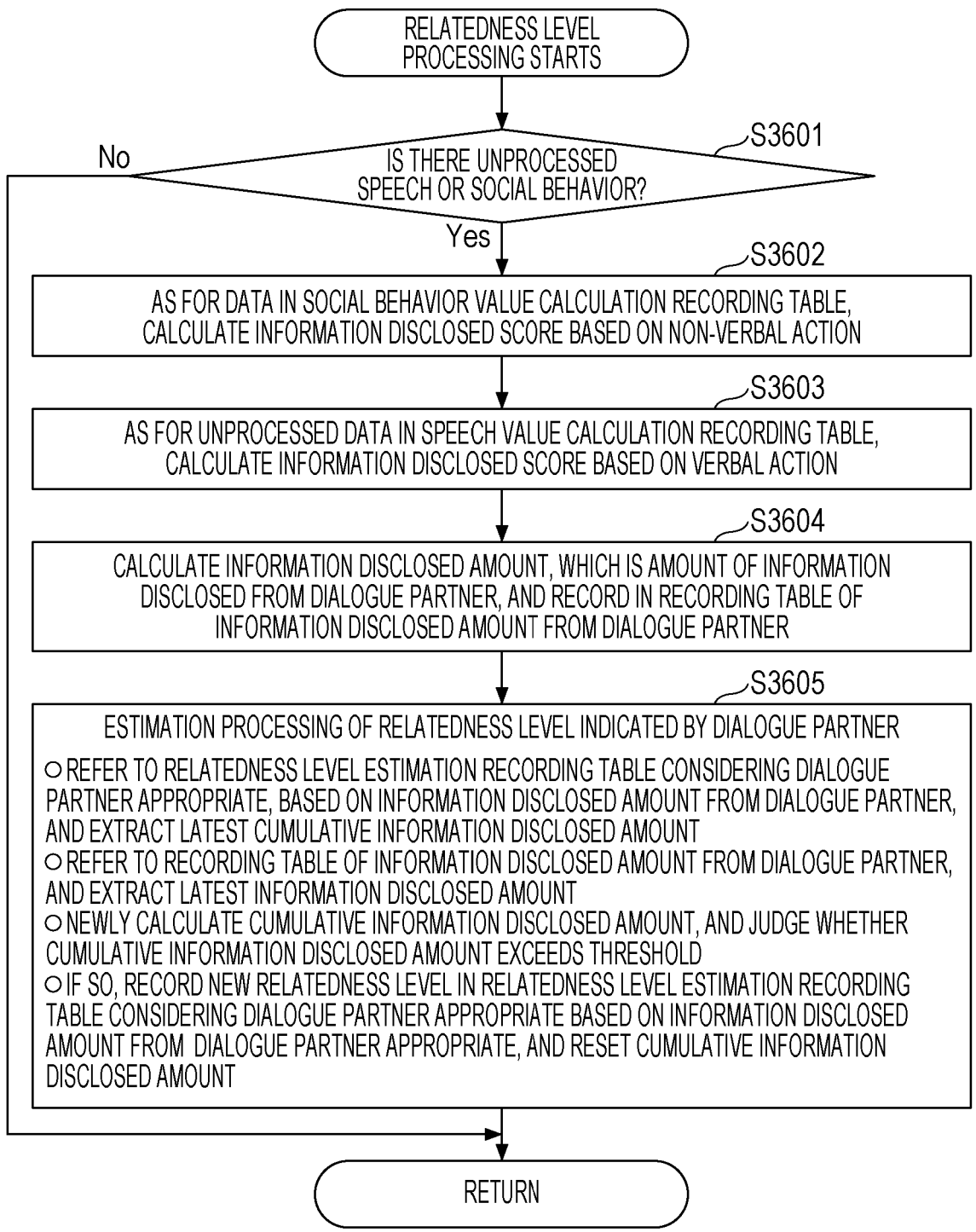
FIG. 36 is a flowchart illustrating details of relatedness level processing.

FIG. 36 is a flowchart illustrating details of relatedness level processing. The relatedness level processing part 2802 (illustrated in FIG. 28) performs the relationship level processing on the respective data rows of the "social behavior value calculation recording table" 1800 (illustrated in FIG. 18) and the "speech value calculation recording table" 3100 (illustrated in FIG. 31).

In step S3601, the relatedness level processing part 2802 judges whether or not there is any unprocessed data row for the "social behavior value calculation recording table" 1800 and the "speech value calculation recording table" 3100. In step S3601, if the relatedness level processing part 2802 judges that there is the unprocessed data row, the processing proceeds to step S3602.

In step S3602, the relatedness level processing part 2802 calculates an information disclosed score by the non-verbal action.

Specifically, the relatedness level processing part 2802 refers to the "social behavior value calculation recording table" 1800, and extracts the unprocessed data row. The relatedness level processing part 2802 extracts, as the unprocessed data row, the data row that is the data row of the user 140 (behaving avatar ID="AV1") and that is recorded after the time recorded in the "recording end time" of the last processed data row.

The relatedness level processing part 2802 also extracts, from the extracted unprocessed data row, the information recorded in "information disclosed by non-verbal action (whether or not there is touch on body)" and the information recorded in "information disclosed by non-verbal action (whether or not intention and demeanor (expression or the like) are presented". Furthermore, the relatedness level processing part 2802 calculates the information disclosed score by the non-verbal action, based on the extracted information.

For example, on the extracted unprocessed data row, if the information recorded in the "information disclosed by non-verbal action (whether or not there is touch on body)" is "Yes", the relatedness level processing part 2802 adds 5 points to the information disclosed score by the non-verbal action. Similarly, if the information recorded in the "information disclosed by non-verbal action (whether or not intention and demeanor (expression or the like) are presented" is "Yes", the relatedness level processing part 2802 adds 5 points to the information disclosed score by the non-verbal action.

In step S3603, the relatedness level processing part 2802 calculates the information disclosed score by the verbal-action.

Specifically, the relatedness level processing part 2802 refers to the "speech value calculation recording table" 3100, and extracts the unprocessed data row. The relatedness level processing part 2802 extracts, as the unprocessed data row, the data row that is the data row of the user 140 (behaving avatar ID="AV1" and that is recorded after the time recorded in the "recording end time" of the last processed data row.

The relatedness level processing part 2802 also extracts, from the extracted unprocessed data row, the information recorded in the "information disclosed frequency based on personal information" and the information recorded in "information disclosed frequency based on general topic". Furthermore, the relatedness level processing part 2802 calculates the information disclosed score based on the extracted information.

For example, on the extracted unprocessed data row, if the information recorded in the "information disclosed frequency based on personal information" is "1", the relatedness level processing part 2802 adds 5 points to the information disclosed score by the verbal-action. Similarly, if the information recorded in the "information disclosed frequency based on general topic" is "1", the relatedness level processing part 2802 adds 1 point to the information disclosed score by the verbal-action.

In step S3604, the relatedness level processing part 2802 calculates the information disclosed amount to the dialogue partner.

Specifically, based on the information disclosed score by the non-verbal action and the information disclosed score by the verbal-action, the relatedness level processing part 2802 calculates the information disclosed amount, which is the information disclosure amount of the information received by the user 150 from the user 140 (illustrated in FIG. 1). Note that the relatedness level processing part 2802 may simply add the information disclosed score by the non-verbal action and the information disclosed score by the verbal-action to calculate the information disclosed amount or may calculate the information disclosed amount by weighting and adding.

Furthermore, the relatedness level processing part 2802 records the calculated information disclosed amount together with the information disclosed score by the non-verbal action and the information disclosed score by the verbal-action, in the "recording table of information disclosed amount from dialogue partner" in the evaluation information dB 119.

FIG. 37 is a diagram illustrating an example of a recording table of information disclosed amount from dialogue partner recorded in the evaluation information DB. As illustrated in FIG. 37, the "recording table of information disclosed amount from dialogue partner" 3700 includes the "behaving avatar ID" and the "behaved avatar ID", as the information item. In these information items are recorded the avatar ID of the user who performs the social behavior and the avatar ID of the who receives the social behavior.

In addition, the "recording table of information disclosed amount from dialogue partner" 3700 includes, as the information item, the "information disclosed score by the non-verbal action" and the "information disclosed score by the verbal action". In these information items are recorded the information disclosed score by the non-verbal action and the information disclosed score by the verbal-action calculated by the relatedness level processing part 2802 (illustrated in FIG. 28).

Furthermore, in the "recording table of information disclosed amount from dialogue partner" 3700 is included the "information disclosed amount" as the information item and is recorded the information disclosed amount calculated by the relatedness level processing part 2802. Note that the example of FIG. 37 indicates the case where the information disclosed amount is calculated by simply adding the information disclosed score by the non-verbal action and the information disclosed score by the verbal-action.

Subsequently, in step S3605 in FIG. 36, the relatedness level processing part 2802 performs estimation processing of relatedness level from dialogue partner.

Specifically, the relatedness level processing part 2802 refers to the "relatedness level estimation recording table considering dialogue partner appropriate, based on information disclosed amount from dialogue partner" in the evaluation information DB 119, and extracts the latest value recorded in "cumulative information disclosed amount". Note that FIG. 38 is a diagram illustrating an example of the relatedness level estimation recording table considering dialogue partner appropriate based on information disclosed amount from dialogue partner, recorded in the evaluation information DB.

The relatedness level processing part 2802 refers to the "recording table of information disclosed amount from dialogue partner" 3700 (illustrated in FIG. 37), and extracts the latest value recorded in the "information disclosed amount".

Then, the relatedness level processing part 2802 newly calculates the cumulative information disclosed amount based on the latest value recorded in the "cumulative information disclosed amount" and the latest value recorded in the "information disclosed amount".

The relatedness level processing part 2802 also judges whether or not the newly calculated cumulative information disclosed amount exceeds the predetermined threshold.

If the relatedness level processing part 2802 judges that the newly calculated cumulative information disclosed amount exceeds the predetermined threshold, the relatedness level processing part 2802 refers to a "relatedness level estimation recording table considering dialogue partner appropriate, based on information disclosed amount from dialogue partner" 3800. Then, the relatedness level processing part 2802 extracts the latest relatedness level recorded in the "relatedness level considering dialogue partner appropriate", and moves the extracted relatedness level to next relatedness level.

The relatedness level processing part 2802 records the extracted latest relatedness level or the next relatedness level in the "relatedness level estimation recording table considering dialogue partner appropriate, based on information disclosed amount from dialogue partner" 3800. Then, the relatedness level processing part 2802 associates the extracted latest relatedness level or the next relatedness level with the newly calculated cumulative information disclosure amount and records. Note that if the relatedness level processing part 2802 records the next relatedness level, the relatedness level processing part 2802 resets the cumulative information disclosed amount to 0.

(3) Details of the Relationship Adjustment Control Processing (Step S3003)

Figure 39:
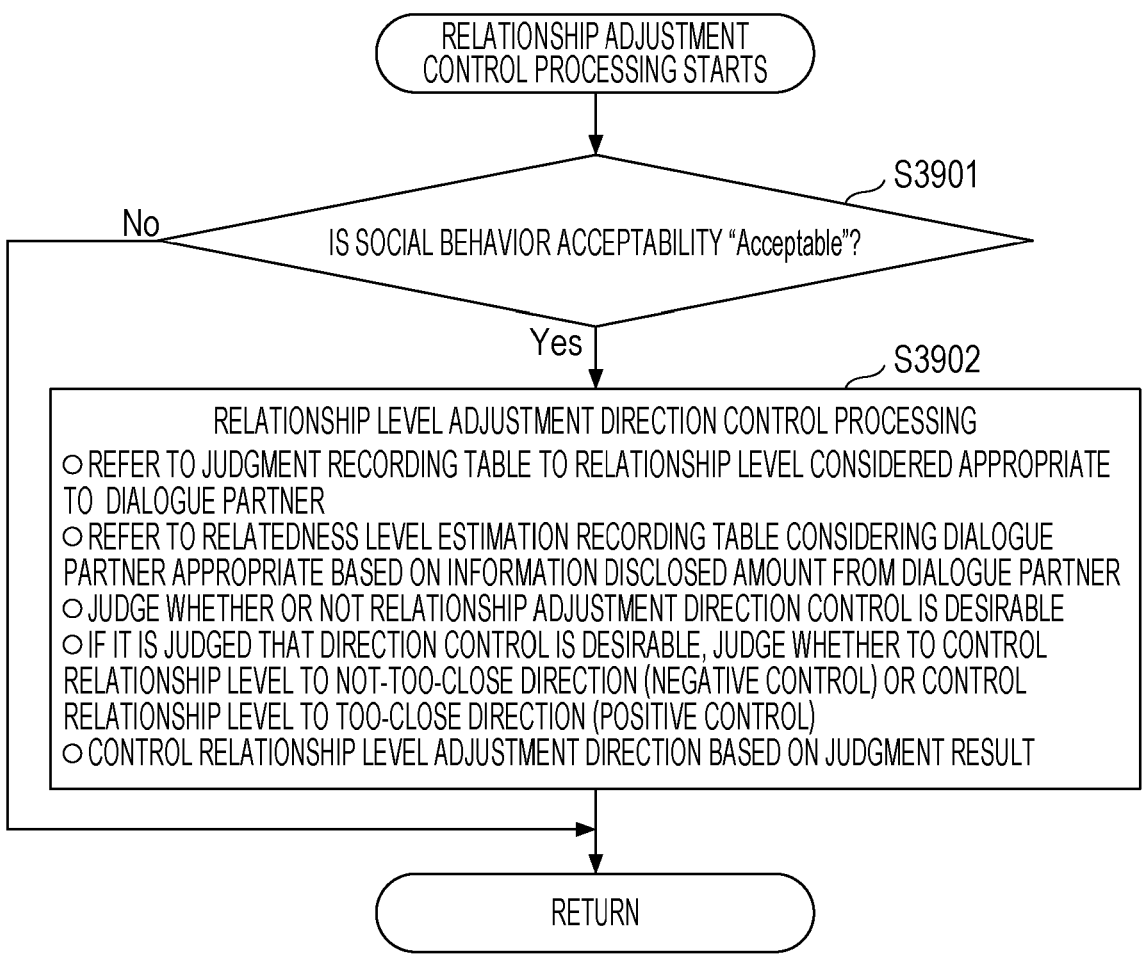
FIG. 39 is a flowchart illustrating details of relationship adjustment control processing.

FIG. 39 is a flowchart illustrating details of the relationship adjustment control processing. In step S3901, the relationship adjustment part 2803 (illustrated in FIG. 28) refers to the "social behavior acceptability judgment recording table" 2600 (illustrated in FIG. 26), and judges whether or not the social behavior acceptability is "Acceptable". In step S3901, if the relationship adjustment part 2803 judges that the social behavior acceptability is "Acceptable", processing proceeds to step S3902.

In step S3902, the relationship adjustment part 2803 performs relationship level adjustment direction control processing.

Specifically, the relationship adjustment part 2803 refers to the "judgment recording table of relationship level considered appropriate to dialogue partner" 3400 (illustrated in FIG. 34), and extracts the relationship level newly recorded in the "relationship level considered appropriate to dialogue partner".

The relationship adjustment part 2803 also refers to the "relatedness level estimation recording table considering dialogue partner appropriate, based on information disclosed amount from dialogue partner" 3800, and extracts the relatedness level newly recorded in the "relatedness level considering dialogue partner appropriate".

The relationship adjustment part 2803 also judges whether or not the extracted relationship level is identical to the extracted relatedness level.

If the relationship adjustment part 2803 judges that the extracted relationship level is identical, the relationship adjustment part 2803 estimates that a relationship is being built with a comparable information disclosure and at a comparable speed. In this case, the relationship adjustment part 2803 judges that the relationship adjustment direction control is not desirable and that it is not also desirable to update the dialogue strategy.

On the other hand, if the relationship adjustment part 2803 judges that the extracted relationship level is not identical, the relationship adjustment part 2803 judges the magnitude relationship. If the extracted relationship level is larger than the extracted relatedness level, the relationship adjustment part 2803 judges that the relationship is such controlled that the relationship level is not too close (negative direction).

For example, suppose that the relationship level that considers the user 150 appropriate to the user 140 (illustrated in FIG. 1) is "1_intimate". On the other hand, suppose that the relatedness level that is estimated to consider the user 140 appropriate to the user 150 is "0_superficial". In this case, the relationship adjustment part 2803 judges that the relationship is to be controlled to the negative direction.

In addition, if the extracted relatedness level is larger than the extracted relationship level, the relationship adjustment part 2803 judges that the relationship level is controlled in an approaching direction (positive direction).

For example, suppose that the relationship level that considers the user 150 appropriate to the user 140 is "0_superficial". On the other hand, suppose that the relatedness level that is estimated to consider the user 140 appropriate to the user 150 is "1_intimate". In this case, the relationship adjustment part 2803 judges that the relationship is to be controlled to the positive direction.

(4) Details of the Dialogue Strategy Determination Processing Based on the Relationship Adjustment Control (Step S3004)

Figure 40:
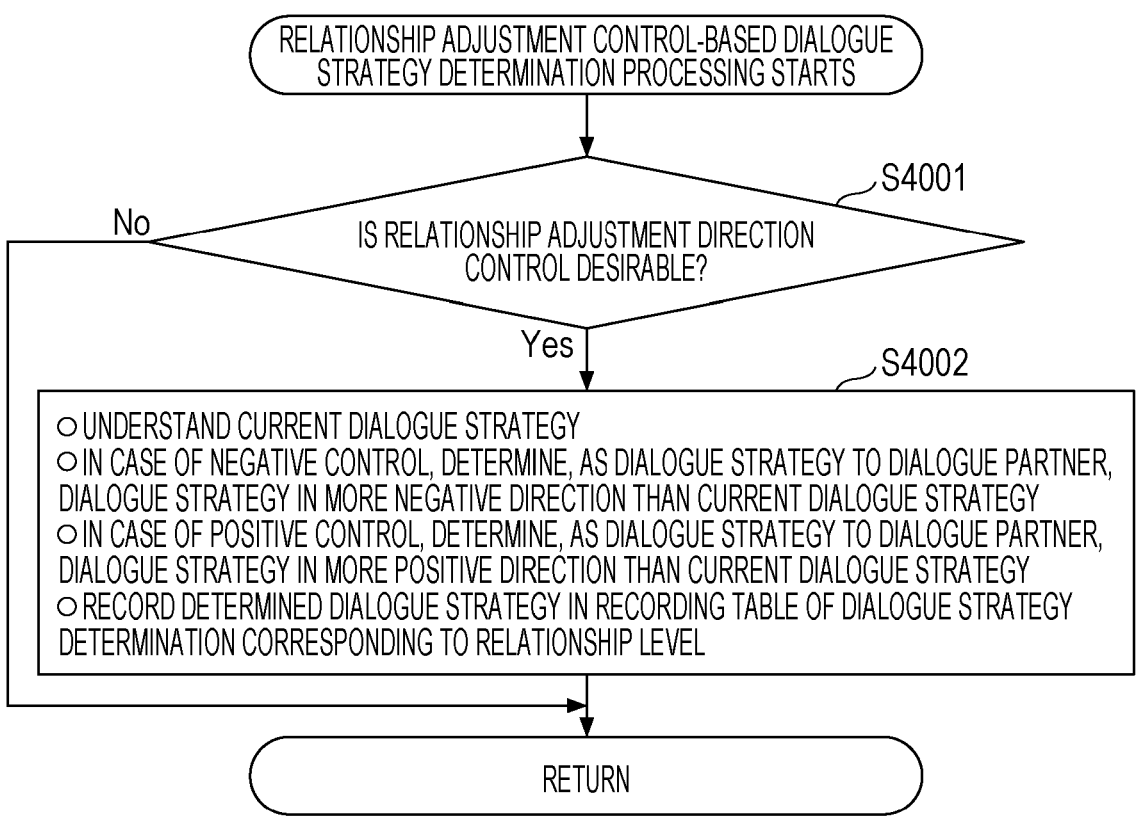
FIG. 40 is a flowchart illustrating details of the dialogue strategy determination processing based on relationship adjustment control.

FIG. 40 is a flowchart illustrating details of the dialogue strategy determination processing based on the relationship adjustment control. In step S4001, the determination part 2804 (illustrated in FIG. 28) refers to the processing result of the relationship adjustment processing (step S3003 illustrated in FIG. 30) by the relationship adjustment part 2803 (illustrated in FIG. 28) and judges whether or not the relationship adjustment direction control is desirable.

If the relationship level and the relatedness level are not identical, in step S4001, the determination part 2804 judges that the relationship adjustment direction control is desirable and proceeds to step S4002.

In step S4002, the determination part 2804 understands the current dialogue strategy and identifies a direction judged by the relationship adjustment part 2803.

If the relationship level adjustment direction judged by the relationship adjustment part 2803 is in the negative direction, the determination part 2804 determines the dialogue strategy that is in more negative than the current dialogue strategy.

On the other hand, if the relationship level adjustment direction judged by the relationship adjustment part 2803 is in the positive direction, the determination part 2804 determines the dialogue strategy that is in more positive than the current dialogue strategy. Note that the relationship adjustment part 2803 refers to the "dialogue strategy definition data table by relationship level" 2900 (illustrated in FIG. 29) in determining the dialogue strategy.

The presentation control section 805 (illustrated in FIG. 8) records the dialogue strategy determined by the relationship adjustment part 2803 in the "recording table of dialogue strategy determination corresponding to relationship level" in the evaluation information DB119.

FIG. 41 is a diagram illustrating an example of the recording table of dialogue strategy determination corresponding to relationship level, recorded in the evaluation information DB. As illustrated in FIG. 41 the "recording table of dialogue strategy determination corresponding to relationship level" 4100 includes the "behaving avatar ID" and "behaved avatar ID", as the information item. In these information items are recorded the avatar ID of the user who behaves based on the dialogue strategy and the avatar ID of the user who receives the behavior based on the dialogue strategy.

In addition, the "recording table of dialogue strategy determination corresponding to relationship level" 4100 includes the "relationship adjustment direction control" and the "dialogue strategy", as the information item. In these information items are recorded the direction judged by the relationship adjustment part 2803 and the dialogue strategy determined by the determination part 2804 (each illustrated in FIG. 28).

For example, suppose that the current dialogue strategy is the "Shortly_positive" strategy that it is the default dialogue strategy the relationship level of which is "0_superficial" (dialogue strategy for which the "distance from the default strategy" is 0). In this case, if the "relationship adjustment direction control" is the negative direction, from FIG. 29, the dialogue strategy in the negative direction is the "Minimally_positive". Therefore, the determination part 2804 (illustrated in FIG. 28) determines the "Minimally_positive" strategy as the dialogue strategy corresponding to the relationship level. In addition, the presentation control section 805 records the "Minimally_positive" strategy in the "dialogue strategy" of the "recording table of dialogue strategy determination corresponding to relationship level" 4100.

As is clear from the foregoing description, the image generation device 110 (illustrated in FIG. 1) in the third embodiment, in determining the dialogue strategy, —judges or estimates the relationship level and the relatedness level with the dialogue partner, —if the social behavior acceptability is "Acceptable", the dialogue strategy is determined so as to adjust a balance between the relationship level and the relatedness level.

With this, according to the image generation device 110 in the third embodiment, the reactive behavior based on the dialogue strategy determined from the standpoint of adjusting the relationship level with the dialogue partner may be presented to the dialogue partner.

Fourth Embodiment

In the foregoing first to third embodiments, the description is given on the assumption that the reactive social behavior corresponding to the dialogue strategy is predefined. To the contrary, in the fourth embodiment, description is given of a case where the reactive social behavior corresponding to the dialogue strategy is changed based on the social behavior actually performed by the user. In the following, the fourth embodiment is described, mainly focusing on differences from the foregoing first embodiment.

<Functional Configuration of Reactive Processing Unit of Image Generation Device>

Figure 42:
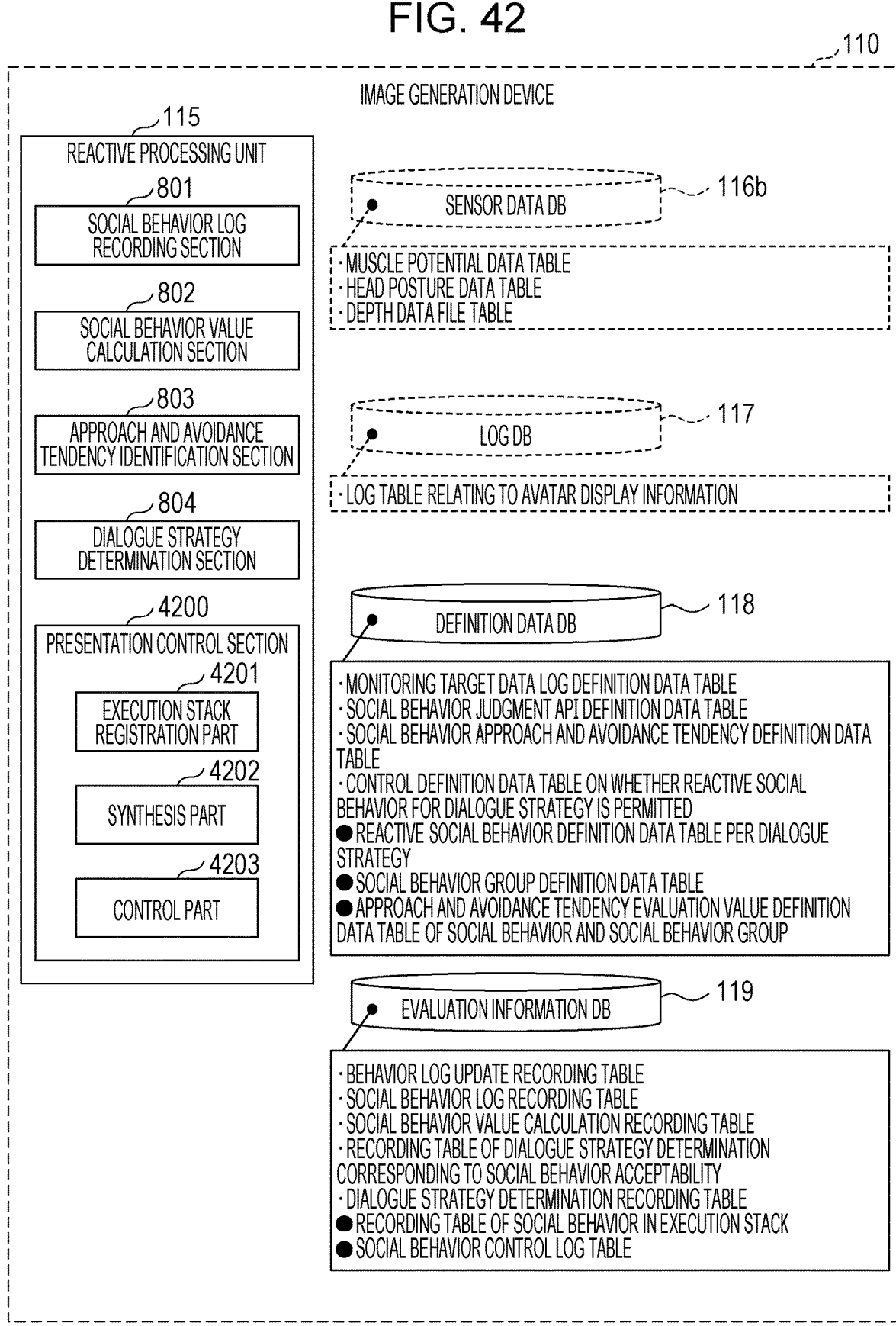
FIG. 42 is a fourth diagram illustrating the functional configuration of the reactive processing unit of the image generation device.

First, description is given of the functional configuration of the reactive processing unit 115 of the image generation device 110 with reference to FIG. 42. FIG. 42 is a fourth diagram illustrating the functional configuration of the reactive processing unit of the image generation device.

A difference from FIG. 8 is that new tables are recorded in a presentation control section 4200, the definition data DB 118, and the evaluation information DB 119. Note that of the tables depicted in the definition data DB 118 and the evaluation information DB 119 in FIG. 42, the tables marked with a filled circle represent the new tables.

As illustrated in FIG. 42, the presentation control section 4200 includes an execution stack registration part 4201, synthesis part 4202, and a control part 4203.

The execution stack registration part 4201 refers to the "dialogue strategy" of the "dialogue strategy determination recording table" 1900 (illustrated in FIG. 19) in the evaluation information DB 119, and identifies the present dialogue strategy. Note that in the fourth embodiment, the execution stack registration part 4201 refers to the dialogue strategy of the user 150 to the user 140 (illustrated in FIG. 1), of the dialogue strategies recorded in the "dialogue strategy" of the "dialogue strategy determination recording table" 1900.

In addition, the execution stack registration part 4201 refers to a "reactive social behavior definition data table per dialogue strategy" stored in the definition data DB 118, and judges for the current dialogue strategy whether or not the reactive social behavior is permitted.

If the execution stack registration part 4201 also judges that reactive social behavior is permitted, the execution stack registration part 4201 refers to a "reactive social behavior definition data table per dialogue strategy" again, and extracts the corresponding social behavior.

In addition, the execution stack registration part 4201 registers in an execution stack the extracted social behavior as the reactive social behavior. The execution stack is an area on the memory storing the social behavior that be performed as the reactive social behavior, and is provided separately from a "recording table of social behavior in execution stack" in the evaluation information DB 119. Note that if more than one social behavior is extracted, the execution stack registration part 4201 refers to a "social behavior group definition data table" stored in the definition data DB 118, and registers the extracted social behaviors as the reactive social behavior group in the execution stack.

Furthermore, the execution stack registration part 4201 records, in the "recording table of social behavior in execution stack" in the evaluation information DB 119, the social behavior or the social behavior group registered in the execution stack.

If the user 150 performs the social behavior, the synthesis part 4202 newly registers the social behavior performed by the user 150 in the execution stack, thereby synthesizing the social behavior into the social behavior registered in the execution stack.

Additionally, when synthesizing the social behavior, the synthesis part 4202 refers to an "approach and avoidance tendency evaluation value definition data table of social behavior and social behavior group" stored in the definition data DB 118. Then, after reviewing possible influence of a case of synthesizing the social behavior, the synthesis part 4202 synthesizes the social behavior into the social behavior registered in the execution stack.

If the user 140 performs the social behavior, based on the social behavior (or the social behavior group) registered in the execution stack, the control part 4203 such controls that the reactive social behavior is presented to the user 140.

The control part 4203 also records the reactive social behavior presented to the user 140 in a social behavior control log table in the evaluation information DB 119.

<Description of Table Relating to Processing of Respective Components of Reactive Processing Unit>

In the following, description is given of the table including data relating to processing of respective components (here, the presentation control section 4200) of the reactive processing unit 115 (illustrated in FIG. 1).

(1) Reactive Social Behavior Definition Data Table Per Dialogue Strategy

FIG. 43 is a diagram illustrating an example of the reactive social behavior definition data table per dialogue strategy, stored in the definition data DB. As illustrated in FIG. 43, "reactive social behavior definition data table per dialogue strategy" 4300 includes, as the information item, the "dialogue strategy", a "permission control condition of reactive social behavior", and "recommended social behavior and social behavior group".

The "dialogue strategy" defines a plurality of predefined dialogue strategies. The "permission control condition of reactive social behavior" defines a condition for permitting the reactive social behavior, for the respective dialogue strategies in the "dialogue strategy".

The "recommended social behavior and social behavior group" defines the social behavior or the social behavior group to be performed if the respective dialogue strategies defined in the "dialogue strategy" are determined.

As depicted on the bottom row of the data rows of FIG. 43, suppose that a "Totally_positive" strategy is determined as the dialogue strategy. In this case, the reactive social behavior is permitted for the social behavior excluding "Gesture_NegativemeaningGesture". Thus, the execution stack registration part 4201 registers "Approaching_seqStandard" as the reactive social behavior in the execution stack.

(2) Social Behavior Group Definition Data Table

FIG. 44 is a diagram illustrating an example of a social behavior group definition data table stored in the definition data DB. As illustrated in FIG. 44, the "social behavior group definition data table" 4400 includes the "social behavior group" and the "component", as the information item.

The "social behavior group" defines a name for identifying the social behavior group. The "component" defines a plurality of social behaviors included in the social behavior group defined in the "social behavior group".

An example on the first row of the data rows of FIG. 44 indicates that the social behavior group identified by "Approaching_seqStandard" includes the following three types of combinations of the social behavior and the social behavior group. Note that a group that is defined as a set having as an element the combination of the social behavior and the social behavior group and that defines two or more elements is referred to as the "social behavior group".

"Gesture_Positivemeaninggestureto,type=nod", "Avoiding_seqKeepaway"

"Approaching_seqMutualtry", "Lean_Backward", "Gesture_Positivemeaninggestureto"

"Approaching_seqMutualtry"

According to the example of FIG. 44, if the execution stack registration part 4201 (illustrated in FIG. 42) registers "Approaching_seqStandard" in the execution stack, the execution stack registration part 4201 registers any of the social behavior groups listed above.

(3) Approach and Avoidance Tendency Evaluation Value Definition Data Table of Social Behavior and Social Behavior Group FIG. 45 is a diagram illustrating an approach and avoidance tendency evaluation value definition data table of social behavior and social behavior group, stored in the definition data DB. As illustrated in FIG. 45, an "approach and avoidance tendency evaluation value definition data table of social behavior and social behavior group" 4500 includes an "approach and avoidance tendency evaluation value" and an "approach and avoidance tendency evaluation value determination condition", as the information item.

The "approach and avoidance tendency evaluation value" defines an evaluation value to be referred when the synthesis part 4202 (illustrated in FIG. 42) synthesizes the social behavior. The "approach and avoidance tendency evaluation value determination condition" defines a condition for outputting the evaluation value defined in the "approach and avoidance tendency evaluation value".

In the case of the fourth data line, for example, of the data rows of FIG. 45, in order to output "4" as an approach tendency evaluation value, the condition is that—a length of duration (time from the recording start time to the recording end time) when the social behavior group is performed is to be 3 [seconds] or longer.

In addition, in the case of the fourth data row, in order to output "4" as an avoidance tendency evaluation value, the condition is that—the length of duration when the social behavior group is performed is to be 3 [seconds] or longer or that—the performed social behavior group is the social behavior group of the avoidance tendency.

<Details of Presentation Control Processing of Reactive Processing Unit>

In the following, details of the presentation control processing of the reactive processing unit 115 are described. Note that the presentation control processing of the reactive processing unit 115 in the fourth embodiment has the process (steps S1501 to S1504) similar to the presentation control processing described with reference to FIG. 15 in the first embodiment.

Figure 46:
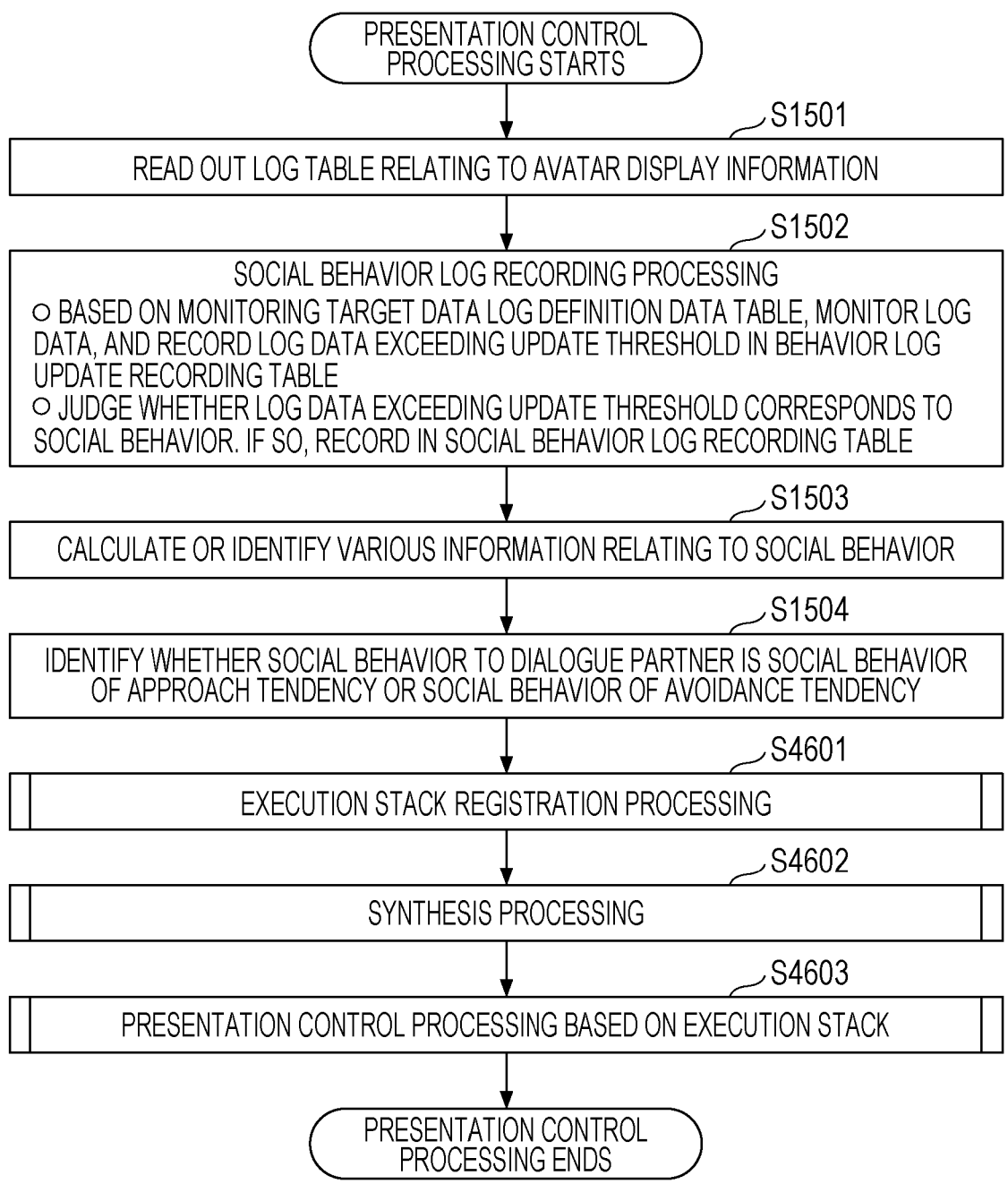
FIG. 46 is a second flowchart illustrating details of the presentation control processing of the reactive processing unit.

Thus, here, of the presentation control processing of the reactive processing unit 115, the process other than steps S1501 to S1504 is described with reference to FIG. 46. FIG. 46 is a second flowchart illustrating details of the presentation control processing of the reactive processing unit.

As illustrated in FIG. 46, the presentation control processing of the reactive processing unit 115 (illustrated in FIG. 1) in the fourth embodiment includes steps S4601 to S4603, as the process other than steps S1501 to S1504.

Of these, in step S4601, the execution stack registration part 4201 performs execution stack registration processing, in step S4602, the synthesis part 4202 performs synthesis processing, and in step S4603, the control part 4203 performs the presentation control processing based on the execution stack. In the following, details of steps S4601 to S4603 are described.

(1) Details of the Execution Stack Registration Processing (Step S4601)

Figure 47:
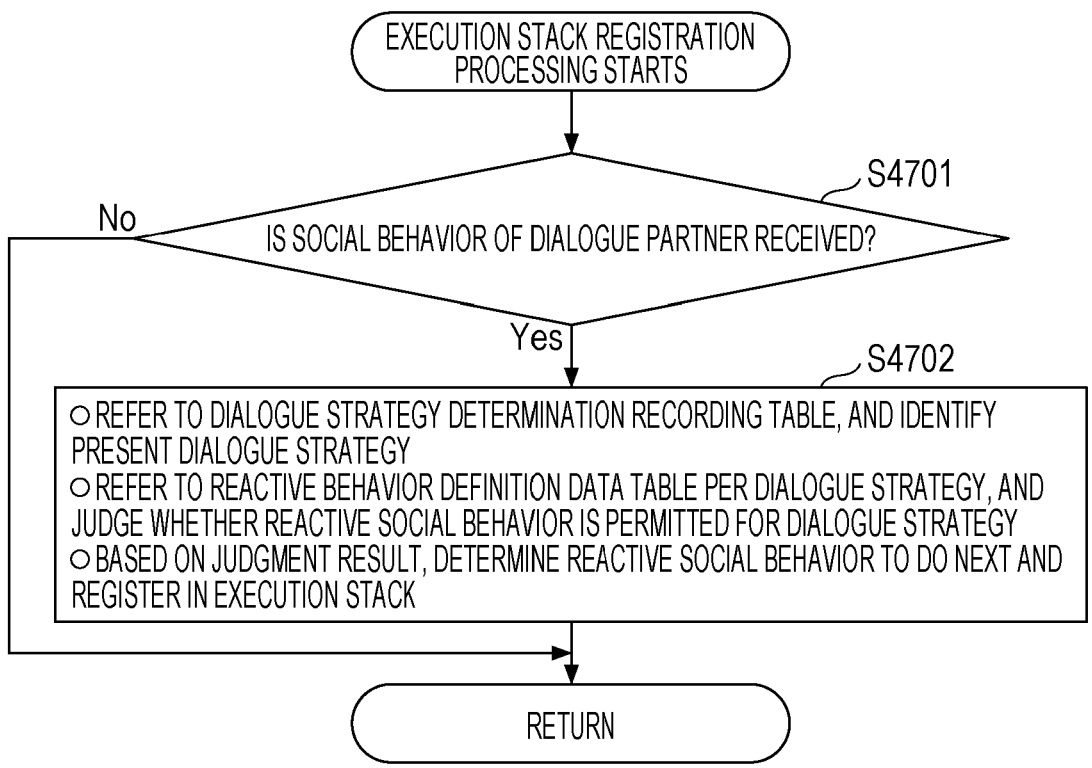
FIG. 47 is a flowchart illustrating details of an execution stack registration processing.

FIG. 47 is a flowchart illustrating details of the execution stack registration processing. In step S4701, the execution stack registration part 4201 (illustrated in FIG. 42) judges whether or not the user 140 (illustrated in FIG. 1) performs the social behavior.

In step S4701, if the execution stack registration part 4201 judges that the user 140 performs the social behavior, processing proceeds to step S4702. In step S4702, the execution stack registration part 4201 refers to the "dialogue strategy determination recording table" 1900 (illustrated in FIG. 19) in the evaluation information DB 119 (illustrated in FIG. 1), and identifies the current dialogue strategy of the user 150 to the user 140. Here, the execution stack registration part 4201 identifies that the current dialogue strategy of the user 150 to the user 140 is the "Totally_positive strategy".

Subsequently, the execution stack registration part 4201 (illustrated in FIG. 42) refers to the "reactive social behavior definition data table per dialogue strategy" 4300 (illustrated in FIG. 43), and judges whether the reactive behavior is permitted, for the identified current dialogue strategy. According to the "reactive social behavior definition data table per dialogue strategy" 4300, in the case of the "Totally_positive strategy", the reactive social behavior is permitted.

Thus, the execution stack registration part 4201 judges that reactive social behavior is permitted.

Subsequently, the execution stack registration part 4201 determines the reactive social behavior to be performed, and records the reactive social behavior in the execution stack. According to the "reactive social behavior definition data table per dialogue strategy" 4300, in the case of the "Totally_positive strategy", "Approaching_seqStandard" is defined as the recommended social behavior group. Thus, the execution stack registration part 4201 registers the social behavior group in the execution stack.

Additionally, according to "social behavior group definition data table" 4400, "Approaching_seqStandard" includes three types of the social behavior groups. The execution stack registration part 4201 registers any of the three types of the social behavior groups in the execution stack. Any social behavior group to be registered may be randomly selected or the social behavior group the frequency of previous execution of which is low may be selected. That is, a selection criterion in selecting the social behavior group that the execution stack registration part 4201 registers in the execution stack may be arbitrary.

Here, suppose that the execution stack registration part 4201 registers the first social behavior group included in the "Approaching_seqStandard". Specifically, suppose that the execution stack registration part 4201 registers "gesture-_Positivemeaninggestureto,type=nod" and "Avoiding_seq-Keepaway".

Note that as "Avoiding_seqKeepaway" is the social behavior group, the execution stack registration part 4201 also registers in the execution stack the plurality of social behaviors included in "Avoiding_seqKeepaway" together.

Subsequently, the execution stack registration part 4201 records the social behavior group registered in the execution stack, in "the recording table of social behavior in execution stack" in the evaluation information DB 119. FIG. 48 is a first diagram illustrating an example of the recording table of social behavior in execution stack, recorded in the evaluation information DB.

As illustrated in FIG. 48, on the first and second rows of the data rows in the "recording table of social behavior in execution stack 1" 4800, the elements forming "Approaching_seqStandard" are recorded. Specifically, all of the social behaviors (or the social behavior groups), which are defined as a sequence in FIG. 44, are recorded. Note that the elements recorded on the second row of data rows are the social behavior groups and the social behavior to be performed actually are registered in the execution stack. Thus, on the third row of data rows are recorded the plurality of social behaviors included in the social behavior group ("Avoiding_seqKeepaway"). Specifically, with reference to the sequence defined in FIG. 44, "Orientation_Face_Indirectto" and "Orientation_Upperbody_Indirectto" are recorded.

(2) Details of the Synthesis Processing (Step S4602)

Figure 49:
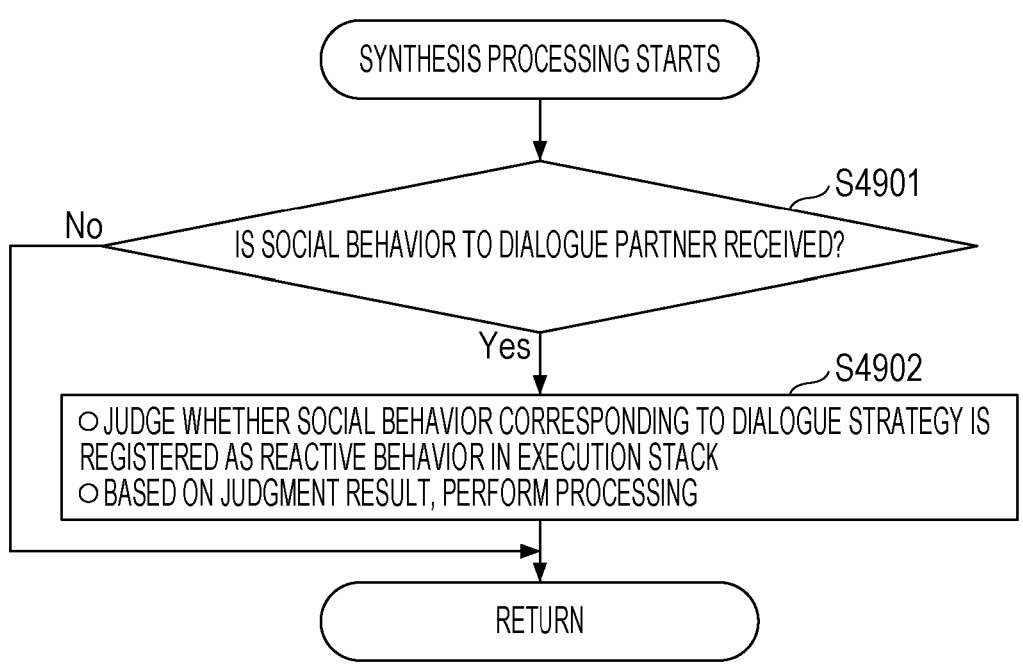
FIG. 49 is a flowchart illustrating details of synthesis processing.

FIG. 49 is a flowchart illustrating details of synthesis processing. In step S4901, the synthesis part 4202 (illustrated in FIG. 42) judges whether or not the user 150 (illustrated in FIG. 1) performs the social behavior.

The synthesis part 4202 judges whether or not to synthesize into behavior being performed by the avatar the social behavior being performed by the user corresponding to the avatar. If the synthesis part 4202 judges to perform the synthesis, the synthesis part 4202 performs the synthesis of the social behavior being performed by the user corresponding to the avatar.

In step S4901, if it is judged that the user 150 performed the social behavior in the past, processing proceeds to step S4902.

In step S4902, the synthesis part 4202 refers to the "recording table of social behavior in execution stack 1" 4800 (illustrated in FIG. 48). Then, the synthesis part 4202 judges whether or not the judged social behavior is already registered in the execution stack (or already performed). The synthesis part 4202 performs processing according to the judgment result of whether or not the judged social behavior is already registered in the execution stack (or already performed). Here, description is given of—a specific example of a case where the synthesis part 4202 judges that the judged social behavior is already performed (specific example 1), —the specific example of a case where the synthesis part 4202 judges that the judged social behavior is already registered but not yet to be performed (specific example 2), and—the specific examples of a case where the synthesis part 4202 judges that the judged social behavior is not yet registered (specific examples 3-1 to 4-3).

(a) Specific Example 1

For example, suppose the user 150 performs "Gesture_Positivemeaninggestureto,type=nod" as the social behavior. Then, suppose that processing to the row of an execution plan ID="106" of the "recording table of social behavior in execution stack 1" 4800 is performed. In this case, the social behavior ("Gesture_Positivemeaninggestureto,type=nod") is already recorded in the execution stack and performed.

Thus, the synthesis part 4202 does not record the social behavior ("Gesture_Positivemeaninggestureto,type=nod") in the execution stack (does not perform the synthesis with the social behavior already registered in the execution stack).

However, the synthesis part 4202 changes "schedule intensity" in the "recording table of social behavior in execution stack 1" 4800. Note that the "schedule intensity" means the intensity that the corresponding social behavior be performed and "1" is recorded as an initial value. The synthesis part 4202 changes to "2" the "schedule intensity" of the execution plan ID stating the social behavior="Gesture_Positivemeaninggestureto,type=nod".

FIGS. 50A and 50B are second diagrams illustrating an example of the recording table of social behavior in execution stack, recorded in the evaluation information DB. Of this, a "recording table of social behavior in execution stack 2-1" 5001 in FIG. 50A represents how the "schedule intensity" of the execution plan ID (="106") is changed to "2".

(b) Specific Example 2

For example, suppose that the user 150 (illustrated in FIG. 1) performs "Orientation_Face_Indirectto" as the social behavior. Then, suppose that processing to the row of an execution plan ID="108") of the "recording table of social behavior in execution stack 1" 4800 (illustrated in FIG. 48) is performed. In this case, the social behavior ("Orientation_Face_Indirectto") is already registered in the execution stack. Thus, the synthesis part 4202 (illustrated in FIG. 42) does not register the social behavior ("Orientation_Face_Indirectto") in the execution stack (does not perform the synthesis with the social behavior already registered in the execution stack).

However, the synthesis part 4202 changes "schedule intensity" in the "recording table of social behavior in execution stack 1" 4800. Specifically, the synthesis part 4202 changes to "2" the "schedule intensity" of the execution plan ID stating the social behavior="Orientation_Face_Indirectto".

A "recording table of social behavior in execution stack 2-2" 5002 of FIG. 50B represents how the "schedule intensity" of the execution plan ID (="108") is changed to "2".

(c) Specific Example 3-1

For example, suppose that the user 150 performs "Attention_joint" as the social behavior. Then, suppose that processing to the row of an execution plan ID="108") of the "recording table of social behavior in execution stack 1" 4800 is performed. In this case, the social behavior ("Attention_joint") is not yet recorded in the execution stack and performed. Thus, synthesis part 4202 registers the social behavior ("Attention_joint") in the execution stack.

Note that the execution plan IDs="106" to "108" are registered as the other social behavior (or social behavior group) in the execution stack. Thus, the synthesis part 4202 registers the social behavior ("Attention_joint") after the other social behavior (or the social behavior group) already registered.

The synthesis part 4202 also records in the "recording table of social behavior in execution stack" that the social behavior is registered in the execution stack. FIG. 51 is a third diagram illustrating an example of the recording table of social behavior in execution stack, recorded in the evaluation information DB.

As illustrated in FIG. 51, for the execution plan ID="109" in the "recording table of social behavior in execution stack 2-3" 5100,
"Attention_joint,intention=5,attributescore=5,duration9" is recorded as the social behavior. Note that if the newly social behavior is record, the initial value ("1") is recoded for the corresponding "schedule intensity".

(d) Specific Example 3-2

For example, suppose that the user 150 (illustrated in FIG. 1) performs "Attention_joint" as the social behavior. As described in the specific example 3-1, according to the "recording table of social behavior in execution stack 1" 4800 (illustrated in FIG. 48), the social behavior ("Attention_joint") is not yet registered in the execution stack. Thus, the synthesis part 4202 (illustrated in FIG. 42) registers the social behavior ("Attention_joint") in the execution stack.

Then, the synthesis part 4202 refers to the "social behavior value calculation recording table" 1800 (illustrated in FIG. 18), and calculates a value representing an attribute of the social behavior such as the length of duration (time from the recording start time to the recording end time) when the social behavior is performed) or intensity.

Subsequently, the synthesis part 4202 refers to the "approach and avoidance tendency evaluation value definition data table of social behavior and social behavior group" 4500 (illustrated in FIG. 45), based on the calculated duration length and the approach and avoidance tendency of the social behavior, and outputs the "approach and avoidance evaluation value".

Since the social behavior ("Attention_joint") performed by the user 150 is the social behavior of the approach tendency and has the duration of 3 seconds or longer, the synthesis part 4202 obtains the approach tendency evaluation value="4".

When registering the social behavior ("Attention_joint") performed by the user 150 in the execution stack, the synthesis part 4202 avoids changing the approach and avoidance tendency considerably from the initial registration state to the execution stack. Thus, the synthesis part 4202 also registers in the execution stack the social behavior of the opposite tendency and at the comparable level. When the social behavior="Attention_joint", the synthesis part 4202 registers the social behavior having the avoidance tendency evaluation value="4" together in the execution stack, because the approach tendency evaluation value="4".

Specifically, the synthesis part 4202 registers in the execution stack the social behavior of the opposite tendency ("Lean_Upperbody_Backward", duration=3). Here, the social behavior of the opposite tendency and at the comparable level is selected from the social behavior or the social behavior group having the same approach and avoidance tendency evaluation value. From the social behavior or the social behavior group having the approach and avoidance tendency evaluation value of "4" in FIG. 45, here, the social behavior that matches the condition for Avoiding_*if (duration>−3) is searched. Selection in this manner of the social behavior or the social behavior group of the opposite tendency that is registered in the execution stack and matches the condition may be determined by referring to the past social behavior value calculation recording table or a default value may be determined.

The synthesis part 4202 records in the "recording table of social behavior in execution stack" that the social behavior performed by the user 150 and the social behavior of the opposite tendency and at the comparable level to the social behavior are registered in the execution stack. FIG. 52 is a fourth diagram illustrating an example of the recording table of social behavior in execution stack, recorded in the evaluation information DB.

As illustrated in FIG. 52, in the "recording table of social behavior in execution stack 2-4" 5200 are recorded the social behavior ("Attention_joint") performed by the user 150 (illustrated in FIG. 1), as the execution plan ID="109"

Furthermore, the social behavior of the opposite tendency ("Lean_Upperbody_Backward, duration=3") is recorded as the execution plan ID="109". Note that if the social behavior is recorded newly, the initial value ("1") is recorded in the corresponding "schedule intensity".

(e) Specific Example 4-1

For example, suppose that the user 150 performs "Attention_joint" as the social behavior. The processing to the execution plan ID="106" in the "recording table of social behavior in execution stack 1" 4800 (illustrated in FIG. 48) is performed, and the social behavior is not yet registered in the execution stack. Thus, the synthesis part 4202 (illustrated in FIG. 42) registers the social behavior ("Attention_joint") in the execution stack. Then, the synthesis part 4202 deletes and then registers the social behavior (or the social behavior group) before being performed from the social behaviors (or the social behavior groups) already registered in the execution stack.

Specifically, the synthesis part 4202 refers to the "recording table of social behavior in execution stack 1" 4800, and identifies the social behavior and the social behavior group that are recorded in the "execution stack of social behavior and social behavior group" and not yet performed. Then, the synthesis part 4202 deletes the identified unprocessed social behavior and social behavior group from the execution stack. Specifically, the synthesis part 4202 deletes from the execution stack the social behavior (or the social behavior group) corresponding to the execution plan IDs="107" and "108".

Subsequently, the synthesis part 4202 registers "Attention_joint, intention=5, attributescore=5, duration9" in the execution stack.

The synthesis part 4202 also records in the "recording table of social behavior in execution stack" that the social behavior already registered in the execution stack are deleted and that the social behavior newly performed by the user 150 is registered in the execution stack.

FIG. 53 is a fifth diagram illustrating an example of the recording table of social behavior in execution stack, recorded in the evaluation information DB.

As illustrated in FIG. 53, in the "recording table of social behavior in execution stack 2-5" 5300, the execution plan IDs="107" and "108" following the executed execution plan ID "106" is deleted. Then, the social behavior (Attention_joint, intention=5, attributescore=5, duration9) performed by the user 150 (illustrated in FIG. 1) is newly recorded as the execution plan ID="107"

(f) Specific Example 4-2

In the foregoing specific example 4-1, unexecuted social behavior (or the social behavior group) already registered in the execution stack is deleted, and then, the social behavior performed by the user 150 is newly registered in the execution stack. In contrast to this, in the specific example 4-2, description is given of a first case where the effect of deletion of the social behavior (or the social behavior group) is minimized and the social behavior is newly registered.

As depicted in the "recording table of social behavior in execution stack 1" 4800 (illustrated in FIG. 48) is registered the unexecuted social behavior (or the social behavior group) represented in the execution plan ID="107", "108".

The synthesis part 4202 (illustrated in FIG. 42) deletes the unexecuted social behavior (or social behavior group) represented in the execution plan ID="107", "108". Subsequently, the synthesis part 4202 registers "Attention_joint, intention=5, attributescore=5, duration9" in the execution stack.

Furthermore, the synthesis part 4202 records in the "recording table of social behavior in execution stack" that the social behavior already registered in the execution stack is deleted and that the social behavior newly performed by the user 150 is registered in the execution stack. The preceding steps are same as the foregoing specific example 4-1, and at this point in time, the "recording table of social behavior in execution stack" is same as the "recording table of social behavior in execution stack 2-5" 5300 as illustrated in FIG. 53.

Here, the synthesis part 4202 adds and registers the social behavior (or the social behavior group) to minimize the effect of the deletion of the social behavior (or the social behavior group).

Specifically, the synthesis part 4202 first refers to a "reactive social behavior group being executed" of this point in time (here, description is given of a case where there exists the "reactive social behavior group being executed"). Note that at this time, "Approaching_seqStandard" is recorded in the "reactive social behavior group being executed".

Subsequently, the synthesis part 4202 confirms the component included in "Approaching_seqStandard" recorded in the "reactive social behavior group being executed". The synthesis part 4202 also compares the confirmed component with the social behavior (or the social behavior group) recorded at this time in the "execution stack of social behavior and social behavior group".

Based on the comparison result, the synthesis part 4202 judges whether the component of "Approaching_seqStandard" includes the social behavior (or the social behavior group) recorded in the "execution stack of social behavior and social behavior group".

At this time, in the "execution stack of social behavior and social behavior group" are recorded, as the social behavior, "Gesture_Positivemeaninggestureto,type=nod", "Attention_joint,intention=5,attributescore=5,duration9".

Then, a sequence of the two social behaviors is not included in "Approaching_seqStandard".

Thus, the synthesis part 4202 judges that all the social behaviors or social behavior groups recorded in the "execution stack of social behavior and social behavior group" are not included as the component of "Approaching_seqStandard". In this case, the synthesis part 4202 refers to the "reactive social behavior definition data table per dialogue strategy" 4300.

Then, the synthesis part 4202 performs a comparison similar to the foregoing comparison targeted for the social behavior (or the social behavior group) recorded as "recommended social behavior and social behavior group" associated with the current dialogue strategy. Here, suppose that all the social behaviors or social behavior groups recorded in the "execution stack of social behavior and social behavior group" is included as the component of the "execution stack of social behavior and social behavior group". In this case, the synthesis part 4202 adds and registers the social behavior and the social behavior group not included in the execution stack, of the components of the "recommended social behavior and social behavior group".

On the other hand, the synthesis part 4202 judges that the component included in "Approaching_seqstandard" includes the social behavior (social behavior group) recorded in the "execution stack of the social behavior and social behavior group".

In this case, the synthesis part 4202 registers in the execution stack any components other than the components that are the components included in "Approaching_seqStandard" and judged as already being included. Specifically, the synthesis part 4202 additionally registers—the social behavior group ("Avoiding_seqKeepaway"), and—the components ("Orientation_Face_Indirectto" and "Orientation_Upperbody_Indirectto") of that social behavior group.

Subsequently, the synthesis part 4202 records the "deletion of the social behavior", registration of the social behavior performed by the user 150, and the additional registration of the social behavior in the "recording table of social behavior in execution stack".

FIG. 54 is a sixth diagram illustrating an example of the recording table of social behavior in execution stack, recorded in the evaluation information DB.

As illustrated in FIG. 54, in the "recording table of social behavior in execution stack 2-6" 5400, the execution plans IDs="107" and "108" following the executed execution plan ID="106" are deleted. Then, the social behavior (Attention_joint, intention=5, attributescore=5, duration9) that is performed by the user 150 (illustrated in FIG. 1) as the execution plan ID="107" is recorded.

Furthermore, in the execution plan IDs="108" and "109" are recorded as the additionally registered social behaviors:
"Avoiding_seqKeepaway"
"Orientation_Face_Indirectto"
"Orientation_Upperbody_Indirectto".

(g) Specific Example 4-3

In the foregoing specific example 4-1, the unexecuted social behavior (or the social behavior group) already registered in the execution stack is deleted and then the social behavior newly performed by the user 150 is registered in the execution stack. On the other hand, in the specific example 4-2, description is given of the case where the following sequence matches the component of the reactive social behavior group being executed or the component of the recommended social behavior and the social behavior group:—"Gesture_Positivemeaninggestureto, type=nod", —"Attention_joint, intention=5, attributescore=5, duration9". Note that foregoing sequence is the sequence registered in the "execution stack of the social behavior and social behavior group".

In contrast to this, in the specific group 4-3, description is given of a case that does not match any of the foregoing cases. Specifically, description is given of a case where paired social behaviors having the evaluation value that is in the direction opposite to and at the level comparable with the social behavior registered in the "execution stack of the social behavior and social behavior group" are recorded in the execution stack.

With the processing up to the row of the execution plan ID="106" in the "recording table of social behavior in execution stack 1" 4800 (illustrated in FIG. 48) executed, the unexecuted social behavior (or the social behavior group) represented by the execution plan ID="107" and "108" are registered in the execution stack.

The synthesis part 4202 (illustrated in FIG. 42) deletes the unexecuted social behavior (or the social behavior group) represented by the execution plan IDs="107" and "108". Subsequently, the synthesis part 4202 records "Attention_joint, intention=5, attributescore=5, duration9" in the execution stack.

Furthermore, the synthesis part 4202 records in the "recording table of social behavior in execution stack" that the social behavior already registered in the execution stack is deleted and that the social behavior newly performed by the user 150 is registered in the execution stack. The preceding steps are same as the foregoing specific example 4-1, and at this point in time, the "recording table of social behavior in execution stack" is same as the "recording table of social behavior in execution stack 2-5" 5300 as illustrated in FIG. 53

Here, the synthesis part 4202 pairs and additionally registers the social behaviors (or the social behavior groups) in the opposite direction, to minimize the effect of the deletion of the social behavior (or the social behavior group).

Specifically, the synthesis part 4202 first refers to the "execution stack of the social behavior and social behavior group" of this point in time. Note that at this time, in the "execution stack of the social behavior and social behavior group" are recorded as the social behavior
"Gesture_Positivemeaninggestureto, type=nod"
"Attention_joint, intention=5, attributescore=5, duration9".

Subsequently, the synthesis part 4202 refers to the "approach and avoidance tendency evaluation value definition data table of social behavior and social behavior group" 4500 (illustrated in FIG. 45). Then, the synthesis part 4202 extracts the social behavior (or the social behavior group) having the evaluation value at the level comparable with and in the direction opposite to the social behavior (or the social behavior group) recorded in the "execution stack of the social behavior and social behavior group" of this point in time.

Specifically, the synthesis part 4202 extracts the social behavior having the evaluation value at the level comparable with and in the direction opposite to the social behavior="Gesture_Positivemeaninggestureto, type=nod". With this, the synthesis part 4202 extracts "Lean_Upperbody_Backward, intention=2".

The synthesis part 4202 also extracts the social behavior having the evaluation value at the level comparable with and in the direction opposite to the social behavior="Attention_joint, intention=5, attributescore=5, duration9". With this, the synthesis part 4202 extracts "Avoiding_seqKeepaway".

Subsequently, the synthesis part 4202 records deletion of the social behavior, registration of the social behavior performed by the user 150, and additional registration of the social behavior in the "recording table of social behavior in execution stack".

FIG. 55 is a seventh diagram illustrating an example of the recording table of social behavior in execution stack, recorded in the evaluation information DB.

As illustrated in FIG. 55, in the "recording table of social behavior in execution stack 2-7" 5500, the execution plan IDs="107" and "108" following the executed execution plan ID="106" are deleted. Then, the social behavior (Attention_joint, intention=5, attributescore=5, duration9) that is performed by the user 150 (illustrated in FIG. 1) as the execution plan ID="107" is recorded.

In addition, the additionally registered behavior ("Lean_Upperbody_Backward, intention=2") is recorded in the execution plan ID="108". Furthermore, in the execution plan IDs="109" and "110" are recorded as the additionally registered social behavior
"Avoiding_seqKeepaway"
"Orientation_Face_Indirectto" and "Orientation_Upperbody_Indirectto".

(3) Details of the Presentation Control Processing Based on the Execution Stack (Step S4603)

Figure 56:
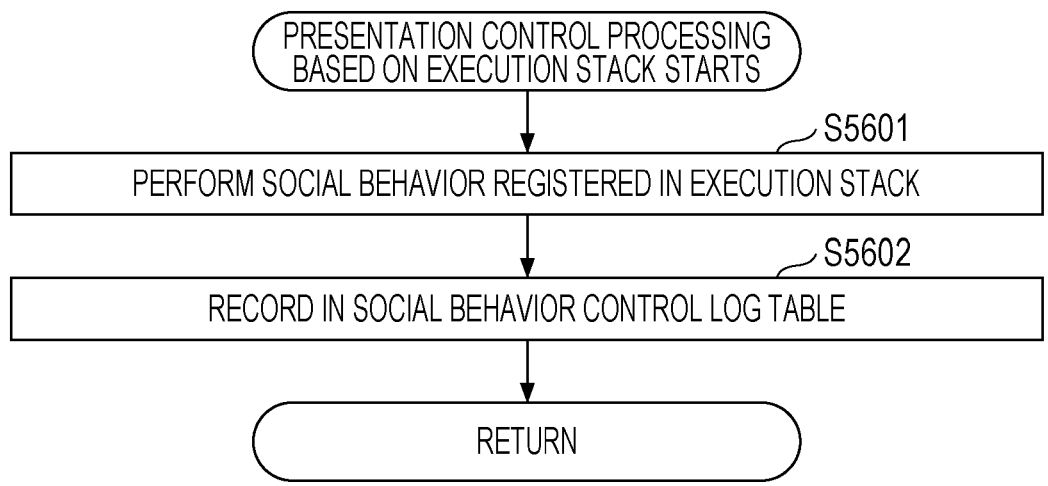
FIG. 56 is a flowchart illustrating details of the presentation control processing based on the execution stack.

FIG. 56 is a flowchart illustrating details of the presentation control processing based on the execution stack. In step S5601, the control part 4203 (illustrated in FIG. 42) performs the social behaviors registered in the execution stack in the order of the execution plan IDs. The control part 4203 also sequentially generates the avatar images based on the social behaviors registered in the execution stack, and transmits the avatar images to the information display processing section 112 (illustrated in FIG. 1). Furthermore, the control part 4203 instructs the information display processing section 112 to change the avatar image to be incorporated in the virtual space.

This allows the information display processing section 112 to incorporate the avatar image generated based on the sensor data obtained by sensing the actual behavior of the user 150 (illustrated in FIG. 1).

In step S5602, the control part 4203 records the reactive social behavior presented to the user 140 (illustrated in FIG. 1) in the social behavior control log table in the evaluation information DB 119 (illustrated in FIG. 1).

FIG. 57 is a diagram illustrating an example of the social behavior control log table recorded in the evaluation information DB. As illustrated in FIG. 57, the "social behavior control log table" 5700 includes, as the information item, the "behaving avatar ID" and the "behaved avatar ID". In these information items are respectively recorded the avatar ID of the user who performs the reactive social behavior and the avatar ID of the user who receives the reactive social behavior.

The "social behavior control log table" 5700 also includes, as the information item, an "execution plan ID of social behavior performed from execution stack". In the information item is recorded the execution plan ID that is registered in the execution stack and performed as the reactive social behavior.

As is clear from the foregoing description, the image generation device 110 in the fourth embodiment changes the reactive social behavior per dialogue strategy based on the social behavior actually performed by the user. This allows the image generation device 110 (illustrated in FIG. 1) in the fourth embodiment to present to the dialogue partner the reactive social behavior following the real social behavior of the user.

Other Embodiment

In the image generation system 100 (illustrated in FIG. 1) in the foregoing first to fourth embodiments, description is given on the assumption that the image generation device 110 has the basic function unit. That is, description is given that the image generation device 110 generates the avatar images of the users 140, 150 based on the sensor data received from the client-side systems 120, 130, and transmits the information in the virtual space to the client-side systems 120, 130 (each illustrated in FIG. 1).

However, the system configuration of the image generation system is not limited thereto, and the client-side systems 120, 130 may each have the basic function unit to generate the virtual space information. In this case, the client-side system 120 transmits a copy of the avatar image of the user 140 to the client-side system 130 and the client-side system 130 incorporates the avatar image of the user 140 in the generated virtual space information.

Similarly, the client-side system 130 transmits a copy of the avatar image of the user 150 to the client-side system 120 and the client-side system 120 incorporates the copy of the avatar image of the user 150 in the generated virtual space information.

Under such a system configuration, the reactive processing unit 115 is also placed in each of the client-side systems 120, 130. In addition, the dialogue strategy determination recording table of the user 140 for the user 150 is transmitted in advance to the client-side system 130, the dialogue strategy determination recording table being generated by the reactive processing unit 115 placed in the client-side system 120. This allows the client-side system 130 to present to the user 150 the reactive social behavior by the user 140.

Similarly, the dialogue strategy determination recording table of the user 150 for the user 140 is transmitted to the client-side system 120, the dialogue strategy determination recording table being generated by the reactive processing unit 115 placed in the client-side system 130. This allows the client-side system 120 to present to the user 140 the reactive social behavior by the user 150, without querying the image generation device 110.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an image generation program that causes a computer to perform a process comprising:
identifying a tendency, among users performing communications using avatars, in a predetermined temporal interval of a second social behavior performed by a second user to a first user if the first user performs a first social behavior to the second user, the first social behavior and the second social behavior including a non-verbal action comprising any one or more of a change of a facial expression, an upper body movement, a change a position of a head of a user, and a changing a body position of the user;

controlling, such that the second social behavior selected based on the identified tendency is presented to the first user, by way of an avatar of the second user, if the first user performs the first social behavior to the second user; and judging, based on a result of judgment on whether the second user may take a cooperative action with the first user and the identified tendency, a possibility of the second user recognizing the first social behavior performed by the first user to the second user.

2. The storage medium according to claim 1, wherein the avatar is an avatar image in a virtual space image displayed on a display device coupled to the computer or a robot coupled to the computer.

3. The storage medium according to claim 1, wherein the tendency is identified to be one of approach action tendency, avoidance action tendency, and intermediate action tendency, based on frequency or time duration of the social behavior of the approach action tendency and frequency or time duration of the second social behavior of the avoidance action tendency, performed by the second user to the first user in the predetermined temporal interval.

4. The storage medium according to claim 1, wherein the process further comprises:

in the controlling, a social behavior is selected based on the judged possibility, and presented to the first user by way of the avatar of the second user.

5. The storage medium according to claim 1, wherein the process further comprises:

judging a relationship level considered by the second user to the first user based on an information disclosure amount, which is an amount of information disclosed by the second user to the first user;

judging an estimated relatedness level considered by the first user to the second user based on an information disclosed amount representing information disclosed by the first user to the second user; and in the controlling, if it is judged that it is possible that the second user recognizes the first social behavior performed by the first user to the second user, the second social behavior is selected based on the relationship level and the relatedness level, and presented to the first user by way of the avatar of the second user.

6. The storage medium according to claim 5, wherein in the controlling, the second social behavior is selected from among social behaviors previously performed by the second user to the first user, and presented to the first user by way of the avatar of the second user.

7. The storage medium according to claim 6, wherein in the controlling, the second social behavior is selected from among the second social behaviors previously performed by the second user to the first user, except the second social behavior selected based on the identified tendency, synthesized into the second social behavior selected based on the identified tendency, and presented to the first user by way of the avatar of the second user.

8. An image generation apparatus comprising:

a memory, and a processor coupled to the memory and configured to identify a tendency, among users performing communications by way of avatars, in a predetermined temporal interval of a second social behavior performed by a second user to a first user if the first user performs a first social behavior to the second user, the first social behavior and the second social behavior including a non-verbal action comprising any one or more of a change of a facial expression, an upper body movement, a change a position of a head of a user, and a changing a body position of the user;

control such that the second social behavior selected based on the identified tendency is presented to the first user, by way of an avatar of the second user, if the first user performs the first social behavior to the second user; and judging, based on a judgment result on whether the second user may take a cooperative action with the first user and the identified tendency, a possibility of the second user recognizing the first social behavior performed by the first user to the second user.

9. An image generation method performed by a computer, the method comprising:

identifying a tendency, among users performing communications by way of avatars, in a predetermined temporal interval of a second social behavior performed by a second user to a first user if the first user performs a first social behavior to the second user, the first social behavior and the second social behavior including a non-verbal action comprising any one or more of a change of a facial expression, an upper body movement, a change a position of a head of a user, and a changing a body position of the user; and controlling such that the second social behavior selected based on the identified tendency is presented to the first user, by way of an avatar of the second user, if the first user performs the first social behavior to the second user; and judging, based on a result of judgment on whether the second user may take a cooperative action with the first user and the identified tendency, a possibility of the second user recognizing the first social behavior performed by the first user to the second user.

10. An image generation apparatus comprising:

a memory storing instructions; and a processor, coupled to the memory, that executes the instructions to perform a process comprising:

identifying a tendency, among users communicating using avatars, in a predetermined temporal interval of a second social behavior performed by a second user to a first user, if the first user performs a first social behavior to the second user, the first social behavior and the second social behavior including a non-verbal action comprising any one or more of a change of a facial expression, an upper body movement, a change a position of a head of a user, and a changing a body position of the user;

selecting the second social behavior based on the tendency;

presenting, to the first user, the second social behavior selected using an avatar of the second user, if the first user performs the first social behavior to the second user; and judging, based on a result of judgment on whether the second user may take a cooperative action with the first user and the identified tendency, a possibility of the second user recognizing the first social behavior performed by the first user to the second user.

11. The image generation apparatus of claim 10, wherein the avatar is an avatar image in a virtual space image displayed on a display device in communication with the image generation apparatus or a robot in communication with the image generation apparatus.

12. The image generation apparatus of claim 10, wherein the tendency comprises any one of an approach action tendency, an avoidance action tendency, and an intermediate action tendency, based on a frequency or time duration of the second social behavior of the approach action tendency and a frequency or time duration of the second social behavior of the avoidance action tendency, performed by the second user to the first user in the predetermined temporal interval.

13. The image generation apparatus of claim 10, wherein the process further comprises first judging whether the second user may take a cooperative action with the first user and the tendency.

14. The image generation apparatus of claim 13, wherein the process further comprises second judging, based on the first judging, a possibility of the second user recognizing the first social behavior performed by the first user to the second user.

15. The image generation apparatus of claim 14, wherein the process further comprises selecting the second social behavior based on the second judging.

16. The image generation apparatus of claim 15, wherein the second social behavior is selected from among social behaviors previously performed by the second user to the first user.

* * * * *